(12) United States Patent  
Davis et al.

(10) Patent No.: US 7,714,782 B2  
(45) Date of Patent: May 11, 2010

(54) PHASE ARRAYS EXPLOITING GEOMETRY PHASE AND METHODS OF CREATING SUCH ARRAYS

(76) Inventors: Dennis Willard Davis, 2202 E. Washington Ave., Eustis, FL (US) 32726; Phillip David Neumiller, 2988 State Route 13, New Woodstock, NY (US) 13122; Jaime R. Román, 127 Madison Park Dr., Madison, AL (US) 35758

( * ) Notice: Subject to any disclaimer, the term of this patent is extended or adjusted under 35 U.S.C. 154(b) by 349 days.

(21) Appl. No.: 11/796,463

(22) Filed: Apr. 26, 2007

(65) Prior Publication Data

US 2007/0285315 A1  Dec. 13, 2007

Related U.S. Application Data

(63) Continuation-in-part of application No. 11/034,627, filed on Jan. 13, 2005, now abandoned.

(60) Provisional application No. 60/536,146, filed on Jan. 13, 2004.

(51) Int. Cl.  
*G01S 13/00* (2006.01)

(52) U.S. Cl. ............... 342/377; 342/99; 342/408
(58) Field of Classification Search ............. 342/99, 342/158, 360, 368, 377, 408, 442, 443, 450  
See application file for complete search history.

(56) References Cited

U.S. PATENT DOCUMENTS

| 4,965,732 | A | * | 10/1990 | Roy et al. | 342/147 |
| 5,745,078 | A | * | 4/1998 | Baghdady | 342/446 |
| 5,898,402 | A | * | 4/1999 | Kilpatrick | 342/417 |

* cited by examiner

*Primary Examiner*—Dao L Phan

(57) ABSTRACT

In the context of array sensors such as radar, sonar, and communications receiver arrays, the present invention exploits the geometry phase components of radiated wavefronts associated with the signals of interest in order to reduce the bandwidth requirements for DOA and beamforming processing. Additionally, geometry phase is exploited in order to effectively increase the resolution of an array without changing the size of its physical footprint or the number of array elements. Other embodiments of the invention include the use of virtual array elements for increase in effective array size.

11 Claims, 46 Drawing Sheets

Doppler shift from forward view of clutter $= \dfrac{2 V_{platform}}{\lambda}$

Clutter Bandwidth $= \dfrac{4 V_{platform}}{\lambda}$

Doppler shift from rear view of clutter $= -\dfrac{2 V_{platform}}{\lambda}$

Fig. 11a

ELEMENT-SPACE STAP

PRE-DOPPLER STAP

CDMA Spatial Filtering

PHASE ARRAYS EXPLOITING GEOMETRY PHASE AND METHODS OF CREATING SUCH ARRAYS

RELATED DOCUMENTS

This application is a Continuation-in-Part of U.S. application Ser. No. 11/034,627, filed Jan. 13, 2005 and now abandoned. This application claims the benefit of U.S. Provisional Application No. 60/536,146 filed Jan. 13, 2004 and Document Disclosure Number 527,884 entitled "Miniaturized Phased Arrays and Methods to Fabricate Same," filed Mar. 15, 2003.

BACKGROUND—PRIOR ART

Phased array technology has been in existence for decades and provides an electronic means for aperture synthesis by virtue of electronic control of array element amplitudes and relative phases. As is well known in the prior art, the steady state far field beam pattern of a discrete array of equidistant emitting elements comprising a phased array, is obtained by the Fourier transform of the complex aperture weights (discrete apodization function) of the array. Hence, the desired beam patterns can be synthesized for both transmission and reception based on the application of appropriate amplifier gains and phase shifter values to each respective element of the array. Further, M−1 beams can be independently and concurrently synthesized with the degrees-of-freedom provided by an array of M elements. Time varying adjustment of the complex weights of the array allows time variation of the patterns and more specifically, provides for multiple target tracking. Phased arrays have been implemented to provide agile beam control for radar, sonar, and lidar. Two-dimensional phased arrays serve as the basis for many surveillance and tactical radar systems requiring increased resolution and beamsteering agility.

A number of issues attend the implementation of phased arrays. Foremost among these is that the optimum lateral spacing of array elements is one-half wavelength of the radiation to be emitted. This mitigates the appearance of grating lobes in the beam pattern. Because the array resolution (achievable narrowness of beamwidth) along a single lateral axis of the array is proportional to the number of array elements along that axis for a fixed interelement spacing, the single axis dimension of the array is governed by both wavelength and desired resolution of the array. At UHF and VHF frequencies, the need for high resolution implies a very large physical footprint for the array. A secondary issue for arrays is the process of beamforming over substantial bandwidths. In the wideband case, due to dispersion, the array weights become frequency-dependent functions and to treat them as constants would lead to the occurrence of severe beam distortion over frequency. Hence, the array weights are implemented as wideband filter functions with the attending complication. Finally, there is the issue of the behavior of the individual array elements. In the electromagnetic array implementation, wherein the array elements comprise antenna elements, there can be mutual coupling between these elements that can lead to beam pattern distortion. This requires introduction of means to achieve decoupling. In the case where such coupling is linear with power and frequency, this can be achieved notionally by processing the signal array with a decoupling matrix. Likewise, if the coupling is frequency dependent, then so is the necessary decoupling process and the decoupling matrix is a frequency-dependent matrix filter function.

It would be extremely useful to implement methods of phased array system design that can overcome the size and wideband processing constraints of the prior art as applied to radar, sonar, and communications systems. To do so, would greatly increase the achievable resolution of such arrays of a given size. Further, means to obviate the necessity for wideband signal processing would significantly simplify analog and rf hardware designs for array systems as well as alleviate the associated signal processing burden. The combination of such methods for receive arrays along with transmit antenna advancements can make feasible the application of phased arrays to mobile communications platforms.

As will be discussed below, a central aspect of the present invention is the exploitation of the received energy geometry phase. One instance known to the authors of the association of differential phase among elements of an array with the energy received from a target is made on page 12 of the dissertation by Jeffrey T. Carlo, entitled "Direct Data Domain Approach Using Nonlinear Arrays," Syracuse University, August 2003. In contrast to the present invention this association enabled removal of target signal energy from the data to be processed.

SUMMARY OF THE INVENTION

There are a number of sources that contribute to the instantaneous phase of a wavefront received at an array element. Among these sources are included the signal carrier frequency, modulation, range of signal source from receiver, angle-of-arrival, Doppler, multipath, scattering, and noise. Of these contributors, it is the angle-of-arrival phase, hereinafter referred to as geometry phase that contains the information required for spatial beamforming. It is this new-found insight that the geometry phase contains all the information necessary for beamforming that makes possible the present invention.

The geometry phase component of wavefront phase exhibits an inherently low frequency nature. This is true because radiating sources, whether high velocity radar targets or mobile communications devices, demonstrate relatively slow changes in the angles-of-arrival associated with their signals. Another distinguishing feature of the geometry phase over other wavefront phase components is that it is spatially non-common mode across the elements of the array. This enables conceptually straightforward separation of geometry phase from other phase contributors by such means as element-by-element phase differencing for the case of a single target or emitter (other techniques described below are used for multiple targets).

Additional perturbations to the wavefront phase that are not common mode among the elements of an array phase can occur in the receiver. These phase shifts are due to the local oscillators, amplifiers, switches, filters, etc. associated with each array element, and can either be made sufficiently small by design, or can be removed from the array manifold by calibration.

The present invention exploits the geometry component of wavefront phase in two distinct ways for receive arrays. In the first way, the inherent low frequency nature of the geometry phase variation permits phased array processing schemes that avoid the conventional requirement for wideband beamforming. The methodology used to achieve this shall hereinafter be referred to as geometry phase processing (GPP). In the second way, geometry phase allows multiplication or division of this component of wavefront phase by arbitrary scale factors thereby enabling a constant array beam pattern while decreasing or increasing, respectively, the array element spacings. Alternatively, it permits an array of a given fixed element spacing to exhibit beam pattern behavior that corresponds to larger or smaller element spacings, respectively. Herein, this process will be referred to as geometry scaling of phase (GSP). Hence, the present invention makes possible significant reduction in the size of phased array antennas for signal reception.

Implications also exist for sonar. Foremost is the potential reduction in the size of passive arrays such as towed arrays. In sonar, the aforementioned contributors to the wavefront phase received at each element are all relatively low frequency processes hence the distinction between narrowband and broadband processing is not as great as in the radar or communications context. Nevertheless, decreased processing burden can be experienced in the sonar application by using the geometry phase for spatial beamforming.

Space-time adaptive processing (STAP) architectures for sensor arrays are compatible with the functions of the present invention. The present invention can serve as a preprocessing methodology for STAP in order to permit the functionality of the present invention in the context of STAP. Also, it can serve as a process that is auxiliary to STAP. Additionally, the present invention can be made part of STAP architecture through various straightforward modifications to conventional STAP architectures. Direction-of-arrival (DOA) algorithms that play a significant role in array processing can operate with the low frequency geometry phase variation thereby exploiting the advantage of reduced processing burden. Alternatively, DOA algorithms can be used to estimate the geometry phase of multiple targets prior to GSP.

Issues that must be addressed in the process of reducing array element spacings include means to either compensate or diminish the mutual coupling between elements that typically increases with increased proximity of adjacent elements, and how to reduce the size of antenna elements while maintaining high radiation and reception efficiency.

Four areas of functionality contribute to realization of various embodiments of the present invention, namely a) while using a fixed center frequency of operation, the ability to shrink (or expand) the phased array geometry without loss of directivity, b) the ability to implement narrowband processing to perform beamforming of conventional wideband signals, c) methods to produce electrically long, physically small antennas, and (d) methods that mitigate mutual coupling of array elements.

The first area of functionality is achieved by the method described in the Japanese paper entitled "A Narrow Element Spacing Array Antenna With Level Sensitive Frequency Multipliers." In this paper, frequency multipliers are used to create large effective phase changes between radiating elements. This permits placement of such elements closer together while maintaining a fixed far field pattern at a single frequency. Experimental verification of this was included in the paper. However, use of multipliers implies that this would not be applicable to wideband systems. The authors state, in the first paragraph of the second page, that this technique cannot be applied to carriers having phase modulation.

To overcome the limitation associated with modulation, the second area of functionality is employed. That is, the ability to perform beamforming on wideband signals without the need for wideband processing. In this regard, reference is made to the two papers entitled "Digital Communications Using Self-Phased Arrays" and "Mobile Digital Communications Using Phase Conjugating Arrays." These papers deal with retrodirective arrays for communication applications. The basic concept here is that the RF wavefront phase spectrum comprises two chief spectrally-distinct components, a low bandwidth variation that is due to geometric effects such as range and angle-of-arrival variation and a high bandwidth variation due to signal modulation. For their purposes, the authors developed means to conjugate only the so-called "geometry phase" component of the wavefront for achieving retrodirection. Hence in all instances where the "information phase" can be spectrally or otherwise separated from the geometry phase, narrowband beamforming can be applied exploding only the geometry phase. Actually, another perspective on this situation is that the beamforming is performed using differential phase among elements and the communication information is conveyed as a common mode phase variation among elements. Therefore beamforming can be achieved in reduced size geometries by phase multiplication of the baseband geometry phase as will be discussed below. Doppler shift is a common mode phase component among elements that is treated similarly to modulation. The baseband nature of the geometry phase suggests that beamforming can be accomplished through the application of a rich inventory of digital signal processing (DSP) techniques and DSP hardware currently available.

The issue of coupling of antenna array elements can be extremely troublesome if the coupling is frequency dependent or a nonlinear function of element drive power. For narrowband applications, frequency dependence is avoided. With the advent of full field electromagnetic solvers, simulation can be used to determine the matrix of coupling coefficients associated with an array of elements as a function of frequency. Hence, in many cases, the problem of mutual array coupling can be addressed by using a decoupling matrix in the beamformer. Another approach is to use antenna technology that prevents or minimizes array element coupling in the first place. An example of this is the "high dielectric antenna" developed by Antenova. These antennas are characterized by ceramic construction with a radiating dielectric that exhibits a near field of much diminished extent. The consequence is significantly reduced coupling compared to conventional antenna elements.

With respect to antenna element miniaturization, the ability to create electrically long (high radiation efficiency) but physically small antennas hinges on the use of new types of antenna materials such as the aforementioned ceramics of Antenova and the class of materials called "metamaterials." Some metamaterials can exhibit amazing behaviors such as negative Doppler shifting, and planar beam focus. Reference is made to the presentation given by Paul Kolodzny, entitled "Antenna Applications of Metamaterials." Enough work has been done that a number of candidate materials can be cited that will achieve element miniaturization. Some magnetic substrate metamaterials can already achieve linear size reduction factors for patch antennas of 6×. Of greater impact are the 100× reductions that DARPA is pursuing.

In the implementation of a miniature receive phased array, the present disclosure details an approach to placing array elements in close proximity while preserving directivity. Also provide is a methodology for doing this in narrowband fashion for wideband signals. The secondary issues of array element size and mutual coupling are addressed, as well.

Another capability that exploits geometry phase is that of virtual array elements. In this concept, the phase differences obtained between two physical array elements can be assigned to additional adjacent virtual elements in order to create an array with a larger effective number of elements. In the most general case, the aperture phase map can be extrapolated to or estimated for the positions of virtual, non-physical elements of the array. Phenomenology that will degrade the performance of virtual elements includes spatial variation of signal amplitudes across the array and inability to synthesize multipath responses.

In addition to radar and communication applications of the present phased array invention, acoustic and potential optical uses are foreseen. Sonar systems can benefit from the present invention by reduction in the size of towed arrays and side-looking sonar apertures. Reduced processing bandwidth can also be of value. Also the present invention can be applied to medical ultrasound and echocardiography systems. Hence, the implications of the present invention are dramatic for both military and commercial applications.

The following lexicon of terminology serves to more explicitly define the invention and serves as a basis for claim interpretation:

Geometry phase refers to that component of wavefront phase associated with angles-of-arrival of energy received from localized emitters and scatterers. This applies to longitudinal and transverse wave propagation in acoustics and electromagnetics, respectively.

Geometry phase processing refers to methodologies for separating or extracting the geometry phase from other components of the received energy phase.

Geometry scaling of phase refers to alteration of the lateral magnification of the received energy phase map.

Spatially common mode refers to a wavefront energy contribution to the received array energy that is present at all elements of the array. This is in contrast to such contributions as thermal noise which varying from element to element of the array.

Virtual array elements refer to non-physical array elements that have an associated element response that has been computed on the basis of the aperture geometry phase. The computed response for such elements can be included with the response from physical elements of the array so as to improve array resolution.

OBJECTS AND ADVANTAGES

Several objects and advantages of the present invention are:
(a) Provide a method for reducing the size of phased array antennas without sacrificing resolution;
(b) Provide a method for increasing the resolution of a fixed size phased array;
(c) Provide a method for decreasing the aperture size of synthetic aperture radar systems without sacrificing resolution;
(d) Provide a method for increasing the resolution of a fixed aperture size synthetic aperture radar;
(e) Provide a method for decreasing the aperture size of a sonar array without sacrificing resolution;
(f) Provide a method for increasing the resolution of a fixed aperture size sonar array;
(e) Provide a method for averting the use of wideband beamformers in wideband signal applications;
(f) Provide a method for averting the need to perform wideband array calibration for wideband signal applications;
(f) Provide a method for reduced processing burden for direction of arrival processing;
(g) Provide a means of achieving practical mobile, adaptive beamforming for communication systems;
(h) Provide means to mitigate array element coupling with affecting array pattern.

BRIEF DESCRIPTION OF THE DRAWINGS

Figure 11A:
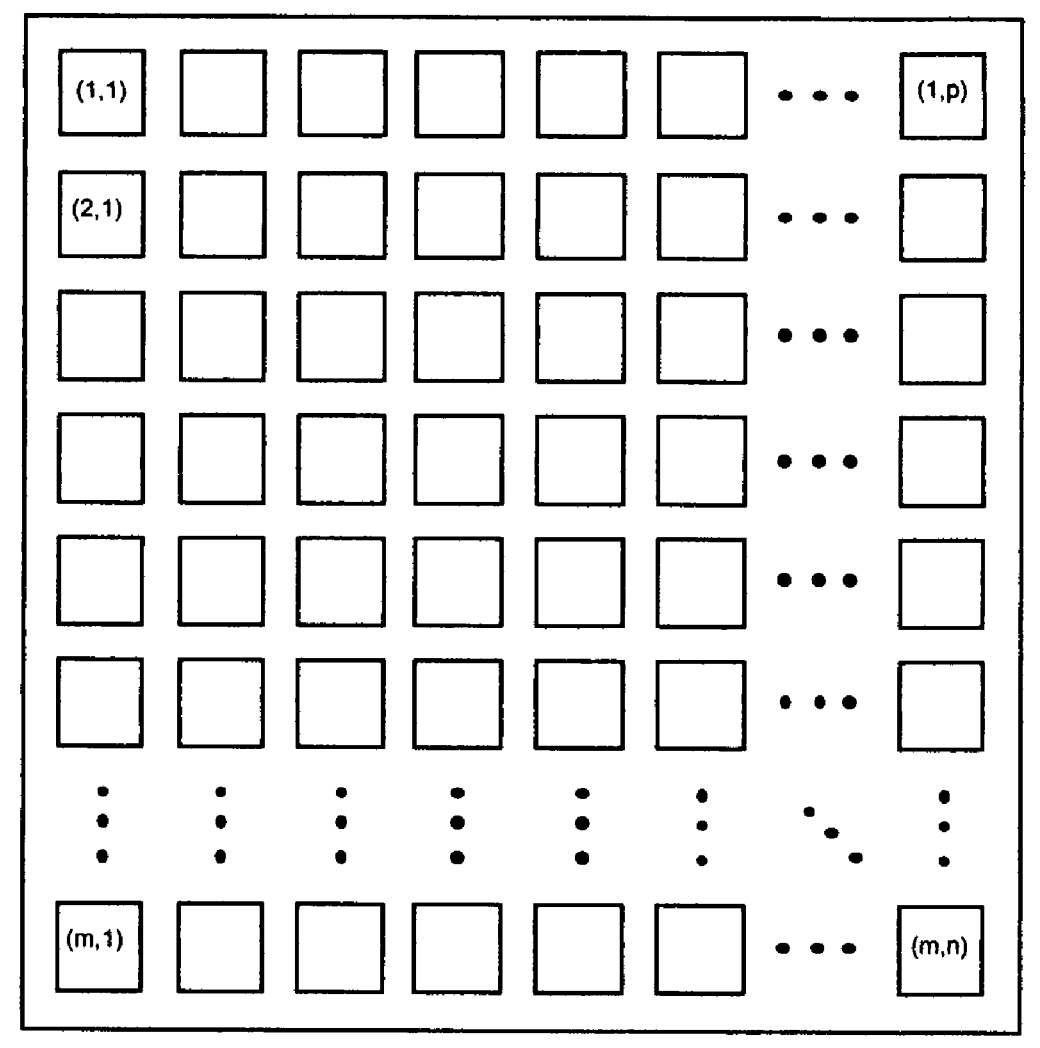

FIG. 11a is a regular two-dimensional patch antenna array geometry.

DETAILED DESCRIPTION OF THE INVENTION

A) Phenomenology

Figure 1:
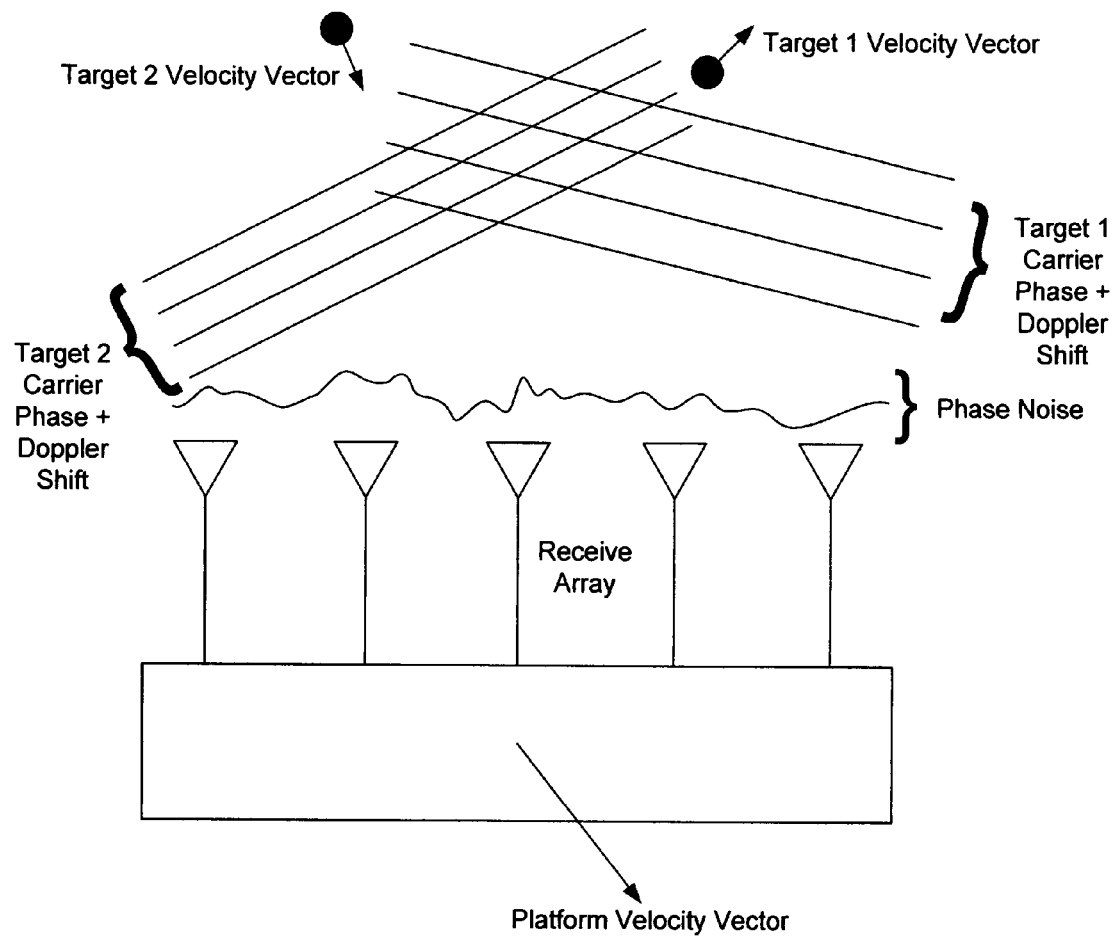
FIG. 1 is a pictorial diagram of the general emitter and receiver array geometry.

A description of the underlying phenomenology upon which the present invention is based will be given first in the context of radio frequency (RF) array receivers. Departures from the RF phenomenology in the domain of optics and acoustics will be addressed below. Consider the radar array shown in FIG. 1. The received phase of the signal will change as a function of time due to several factors including motion of the receiver and target (or remote communications transmitter in the communications application), scattering, signal modulation, and receiver noise and error sources. Target translational motion along the radial vector between the receiver and target will impart Doppler shift whereas rotational motion will impart a Doppler spreading of the signal. Changes in the angular position of the target relative to the receiver array boresight will cause angle-of-arrival phase changes, hereafter referred to as geometry phase. The signal can be scattered in either a diffuse or specular manner. Diffuse scatter leads to a continuum spread in the signal time of arrival, whereas specular scattering, also termed multipath, leads to receipt of discrete signal echoes. In the case of radar, the signal may be modulated for the purpose of pulse compression or low probability of intercept. In the case of modern communications systems such "modulation" is typically hierarchical. This includes baseband information source encoding, encryption, channel encoding, carrier modulation, and spectrum spreading as is well known in the art of commercial wireless communications. Receiver-induced perturbation of the phase of the received signal is caused by the receiver thermal noise referred to the antenna, local oscillator phase noise and frequency drift, and whatever level of dispersive character of the receiver response exists.

The contributions to signal phase can be grouped under the categories of geometry phase, Doppler phase, message phase, and noise. The understanding that the geometry phase contains all the information necessary for beamforming is an insight not found in the prior art. It is this understanding that enables the present invention and its implications will be discussed in detail below.

Because the various contributions to signal phase exhibit disparate behavior in the time(frequency), spatial, and polarization domains, it will be possible to separate them. Various components of total wavefront phase are summarized in Table 1. The methods of phase component separation will be discussed in detail below.

The geometry phase, or angle-of-arrival phase, exhibits frequency components in the 10-1000 Hz range depending on platform speed. The differential phase between adjacent array elements is given by $$\Delta \varphi(t) = \frac{2\pi d}{\lambda} \sin(\theta)$$

where d is the inter-element spacing, $\lambda$ is the radiation wavelength, and $\theta$ is the target azimuth angle. Given a target transverse velocity of $v_{trans}$ and a target range of R, the azimuth angle evolves as the following function of time $$\phi(t) = \operatorname{Tan}^{-1}\left(\frac{v_{trans}t}{R}\right) = \frac{2\pi d}{\lambda} \frac{v_{trans}t}{\sqrt{(v_{trans}t)^2 + R^2}}$$

and the derivative of differential phase with respect to time, considered a target modulation frequency, at time zero is $$\left.\frac{\partial \Delta \varphi(t)}{\partial t}\right|_{t=0} = \frac{2\pi d}{\lambda} \frac{v_{trans}}{R} = \omega_{targ}$$

For inter-element spacing $$d = \frac{\lambda}{2},$$

the target modulation frequency reduces to $$\omega_{targ} = \frac{\pi v_{trans}}{R},$$

which will be typically a small number. For example, with a target transverse velocity of 800 mph at a range of 1 mile, the target modulation frequency is 1600 Hertz. In contrast, a ground moving target with transverse velocity 30 mph and a range to low earth orbital observation of 100 miles, presents a target modulation frequency of 0.9 Hertz.

Figure 2:
FIG. 2 is a pictorial diagram of the geometry associated with determining clutter bandwidth.
Figure 2:
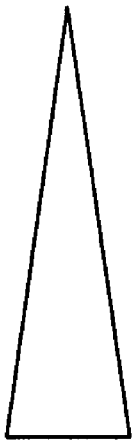
Figure 2:

The Doppler phase also exhibits frequency components in the range of the geometry phase. A Doppler spread gives rise to the clutter bandwidth associated with airborne clutter. Reference is made to FIG. 2 which depicts the geometry of an airborne platform above ground clutter. The maximum clutter bandwidth is seen to be $4v/\lambda$. For a 10 GHz radar on a platform moving at 300 m/s, the clutter bandwidth is 40 KHz.

The message phase includes all modulation contributions to the signal phase and exhibits frequency components centered around 100 KHz or greater depending upon modulation type and rate. These are temporal (frequency domain) distinctions among components of the signal phase.

The components of the signal phase also exhibit a spatial distinction. With respect to a receiver array, these components may be considered to be in either of two categories, namely, components that are common mode or non-common mode across all the elements of the array. Different components of noise will be will be found in both categories. For instance, in a receiver implementation in which a common local oscillator (LO) is used in down-conversion for each element receive path, that LO contributes a common mode phase noise. In contrast, thermal noise will be uncorrelated among elements and hence non-common mode. Messaging and Doppler phase will be common mode, whereas, geometry phase will be non-common mode.

For polarization sensitive receivers, some of the polarization diverse contributors to signal phase are excluded or modified. For example, direct path radiation will maintain polarization state as opposed to reflected and scattered radiation that will modify the state of the signal polarization. Phase contributions to received signal are summarized in the table below.

For acoustic signals, polarization is neglected, but unlike free space RF propagation, the acoustic medium, water in the case of sonar, alters the signal through refraction, and group delay variation. Additionally, the sonar environment can be highly reverberant.

| Phase contributor | Origin | Characteristics | Common Mode Across Array Elements | Separation Methods | Application |
|---|---|---|---|---|---|
| Carrier phase | Signal carrier phase | High frequency | Yes | Subtraction | All |
| Geometry phase | Target angel of arrival | Low frequency | No | Subtraction, DOA est., subarray eqns, filtering | All |
| Doppler shift | Target translation | Low frequency | Yes | Subtraction or filtering | Radar, sonar, mobile communications |
| Doppler spread | Target rotation, Diffuse scatterers | Narrowband | Yes | Subtraction or filtering | Radar ground clutter |
| Specular multipath | Reflection from smooth surfaces or index gradients | Variable time delay | Variable correlation | Subtraction, filtering, polarization, or RAKE processing | Communications |
| Diffuse multipath, clutter | Scattering from rough surfaces and multiple small scattering centers | Variable time delay | Variable correlation | Subtraction, filtering, polarization, or RAKE processing | Communications, radar, sonar |
| Dispersion | Phase variation with frequency - induced by either transmission media or hardware | Narrowband or Wideband | Yes | Subtraction or phase equalization processing | Communications, sonar |
| Differential receiver phase shift | Phase shift due to phase differences among array element receiver front ends and LO's | Systematic phase shift | No | Calibration | All |
| Common mode receiver phase shift | Phase shift common among array element receiver front ends and LO's | Systematic phase shift | Yes | Subtraction or Calibration | All |
| Modulation | Transmitter signal modulation | Narrowband or Wideband | Yes | Subtraction or demodulation | All |

B) Geometry Phase Processing (GPP) and Geometric Scaling of Phase (GSP)

As stated, there are two chief motivations to extract the geometry phase component of the total signal phase, the performance of beamforming and direction-of-arrival (DOA) processing. First, the low frequency spectral nature of the geometry phase implies an absence of need for conventional wideband beamforming in the context of wideband signals.

This is accomplished in the present invention by geometry phase processing (GPP). Second, through simple scaling of the geometry phase, it will be possible to scale the size of receiver phased arrays, ideally, reducing array size while maintaining resolution. This is accomplished by geometric scaling of phase (GSP). Various embodiments of the present invention exploit one or both of these geometry phase-based processes.

Reference is made again to the equation for the differential phase between adjacent array elements of separation d, that are intercepting a plane wave at angle $\phi$ at wavelength $\lambda$ $$\Delta \varphi(t) = \frac{2\pi d}{\lambda} \sin(\theta)$$

Figure 3:
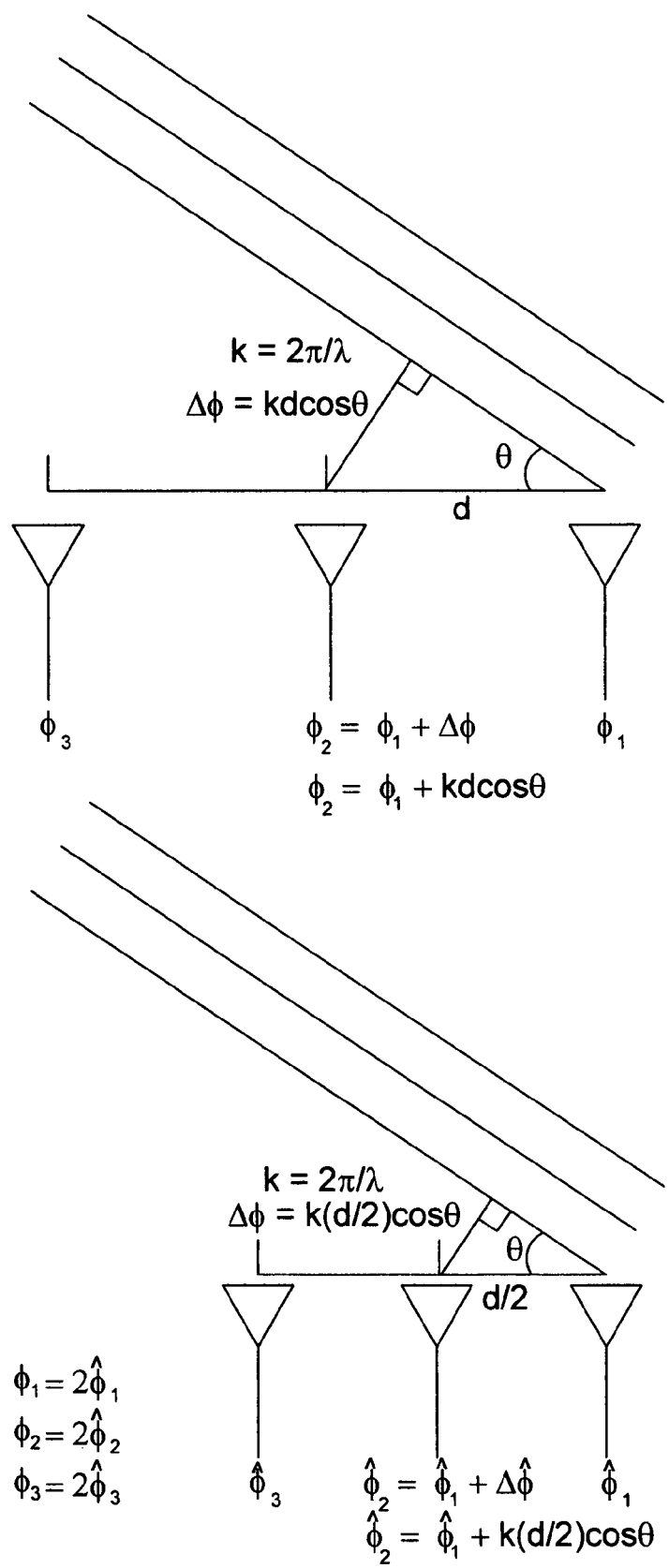
FIG. 3 is a pictorial diagram depicting the differential phase among adjacent array elements receiving an incident plane wave.
Figure 4:
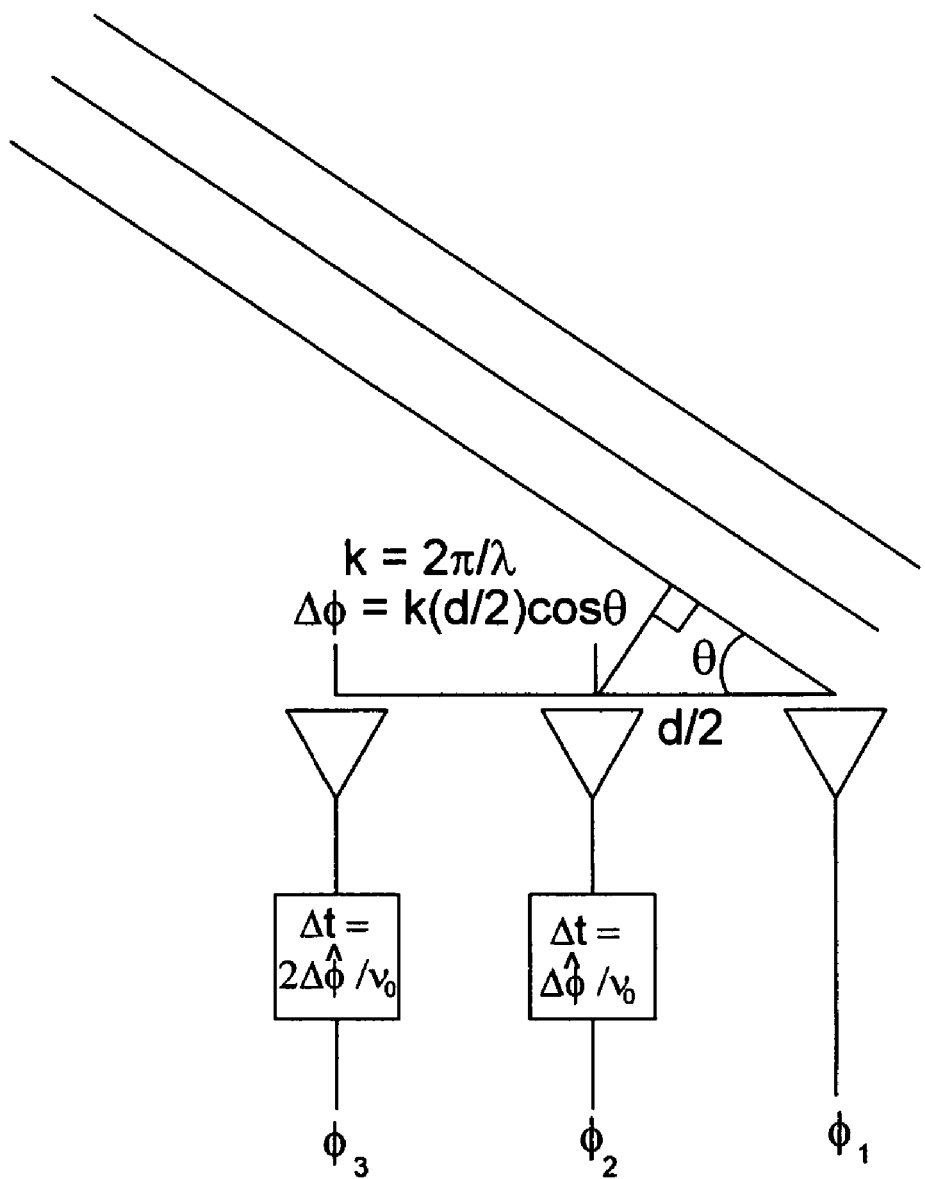
FIG. 4 is pictorial diagram depicting the correspondence of geometry phase scaling to a data-dependent true time delay.
Figure 4A:
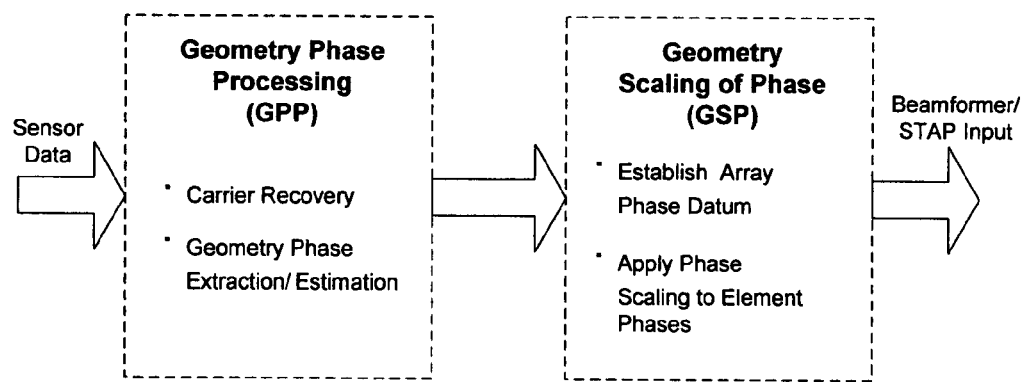
FIG. 4a is functional block diagram depicting the processes subsidiary to GPP and GSP.

Accordingly, a reduction in inter-element spacing causes a proportional reduction in the received differential phase. Hence, if element spacing is reduced by an arbitrary factor, in order to maintain the phase reception characteristics corresponding to the original element spacing, the differential phase of the reduced-size array must be multiplied by this same arbitrary spacing reduction factor (scale factor) as depicted in the example of FIG. 3. In this figure, for the smaller array to have the same array pattern as the larger array, either the differential element phases or the phase of each element of the smaller array must multiplied by a factor of 2. This is the essence of GSP. Of course, this is a wavelength (frequency)-dependent scaling. It is, in fact, a linear dispersion of phase with frequency. This is equivalent to implementing a different, data-dependent, true time delay for each element of the array that corresponds to the geometry phase scaling of the array, as depicted in FIG. 4. This equivalence is true only for the case of reduced element spacing. Under certain circumstances, to be discussed below, there are reasons to increase the element spacing. This corresponds to subtraction of time delay from each element of the array (creating a negative time delay). Since this is not realizable in a physical time delay device, this phase subtraction must be performed by signal processing methods. Because the differential phase is inherently narrowband, being dominated by the geometry phase, a variable scale factor is applied only over the narrow bandwidth. Again, this narrow bandwidth is associated with the geometry phase, in contrast to large bandwidths associated with spread spectrum modulation, data modulation, or radar chirp bandwidth. The two main processes novel to the present invention are shown as sequential processes in FIG. 4a. In radar and sonar applications, carrier recovery may not be required; however this is typically an issue in communications applications. In various embodiments of the present invention, these processes, GPP and GSP, can be inserted at various positions in conventional array processing chains.

As will be discussed below with regard to various embodiments of the present invention, geometry phase scaling can be applied at various signal processing stages within a phased array system.

i) Methods of Geometry Phase Extraction

Given a uniformly spaced array of M+1 omnidirectional isotropic antenna elements receiving energy from P+1 plane waves, the baseband voltage induced at the nth antenna element can be expressed as follows $$x(n) = \sum_{0}^{P} A_P \exp(j\gamma_P + j2\pi dn \sin\theta_P) + I_n + N_n \quad 0 \le n \le M$$

where $A_p$, $\gamma_p$, and $\theta_p$ are the amplitude, phase, and direction of arrival of each of the P+1 plane waves, $I_n$ and $N_n$ are the interference and noise received at each element, and d is the element spacing. The relationship between the plane wave parameters and the value of the composite phase at each array element is given by $$\varphi(n) = \mathrm{Tan}^{-1} \left[ \frac{\sum_{0}^{P} A_P \sin(\gamma_P + 2\pi dn \sin\theta_P) + I_n + N_N}{\sum_{0}^{P} A_P \cos(\gamma_P + 2\pi dn \sin\theta_P) + I_n + N_N} \right]$$

It is this phase map that is sampled in time and space by the phase sensitive receivers associated with each array element.

Figure 5:
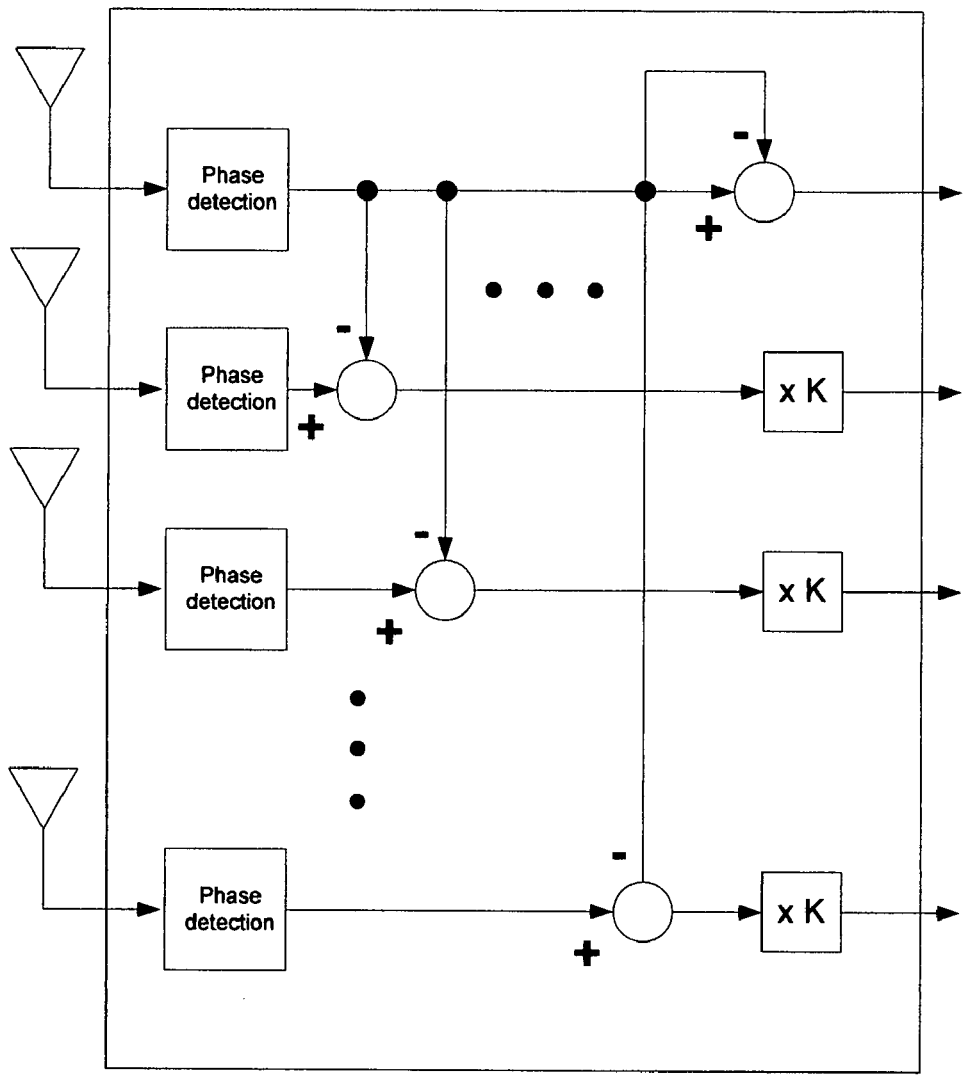
FIG. 5 is a notional diagram for the basic process of GSP.
Figure 6:
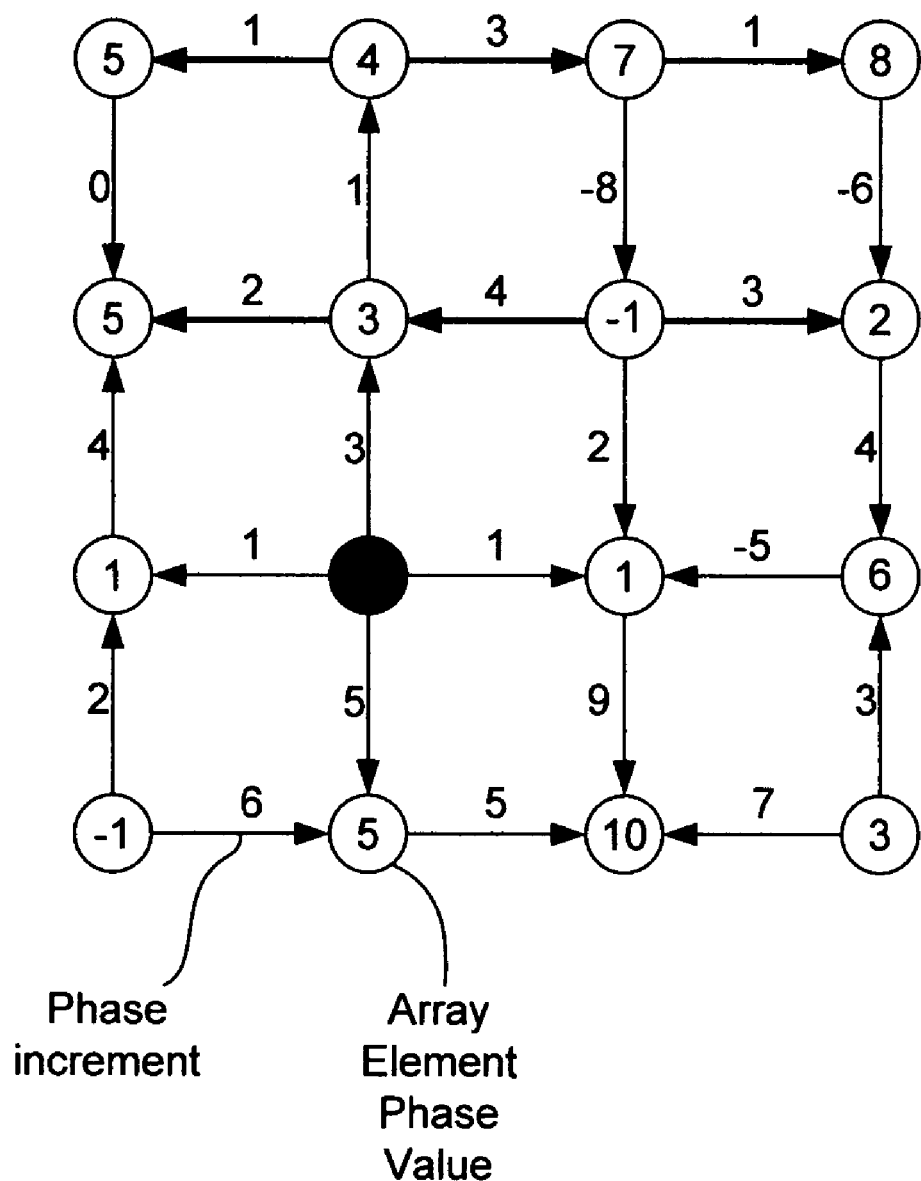
FIG. 6 is a nodal mesh depicting the curl-free nature of the geometry phase map.

Based on the governing phenomenology discussed above, there are four primary methods for separating the geometry phase component of the signal from other components in this phase map; these methods are: phase differencing, solution of subarray equations, direction of arrival estimation, and filtering. For the single target case, phase differencing exploits the fact that geometry phase is a spatially non-common mode quantity for all elements of the array and can be measured easily. A single element of the array can be chosen as the element corresponding to a reference phase datum and the total phase value associated with this element can be subtracted from all other elements, thereby suppressing spatially common mode phase components among elements of the array. The abstracted, notional process for removing common-mode phase components in an array and then scaling the phase is depicted in FIG. 5. The process is the same for both one- and two-dimensional arrays. In the two-dimensional array, the directed graph of differential phases that results from this differencing process permits construction of the geometry phase map across the array as shown in FIG. 6. In this figure, the black node denotes the arbitrarily chosen reference node and is assigned to be the phase datum with zero phase. The phase values of each node are depicted along with the directed graph of phase differences. A phase map that is absent noise contributions will exhibit zero curl as is represented in FIG. 6 (the sum of differential phases around each pane of the phase map is zero).

Alternatively, for the case of a single target, one could resort to squaring the received signal as was done in the hardware implementation in the paper by H. Nebiya and N. Hasebe, "A Narrow Element Spacing Array Antenna with Level Sensitive Frequency Multipliers."

A means conceived for dealing with the multi-target case requires solving for the geometry phases based on using subarrays. The case of multiple targets creates substantial complexity so that the geometry phase, defined in the context of individual targets, is no longer directly accessible. For the nth element of the array, impinged by radiation from P targets, the received signal takes the form:

$$x_n = \sum_{i=0}^{P} A_i(t) e^{j2\pi f_0(t+\tau_n)} + N_n(t)$$

With N the noise contribution and $$\tau_n(\theta_i) = \frac{d}{c}(n-1)\cos(\theta_i)$$

d is the element spacing and $\theta_i$ is the angle of arrival for the nth target For the case of two coherent targets:

$$x_n = A_1 e^{j2\pi f_0(t+\tau_1)} + A_2 e^{j2\pi f_0(t+\tau_2)} + N_n(t) = e^{j2\pi f_0 t}(A_1 e^{j2\pi f_0 \tau_1} + A_2 e^{j2\pi f_0 \tau_2}) + N_n(t) = S_n e^{j2\pi f_0 t} + N_n(t)$$

where $S_{n1}$ is the complex amplitude having the following in-phase and quadrature components:

$$Re\{S_n\} = A_{n1}\cos(\phi_1) + A_{n2}\cos(\phi_2) + N_{n,\text{in-phase}}$$

$$Im\{S_n\} = A_{n1}\sin(\phi_1) + A_{n2}\sin(\phi_2) + N_{n,\text{quadrature}}$$

$$\phi_1 = 2\pi f_0 \tau_1$$

$$\phi_2 = 2\pi f_0 \tau_2$$

where $\phi_1$ and $\phi_2$ are the "geometry phases" corresponding to delays $\tau_1$ and $\tau_2$ for targets 1 and 2, respectively.

The complex amplitude can be low pass filtered to a) diminish noise content and b) emphasize that portion of the phase modulation spectrum associated with geometry variation. The assumption is that the complex amplitude is retrieved post demodulation or pulse compression.

For example, when reducing element spacing d by a factor of 2, it is necessary to double the resulting values of the geometry phase $\tilde{\phi}_i$ in order for the initial geometry phase to remain invariant to such change as suggested by the following equation for the real component of the signal received at an arbitrary array element:

$$Re\{S\} = A_1\cos(\tilde{\phi}_1) + A_2\cos(\tilde{\phi}_2) + N_{1,\text{in-phase}} = A_1\cos(2\phi_1) + A_2\cos(2\phi_2) + N_{1,\text{in-phase}}$$

Given integer scale factors and an estimate of the number of targets (obtained by subspace or other estimation means), sets of transcendental equations can be solved for the geometry phases and amplitude weights by subsampling the array. As the scale factor increases so also will the order of the equations; as the number of targets increases, the number of the equations in the set to be solved increases.

The following example addresses the determination of the geometry phases for two targets by solving the complex amplitude equations at single element spacing (a subarray spacing) and at the double element spacing:

Four equations in four unknowns result. The sample taken at single element spacing is:

$$Re\{S1\} = A_1\cos(\phi_1) + A_2\cos(\phi_2)$$

$$Im\{S1\} = A_1\sin(\phi_1) + A_2\sin(\phi_2)$$

and the sample taken at double element spacing is:

$$Re\{S2\} = A_1\cos(2\phi_1) + A_2\cos(2\phi_2) = A_1[\cos^2(\phi_1) - \sin^2(\phi_1)] + A_2[\cos^2(\phi_2) - \sin^2(\phi_2)]$$

$$Im\{S2\} = A_1\sin(2\phi_1) + A_2\sin(2\phi_2) = 2A_1\sin(\phi_1)\cos(\phi_1) + 2A_2\sin(\phi_2)\cos(\phi_2)$$

Upon determination of the geometry phases, these phases may be scaled in correspondence with the array geometry scaling, and then beamforming may be performed with the updated data samples.

The third approach that can be employed to determine the geometry phase of targets is that of direction of arrival (DOA) estimation. The prior art is replete with various approaches to DOA processing as discussed below. This approach results in an estimation of target angles of arrival (and hence target geometry phases) given corrupting influences such as noise and interference. However, accurate estimation relies on exploiting maximum array resolution and hence maximum array size. An a priori reduction in array size does not favor such accuracy. Nevertheless, it is an option to be use with reduced array sizes. Further, DOA estimation can be used with an initial array size that can be subsequently reduced after GPP. Alternatively, DOA estimation-based GPP may be used iteratively with GSP to either reduce array size while substantially maintaining array resolution or to fix array size while increasing array resolution.

The final category of phase extraction disclosed is that of filtering approaches that can be either parametric or non-parametric in nature. An example non-parametric filtering scheme would comprise bandpass filtering the signal to extract the geometry phase component, whereas a parametric scheme might exploit a filter model based on the phase trajectory of anticipated target (or transmitter platform) dynamics. Also, the filtering of the phase map can be conducted jointly in time and space for both one-dimensional and two-dimensional arrays for extraction of the geometry phase.

ii) Geometry Scaling

Given a set of uniform set of sensor array weights of size N, where N is an odd integer:

$$w_n = \begin{cases} 1, & |n| \leq N_{1/2} \\ 0, & |n| > N_{1/2} \end{cases}$$

the aperture smoothing function is computed as $$W(k) = \sum_n w_n e^{jknd} = \frac{\sin\frac{kNd}{2}}{\sin\frac{kd}{2}}$$

where W(k) is periodic in k equaling $2\pi/d$. The first zero of W(k) occurs when $k=2\pi/Nd$. Thus the mainlobe width is $4\pi/Nd$ and decreases as the number of sensors increases (holding the interelement spacing constant)) or as the interelement spacing increases (for a constant number of sensors). This array resolution for a given aperture size is governed by diffraction (established by the Fourier transform relationship between the aperture function and the far field). The present invention does not violate the diffraction principle in the context of receive arrays because it is basically a new form of aperture synthesis. A smaller mainlobe width is achieved using the same physical aperture size as a conventional array because the aperture size of the present invention is really of larger effective size than the conventional array of the same physical size. This is achieved by lateral scaling of the aperture phase map. The received energy is characterized by the plane wave angle spectrum (associated with the geometry phase) of the multiple remote radiating sources. It is this plane wave angle spectrum that is measured as an aperture phase map by the array. A simple change of variable for the coordinate systems illustrates the equivalence between increasing the coordinate scale (reducing array size) and scaling the phase map (laterally compressing the coordinate-dependent aperture phase information). As discussed before, reducing the physical array size by a factor of M, but maintaining an invariant array resolution, would correspond to scaling the inter-element phase gradients by a factor of M greater than one. The factor M, which is not limited to integer values, can be less than one, as well, corresponding to a dilation of the array. Increase of array size can be useful for mitigating element coupling, as will be discussed below.

A constant factor M can be applied if the geometry phase is not a function of frequency. This would occur for a radiation geometry that is stationary or very slowly varying, i.e. if there were little, or no, relative angular motion between the remote energy source (communications transmitter or radar target) and the receiver array axis. As stated, in general, the geometry phase will be slowly varying and hence a narrowband process relative to the carrier frequency.

Nevertheless, this implies that the scaling factor will be a linear function of frequency whether applied at the carrier frequency, IF, or baseband. The following equation governs the geometry scaling of phase over the geometry phase bandwidth:

$$\hat{\Phi}_g(f) = M \frac{f}{f_c} \cdot \Phi_g(f) \leftrightarrow \hat{\varphi}_g(t) = \tilde{M} \frac{\partial \varphi_g}{\partial t}$$

where $\Phi_g(f)$ is the baseband frequency spectrum of the geometry phase and $\hat{\Phi}_g(f)$ is the spectrum modified by linear scaling with frequency. M is the scaling associated with the center frequency $f_c$ of the geometry phase band. This corresponds to scaling by the constant M and temporal differentiation of the time domain phase geometry phase function. Hence, GSP can be carried out in either the frequency or time domain. Implementation-dependent numerical error will dictate in which domain this should be conducted. The temporal derivative of the geometry phase can be approximated by high order differences, but will require batch processing of a correspondingly greater number of time samples of the array data. Given the requirement to perform geometry phase extraction prior to geometry phase scaling, it is preferred to carry out this process at baseband. For stationary geometries or very slowly varying geometries, the phase scaling is independent of frequency and phase may be scaled by the constant M.

Figure 7:
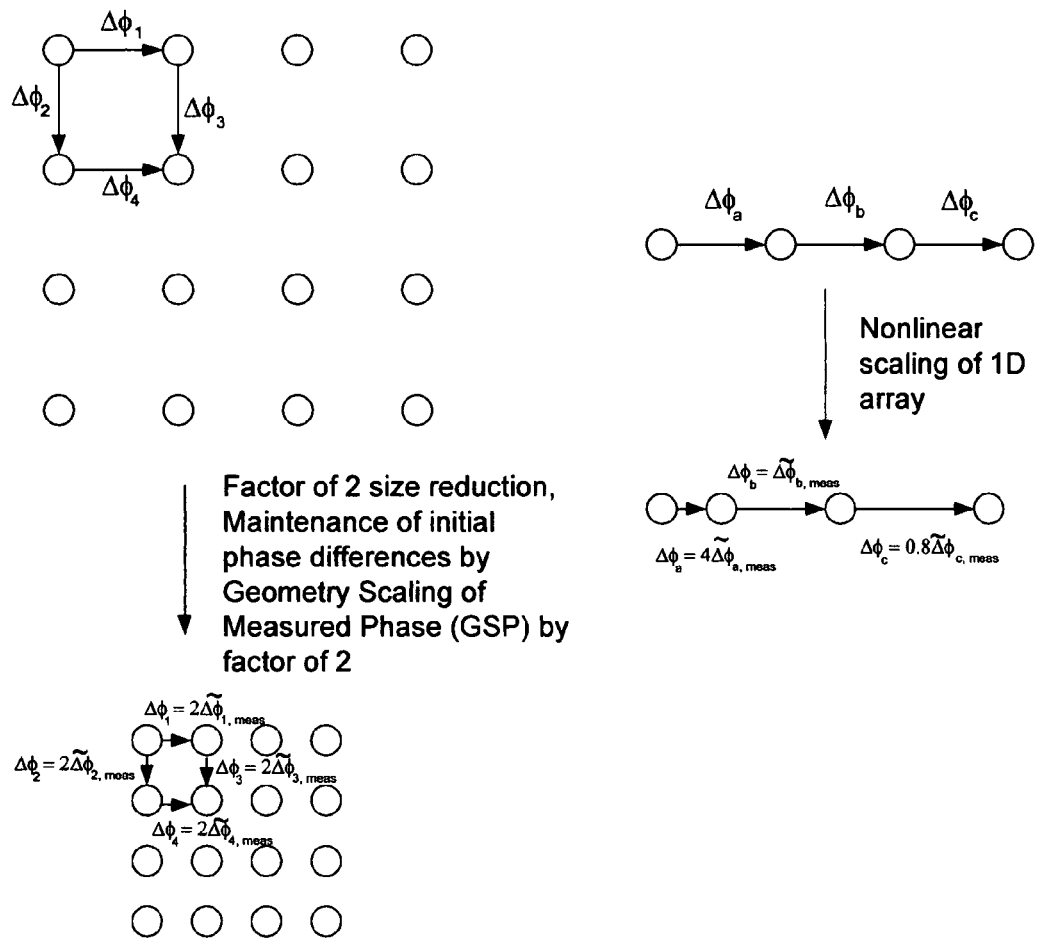
FIG. 7 is a pictorial diagram of geometry scaled arrays.

Nonuniform scaling of the array geometry will dictate corresponding nonlinear scaling of interelement phase gradients. This implies that M will be a variable that is spatially dependent across the array geometry. It may be desirous to differentially scale the two axes of an array or to perform a nonlinear scaling as a function of lateral spacing that facilitates element placement on a supporting structure. Also, nonuniform scaling can be used to create a nonuniform array of physical elements that are uniformly spaced. FIG. 7 depicts two examples of array scaling, uniform scaling of a two-dimensional array and nonlinear scaling of a one-dimensional array.

An additional consideration regards GSP in the context of a beamformer that generates multiple receive beams. Under certain conditions it might be desirable to generate such beams with different beamwidths (associated resolution) by using a different factor for scaling the phase before beamforming.

Figure 8:
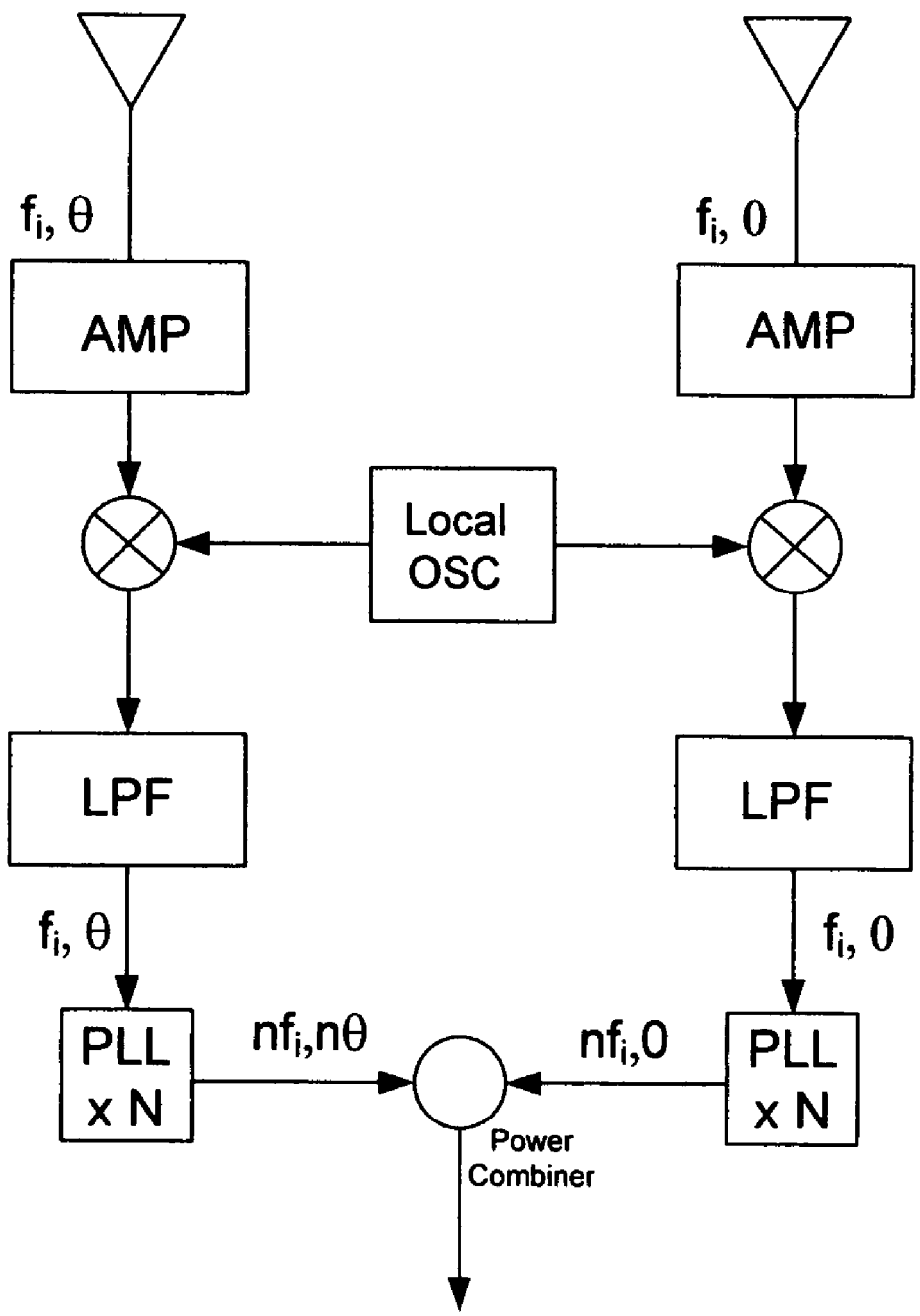
FIG. 8 is a diagram of a circuit that implements analog geometry phase scaling.
Figure 9:
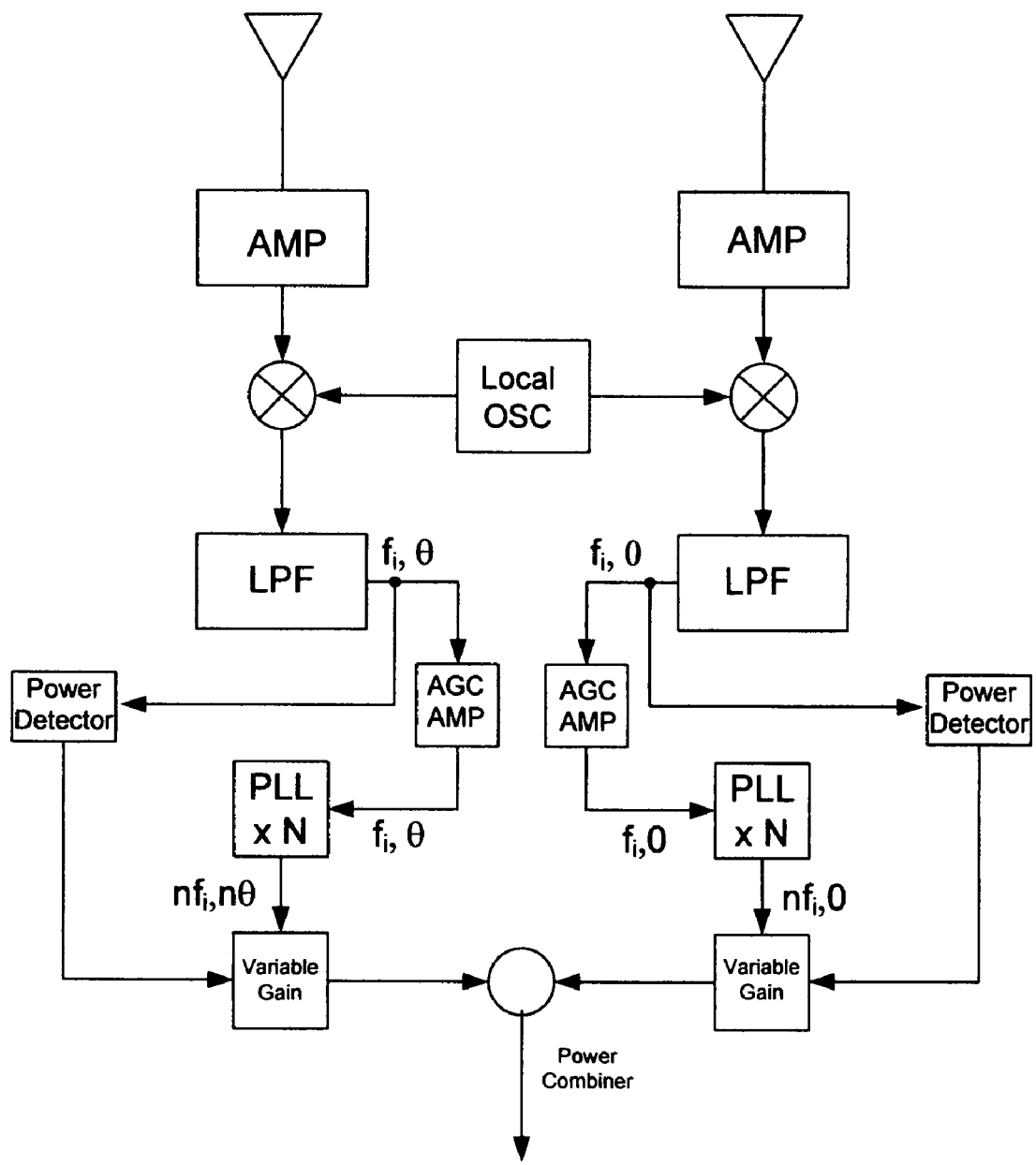
FIG. 9 is a diagram of a circuit that implements analog geometry phase scaling with level tracking.

Given a specified scaling of the array geometry, there are electronic and digital signal processing methods to achieve corresponding scaling of the geometry phase prior to processing for either beamforming or DOA processing. The frequency multiplier methodology described in the paper by H. Nebiya and N. Hasebe, "A Narrow Element Spacing Array Antenna With Level Sensitive Frequency Multipliers," can be employed as a brute-force means of electronic phase scaling. The method is provided schematically in FIG. 8. The IF signals from each array element are raised to the nth power corresponding to an array size reduction factor n. In this way, the phase is multiplied by the factor n, as is the IF frequency. Phase locked loops (PLLs) with dividers in the feedback path of the loop provide this signal multiplication. PLL configurations are achievable that will permit n to be greater than or less than one. The authors also include signal amplitude tracking with this PLL scaling circuit in order to permit the use of array elements exhibiting other than isotropic antenna patterns as addressed by the system configuration of FIG. 9. In contrast to the authors' statement that this overall approach to array scaling cannot be used with signals having phase modulation, the present invention permits the use of such scaling with signals of arbitrary modulation, by scaling only the narrowband geometry phase component of such signals.

Figure 10:
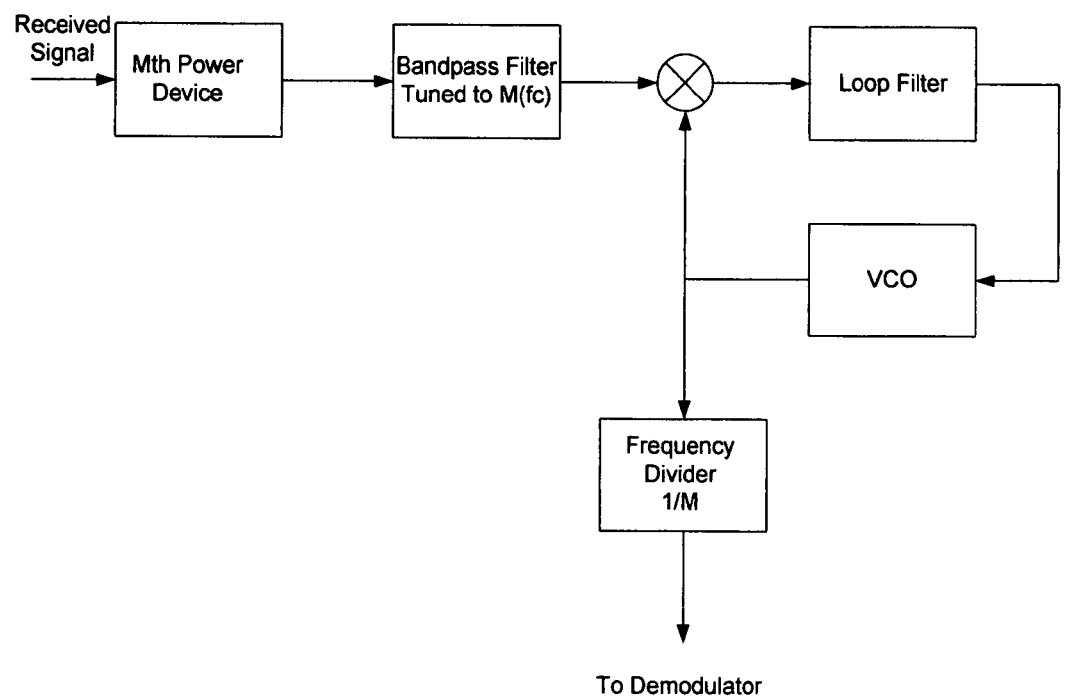
FIG. 10 is a functional block diagram of circuitry to perform carrier recovery for signals of mth order phase shift keyed.
Figure 11B:
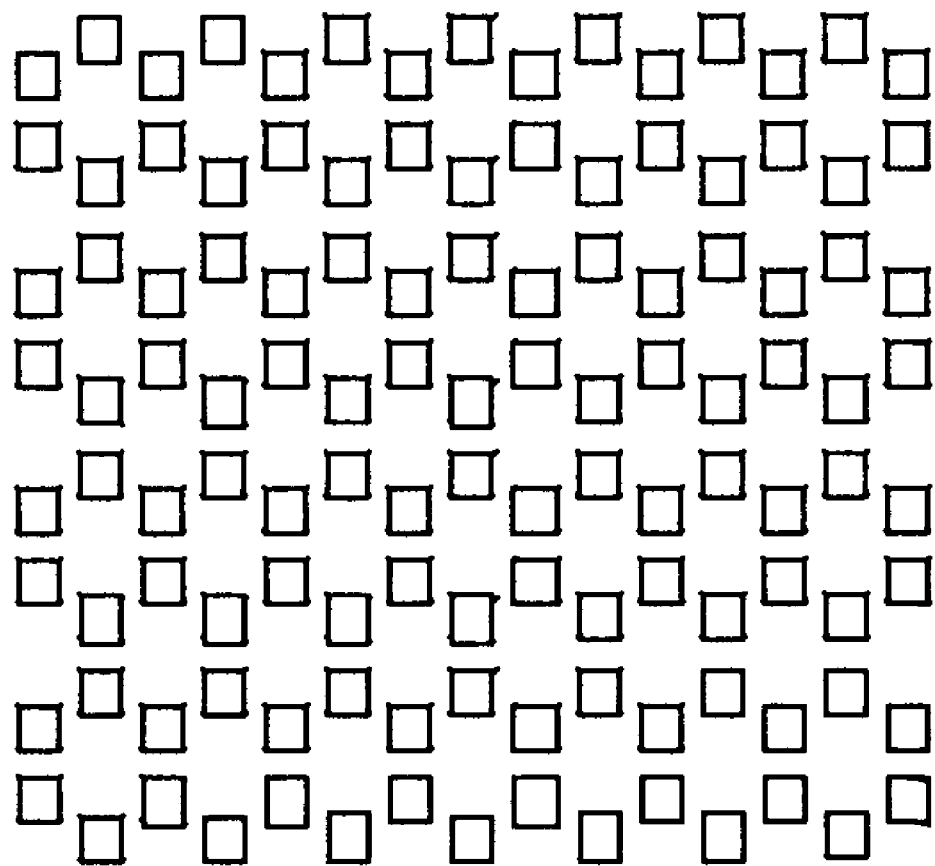
FIG. 11b is an hexagonal close-packed two-dimensional array geometry.
Figure 11C:
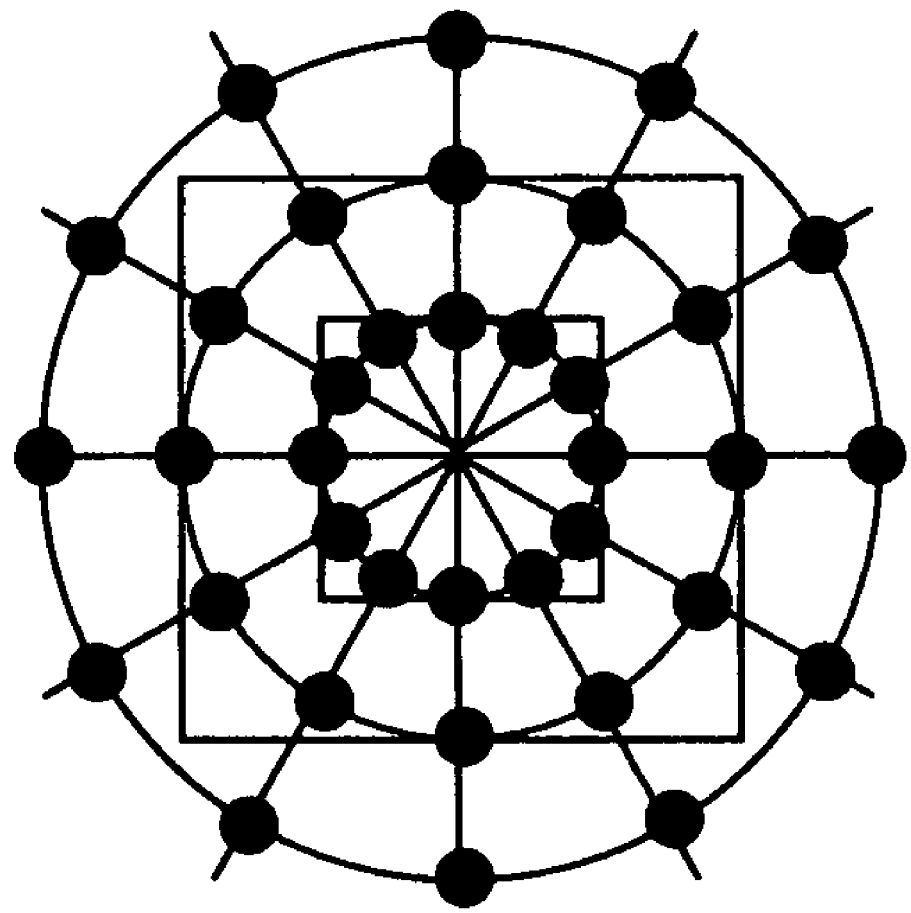
FIG. 11c. is a two-dimensional array geometry comprising concentric circular subarrays.
Figure 11D:
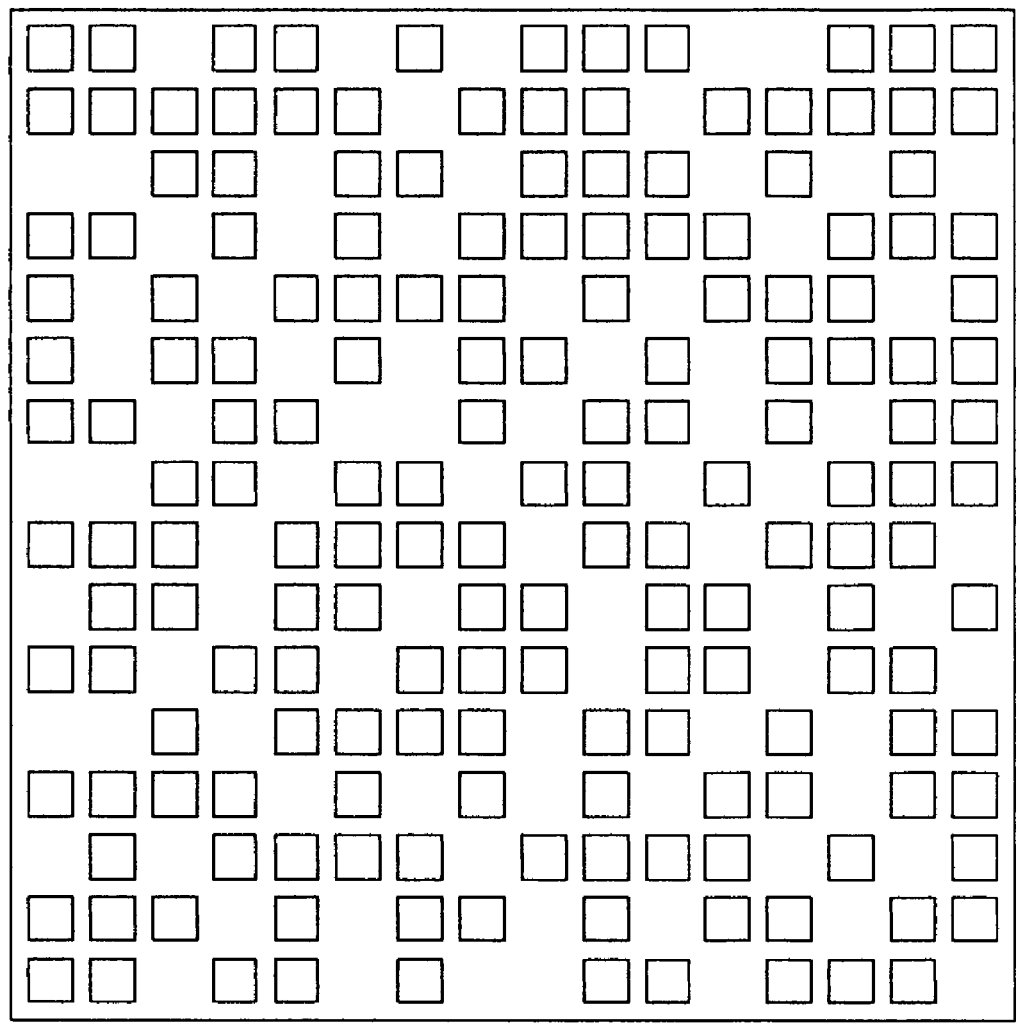
FIG. 11d is a sparsened two-dimensional array geometry.

With respect to arbitrary forms of signal modulation that may be encountered in communications systems, there exist a wide range of prior art schemes for carrier recovery corresponding to these modulation formats. Given that the geometry phase is inherently low bandwidth, it will contribute sidebands close-in to the carrier signal and can be retrieved along with carrier recovery. When M-ary phase modulation of the carrier is employed, a phase locked loop (PLL) may be used to estimate the carrier phase offset. For BPSK (M=2), a squaring loop and Costas loop can be employed. When M>2, an Mth power device is used as depicted in FIG. 10. Related to this method is that disclosed by L. DiDomenico and G. M. Rebeiz, "Digital Communications Using Self-Phased Arrays," IEEE Transactions on Microwave Theory and Techniques, Vol. 49, No. 4, April 2001, pp677-684. This paper is hereby incorporated by reference thereto. Additionally, other forms of signal transmission including multicarrier orthogonal frequency division multiplexing (OFDM) with either AM, FM, or QAM subcarrier modulation can be exploited by the present invention. In this context, the geometry phase can be obtained from a single subcarrier or pilot, or can be obtained by further down the processing chain in an OFDM receiver upon demodulation. Frequency hopping systems will require demodulation to efficiently recover geometry phase information.

A preferred method of geometry phase scaling is achieved by numerical multiplication in a DSP. Because the geometry phase is a low frequency process, analog-to-digital converter (A/D) speeds are adequate to provide the sampling rates required for accurate geometry phase processing if done at baseband or possibly at the IF. Digital circuit technology is advancing sufficiently that soon DSP will be possible at RF speeds. An example of this is the superconducting logic developed by HYPRES that permits A/D clock speeds of several hundred MHz.

C) Array Formation i) Array Geometries, Steering Vectors, and Array Calibration

As depicted in FIGS. 11a through 11d, the present invention can be applied to arbitrary array geometries to include regular and irregular one-dimensional, two-dimensional, and three-dimensional (conformal) geometries. Such arrays may or may not exhibit axes of symmetry and can have a pseudo-random arrangement as in the sparse array of FIG. 11d.

The steering vector corresponds to the array response to radiation from a point target (or remote communications transmitter) at a specified azimuth and elevation angle and with a specified instantaneous Doppler frequency corresponding to the target's radial velocity. It is an important vector quantity that is required in computation of the target detection statistic, as is well known in the prior art. For a uniform linear array comprising J elements, the steering vector takes the following form $$e = e^{j2\pi n f_{td}} e(f_{ts}) = e^{j2\pi n f_{td}} \left( \frac{1}{\sqrt{J}} \right) [1 e^{j2\pi f_{ts}} \ldots e^{j2\pi (J-1) f_{ts}}]^T$$

where the normalized target Doppler frequency $f_{td}$ shift is given $$f_{td} = \frac{2[v_t + v_p \cos(\theta_t) \sin(\phi_t - \gamma)]}{f_{PRF} \lambda_c}$$

with the number of array elements J, target radial velocity $v_t$, receiver platform velocity $v_p$, target azimuth angle $\phi_t$, target elevation angle $\theta_t$, receiver platform crab angle $\gamma$, radar pulse repetition frequency $f_{PRF}$, with radiation wavelength $\lambda_c$ and where the normalized target spatial frequency $f_{ts}$ is given by $$f_{ts} = \frac{d}{\lambda_c} \cos(\theta_t) \sin(\phi_t)$$

In the context of the present invention, d is the array inter-element spacing corresponding to the effective array size, rather than the physical array size.

The steering vector can be generalized to the case of non-uniform linear arrays, uniform and non-uniform two-dimensional arrays, and three-dimensional conformal arrays. In all cases, the steering vector will be a function of the inter-element spacings and for the scaled arrays of the present invention, these spacings must be those of the desired effective array geometry.

Finally, the prospect for physical adaptation of the array exists through use of array elements that can be "turned on or off." When turned off, an element would be transparent (i.e. non-scattering). A current example of a technology that will enable this function is that of plasma antennas. This technology and its implications for the present invention will be discussed in greater detail below. The ability to turn array elements on and off in this way, opens up new radar processing avenues.

Sparse arrays are antenna arrays that originally were adequately sampled, but where several elements have been removed, a process called thinning, which results in the array being undersampled. Such undersampling, according to sampling theory, creates aliasing. In the context of discrete spatial sampling, this is referred to as grating lobe formation. In any case, this results in unwanted energy in the sidelobe region. Motivation for using sparse arrays is primarily one of economy. In the discussion below regarding the concept of virtual arrays, an aspect of the present invention permits sparse arrays to be made full by a processing methodology.

ii) Mutual Coupling and Its Mitigation

Mutual coupling arises due to the re-radiation of the incident fields by the elements of the array. A similar effect is caused by objects in the near field of the array. Mutual coupling can lead to significant array performance degradation, notably distortion of the beamforming process and reduced ability of the array to suppress interference. The ability provided by the present invention to reduce the size of a given array while maintaining the resolution of the array, comes at the price of increased mutual coupling that attends closer placement of array elements. Fortunately, there are recently-developed, robust means of compensating mutual coupling.

There are a number of processing-based methods for eliminating or compensating the effects of array mutual coupling. The basis for these methods is electromagnetic modeling of the array response so as to incorporate the scattering behavior of the elements. The paper by R. S. Adve and T. K. Sarkar, "Compensation for the Effects of Mutual Coupling on the Performance in Adaptive Algorithms," IEEE Transactions on Antennas and Propagation, Vol. 48, No. 1, pp. 86-94, January 2000 introduces the use of a method of moments formulation for compensation of mutual coupling. This method is extended to the case of arbitrary-shaped elements of arbitrary configuration by the minimum norm technique described in chapter five of the book by T. K. Sarkar, M. C. Wicks, M. Salazar-Palma, and R. Bonneau, "Smart Antennas," John Wiley & Sons, Inc., N.J., 2003.

Another strategy for addressing the issue of mutual coupling is to reduce the level of coupling through hardware design. Candidate hardware approaches include using antenna elements that exhibit reduced near field extent. Antenova has developed elements that indeed exhibit spatially diminished near fields and the reduced coupling this implies. Another direction involves creation of physically small elements that are electrically long (exhibiting the same impedance and radiation efficiency of larger elements). The University of Ohio and Michigan State along with Harris Corporation under DARPA direction have been fabricating such antenna elements through the development of metamaterials compositions for the antenna elements.

At some point, reduction in array size implies reduction in the physical size of array elements. The aforementioned work exploiting metamaterials seeks to achieve antenna element sizes on the order of □/10 to □/100 that will exhibit the same impedance and radiation behavior of □/2 length elements. Significant progress has already produced size reduction factors of 6 for implementations at certain wavelengths.

It is possible to space array element at physical separations that provide little mutual coupling and to use GPP to create an array with much smaller effective element separations, but without the corresponding level of mutual coupling. Further, it is possible to create an effective dense sampling of the aperture (spacings significantly less than lambda/2) that avoids mutual coupling and multiple scattering and permits the use of signal processing strategies not otherwise possible. Also, an oversampled aperture emphasizes correlation among signals (multipath from differing angles of arrival becomes decorrelated as element spacing increases beyond several wavelengths).

Array Calibration and Steering Vector Estimation

As with conventional antenna arrays, array calibration is critical to achieving maximum performance with respect to static and steered pattern distortion. Accurate array calibration is required prior to array scaling by means of the present invention.

iii) Virtual Arrays

Figure 12:
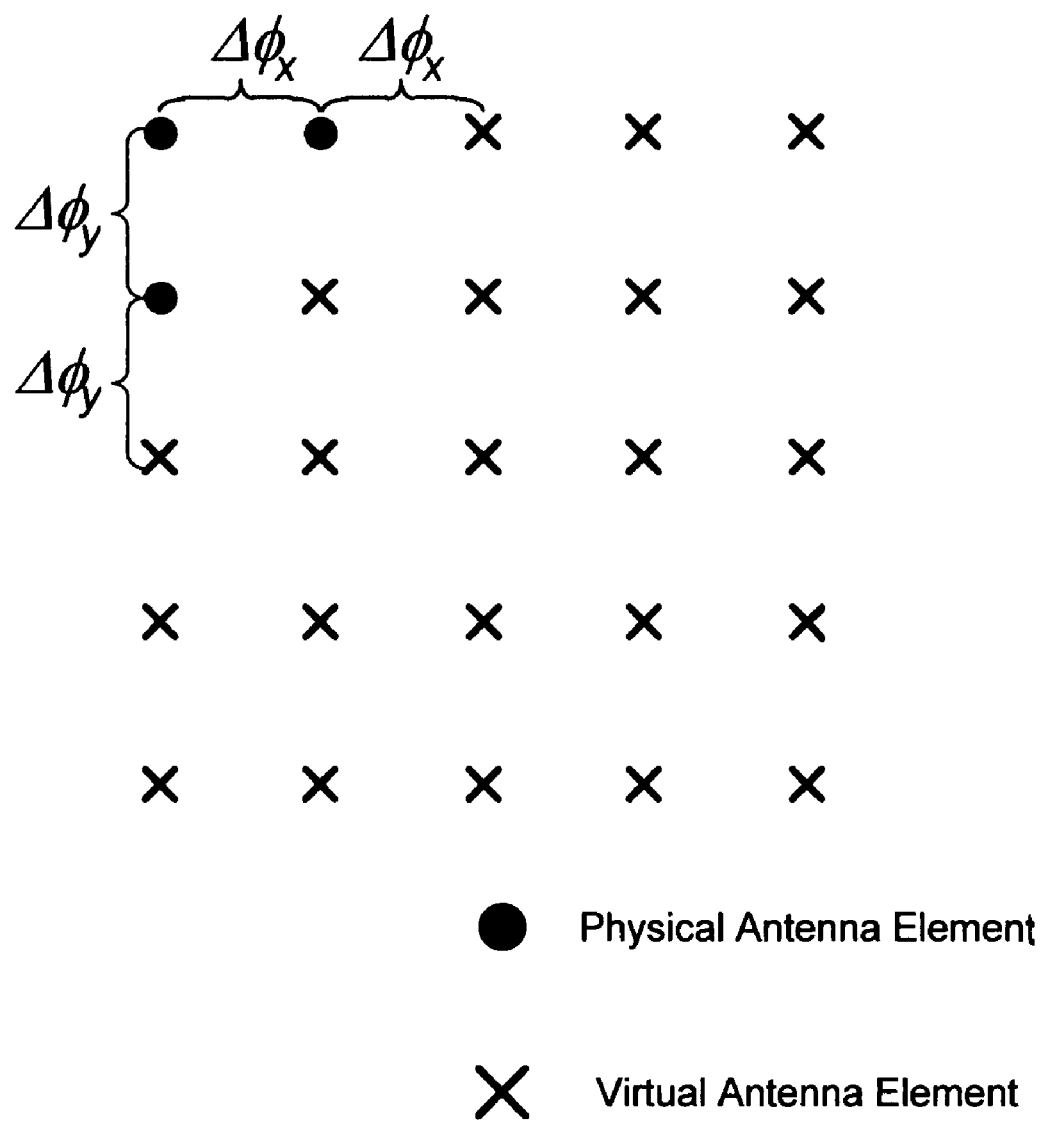
FIG. 12 is a pictorial diagram of the geometry of an array incorporating virtual array elements.

The present invention admits a new form of aperture synthesis that will be termed virtual array processing. The basic concept will be articulated for the one-dimensional embodiment first. The degenerate one-dimensional case comprises a two-element physical array. It is possible to process the signals received from these two elements so as to synthesize a response corresponding to an array comprising an arbitrary number of elements. Given that the two elements will exhibit a geometry phase difference, it is possible to assign multiples of this phase difference to virtual elements that occupy virtual locations that correspond to multiples of the separation between the two physical elements. This process can be extended to two dimensions for the degenerate case of three non-collinear physical elements as depicted in FIG. 12. Given three elements located at the vertices of a regular right triangle, a virtual rectilinear two-dimensional array of arbitrary size M by N can be synthesized. Non-regular geometries are also feasible by the appropriate non-regular scaling of the geometry phase for each element of the array. Further, a virtual array can be adapted so as to correspond to a time-varying array geometry. More sophisticated approaches can be taken to extrapolation of the geometry phase map for the purpose of creating a larger array with virtual elements. These approaches include estimation-based extrapolation or interpolation of the phase map which will naturally require greater processing effort.

Through virtual array processing, it is possible to form more than the conventional number of beams given an array comprising only two elements. There are limitations to the performance of arrays using virtual elements compared to their fully physical counterparts. First, there will be estimation error associated with the extrapolation of the geometry phase map, whether this is a simple nonparametric linear extrapolation of phase or an estimation-based approach potentially using all the physically-sensed phase values in the array to compute the geometry phase at virtual element locations. Additionally, some aspects of the radiation field that would be received by a physical array of size and element number corresponding to the virtual array cannot be replicated in the virtual array signal. For example, there will be limitations in fidelity of near field sources potentially important to sonar and acoustic applications (although range tracking of such sources can permit synthesis of appropriate focus terms). Of pertinence to communications applications, multipath spatial decorrelation among elements cannot be replicated and this is likewise the case for the spatially-dependent diffuse scattering response of the array. Nevertheless, many radar applications can exploit the implications of this concept not only for physical apertures but for synthetic aperture radar (SAR) and inverse synthetic aperture radar (ISAR), as well. A limitation that will be discussed below with regard to application of the virtual array to SAR and ISAR is that only broadside cross-range imaging is possible. Squint mode cross-range imaging requires target aspect angle information not available with virtual elements (or virtual arrays).

Figure 13:
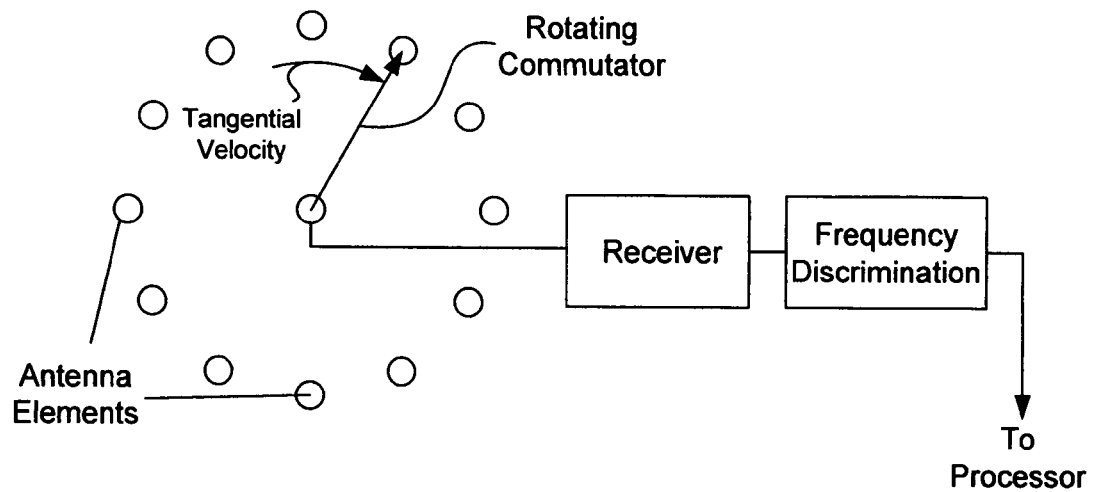
FIG. 13 is a diagram depicting the function of a pseudo-Doppler direction finder.
Figure 13:
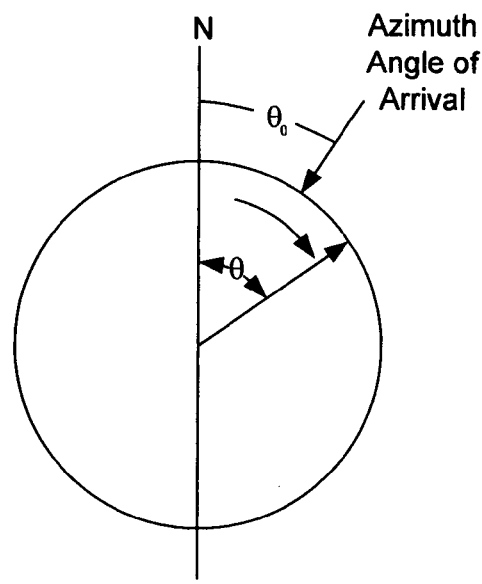

Another prospect for virtual array functionality is the creation of a virtual pseudo-Doppler direction finding (DF) capability. A conventional pseudo-Doppler DF array is depicted in FIG. 13. Array elements are arranged in a circular geometry and a commutator sequentially connects each element to a conductor at the centroid of the array. The output signal is characterized by frequency modulation that would have occurred due to Doppler shift of a received plane wave signal were the array in actual rotation about the centroid. The associated instantaneous frequency is given by $$f_{instantaneous} = \frac{v}{\lambda}\sin(\theta - \theta_0)\cos\alpha_0$$

where $v$ is the tangential velocity of the commutator at the radius of the circular geometry, $\lambda$ is the radiation wavelength, $\theta_0$ and $\alpha_0$ are the azimuth and elevation angles associated with the incoming radiation wavefront, respectively, of the remote source of radiation and $\theta$ is the instantaneous azimuthal position of the commutator. When $\theta$ is equal to $\theta_0$, there will be zero frequency shift. The azimuth angle ambiguity associated with the existence of two frequency zero crossings per commutator period can be resolved using the sign of the frequency shift.

Figure 14:
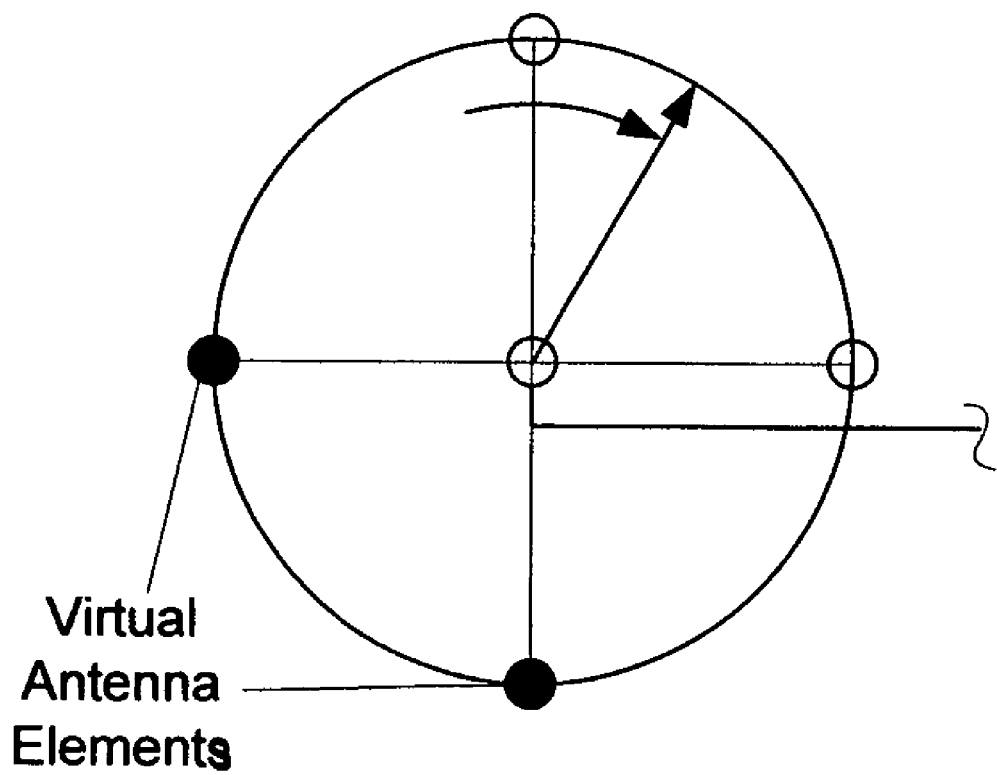
FIG. 14 is a diagram depicting the use of virtual array elements in a pseudo-Doppler direction finder.

Given a physical array of the three elements shown in FIG. 14, a square virtual array can be constructed and a corresponding commutator output calculated. The tangential velocity of the virtual commutator can be made large to improve estimation of the zero frequency crossing corresponding to the target azimuth angle in the presence of a fixed noise level.

D) Army Processing Architectures (Radar Emphasis)

In many conventional phased arrays, emphasis is upon spatial information processing for improvement of desired signal reception in the presence of interfering signals. If interference signals emanate from directions different from signals of interest, then the array can be used to introduce pattern nulls in those directions. An overall reception performance parameter such as signal-to-interference-plus-noise ratio (SINR) can be used to optimize signal reception and interference suppression. The basic configuration of a spatially adaptive array is provided in FIG. 15 wherein the array weights are adapted to minimize a cost function. A survey of adaptation algorithms is presented in the text by R. A. Monzingo and T. W. Miller, "Introduction to Adaptive Arrays," John Wiley & Sons, Inc., 1980, incorporated herein by reference thereto. Also, a survey of array processing algorithms is found in the paper by L. C. Godara, "Application of Antenna Arrays to Mobile Communications, Part II: Beam-Forming and Direction-of-Arrival Considerations," Proceedings of the IEEE, Vol. 85, No. 8, August 1997, pp.1195-1245, also incorporated herein by reference thereto.

A considerable number of array processing architectures have been formulated and reduced to practice. These architectures address variations in the encountered signal and interference environment. Aspects of such architectures discussed below include those that are narrowband, wideband, time domain-based, frequency domain-based, space-time-based, as well as architectures that perform sidelobe cancellation, use pilot signals, and invoke various adaptation algorithms.

The GPP and GSP methods of the present invention can be applied to the wide variety of sensor array processing architectures in two main ways. First, GPP and GSP can be applied to reconstitute the array data vector, typically at baseband, so that it contains principally only the geometry phase information. This data is then processed by DOA algorithms and/or beamformer algorithms. The other approach to application involves embedding GPP and GSP in the beamformer. The majority of processing architecture figures included in this disclosure refer to baseband representations of the signal.

i) Narrowband

Figure 15:
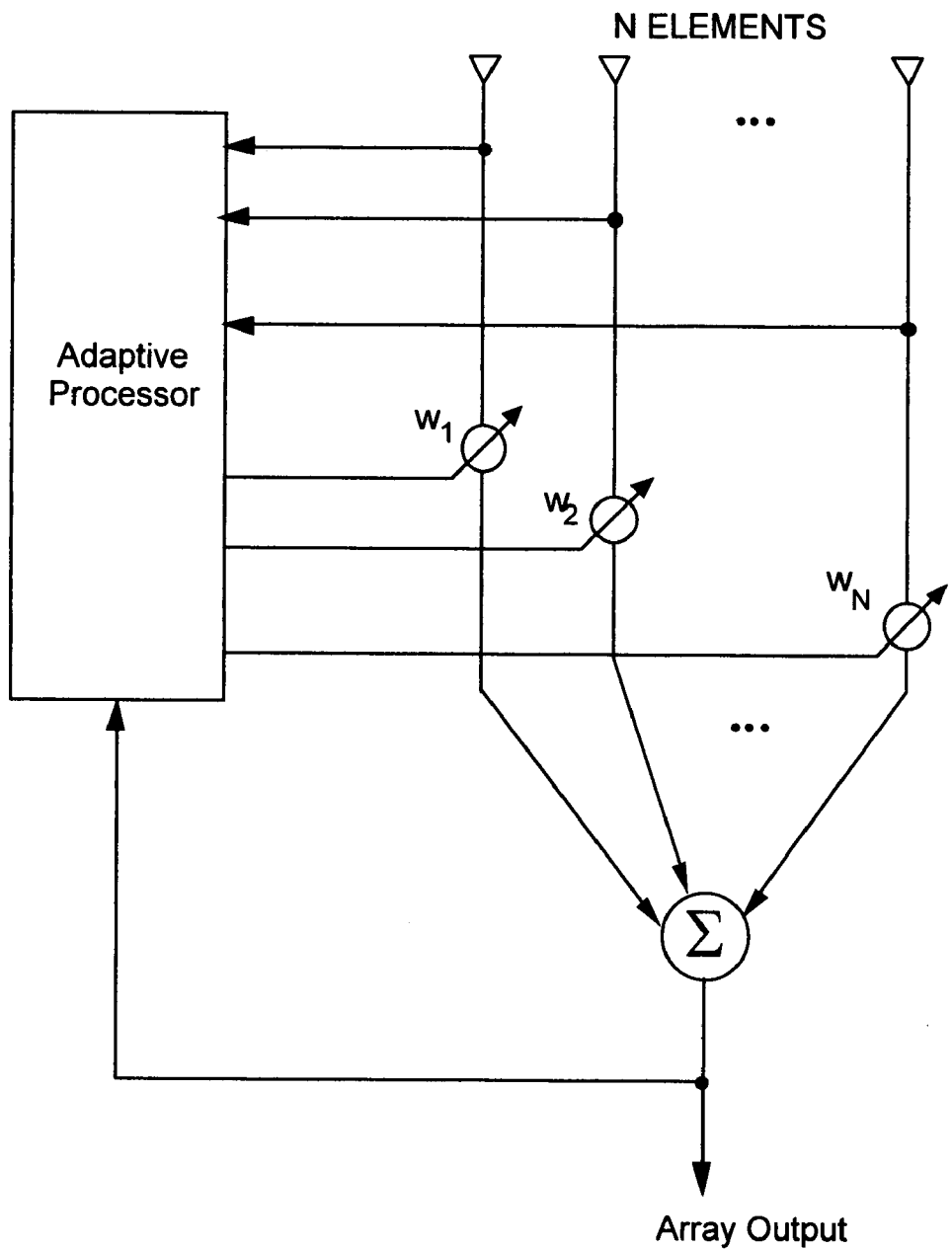
FIG. 15 is a functional diagram depicting a conventional adaptive array.
Figure 15A:
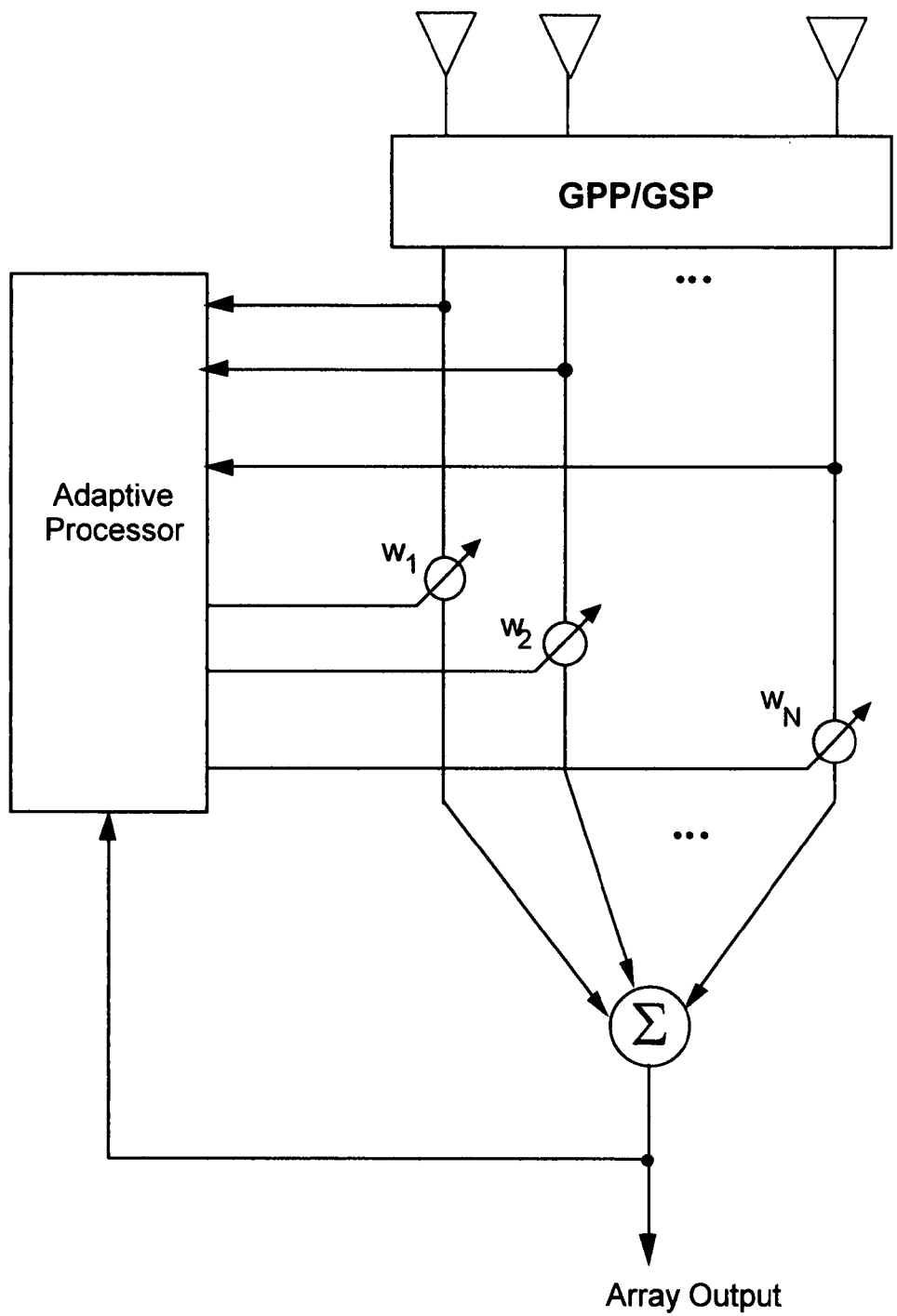
FIG. 15a is a functional diagram depicting the use of GPP and GSP in a conventional adaptive array.

The beamformer architecture depicted in FIG. 15, in which array weights are frequency-independent complex values, addresses beamforming and null steering for the case of narrowband signals and interference. FIG. 15a depicts the use of GPP and GSP in such a system.

ii) Broadband—Method to Circumvent Broadband Requirement

In the case of many radar applications, radar transmit waveforms are designed to be wideband for the purposes of achieving range resolution by pulse compression and/or for achieving low probability of intercept. Additionally, rotating, complex geometry radar targets can impart wideband modulation to reflected signals.

Figure 16:
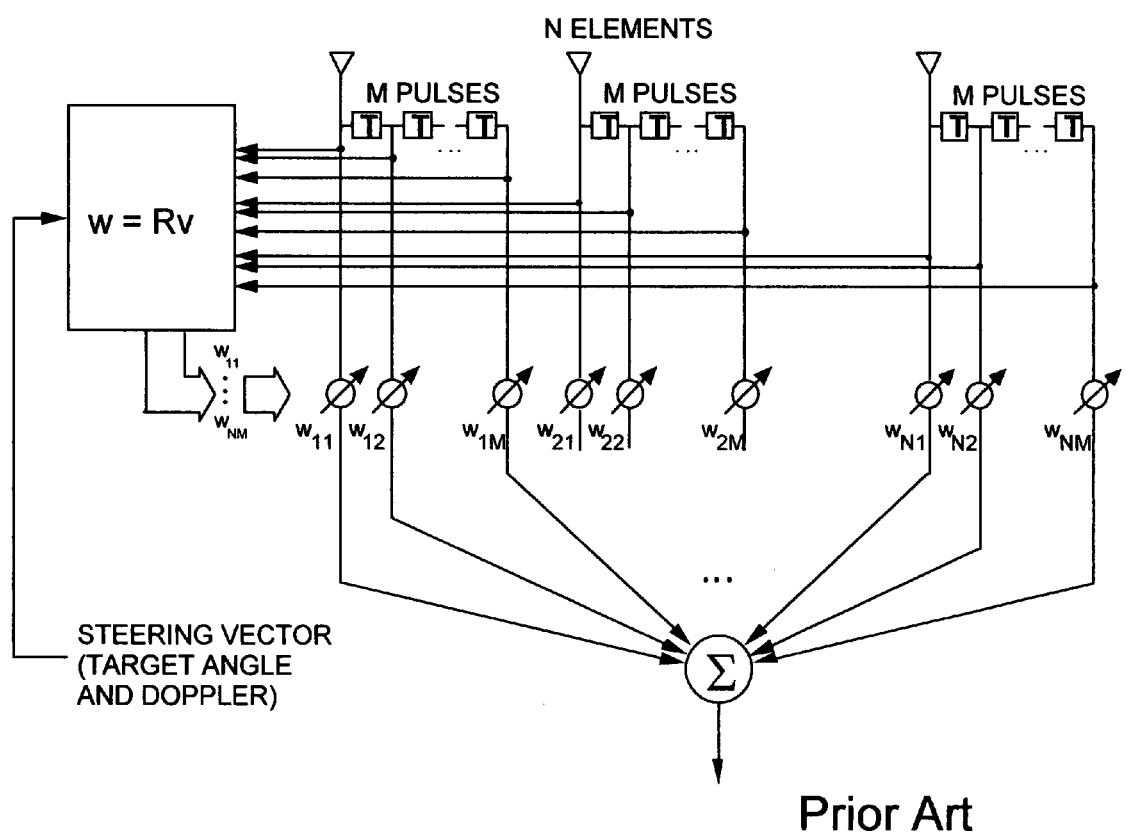
FIG. 16 is a functional diagram depicting a fully adaptive array.

The conventional wideband beamforming architecture is depicted in FIG. 16 in which each of the single-valued weights of the narrowband case are replaced with filter functions. In FIG. 16, each array element output is processed by a tapped delay line (transversal) filter with each tap weight comprising an adaptive value. The present invention facilitates the usage of the narrowband architecture as a baseline for wideband as well as narrowband signals and interference as the wideband case is handled after the fashion of FIG. 15a. This is possible given that the understanding that beamforming and direction finding processes need only operate on the geometry phase, an inherently narrowband process. Even when making the weights a function of the non-zero spectral bandwidth associated with the geometry phase, the resulting weight filter functions have a small, but non-zero bandwidth. This is a spectral spread dependence that is orders of magnitude smaller than that which is associated with conventional wideband beamformers. True time delay required conventionally to avoid beam squint is not necessary because directivity is governed by only the geometry phase.

iii) Frequency Domain Beamforming

In certain instances, performing conventional beamforming in the frequency domain rather than the time domain is advantageous. Using frequency domain techniques for sonar beamforming can reduce the amount of hardware needed. Although time-domain processing architectures offer flexibility, can work with non-equi-spaced array geometries, and are very efficient with arrays having small numbers of channels (ex. 128 sensors), they essentially exhibit an $O(N^2)$ process that becomes unwieldy with large arrays. Many sonar systems need to use spectral data. For example, in active pulse compression systems, the correlation processing is often conveniently carried out using fast frequency domain techniques and for passive systems data is usually displayed as a spectrum versus time (LOFARgram) plot for a number of look directions. In these types of system, it may be convenient to use frequency domain beamforming to avoid some of the time-frequency, frequency-time transformations that would be needed if time domain beamforming were used.

Figure 17:
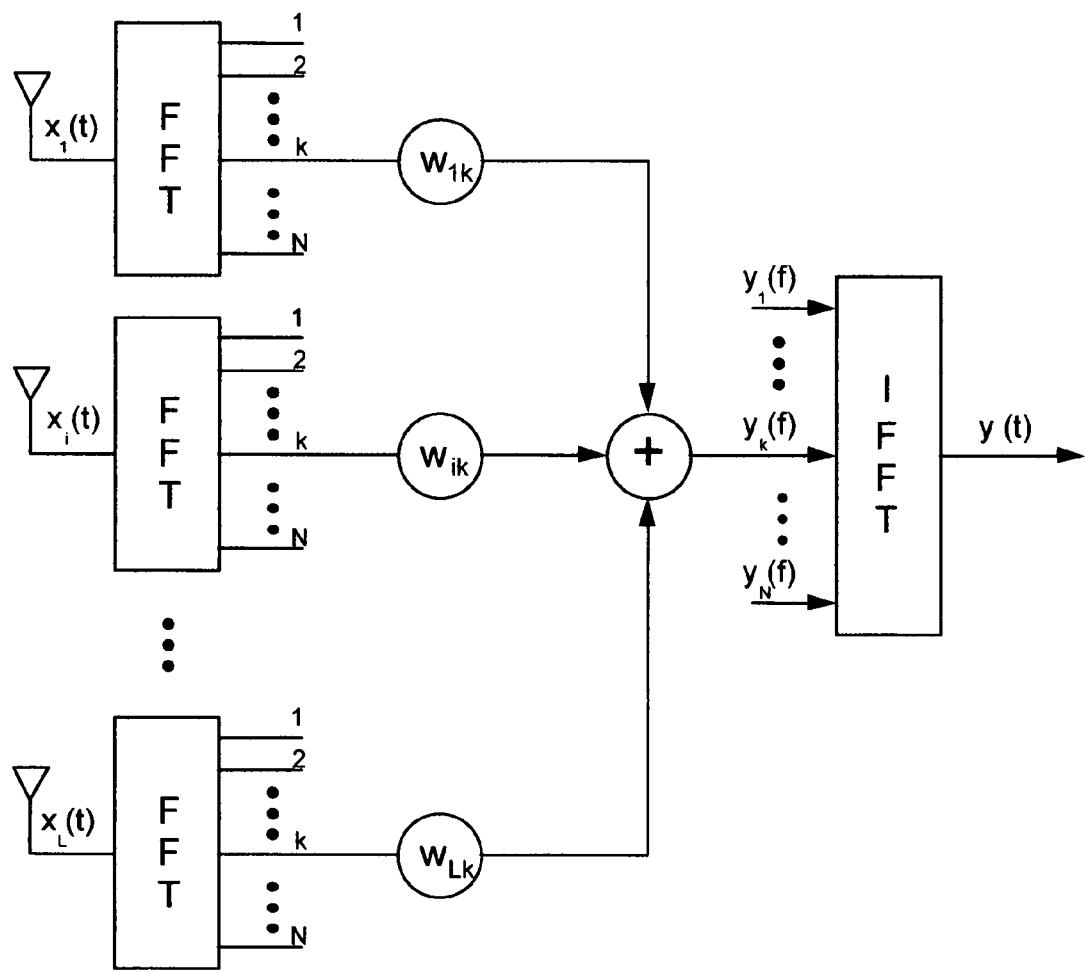
FIG. 17 is a functional diagram depicting frequency domain beamforming.

The general structure of a conventional frequency domain processor is shown in FIG. 17, where broadband signals from each element are transformed into the frequency domain using the FFT and each frequency bin is processed by a narrowband processor structure. The weighted signals from all elements are summed to produce an output at each bin. The weights are selected by independently minimizing the mean output power at each frequency bin subject to steering direction constraints.

Figure 17A:
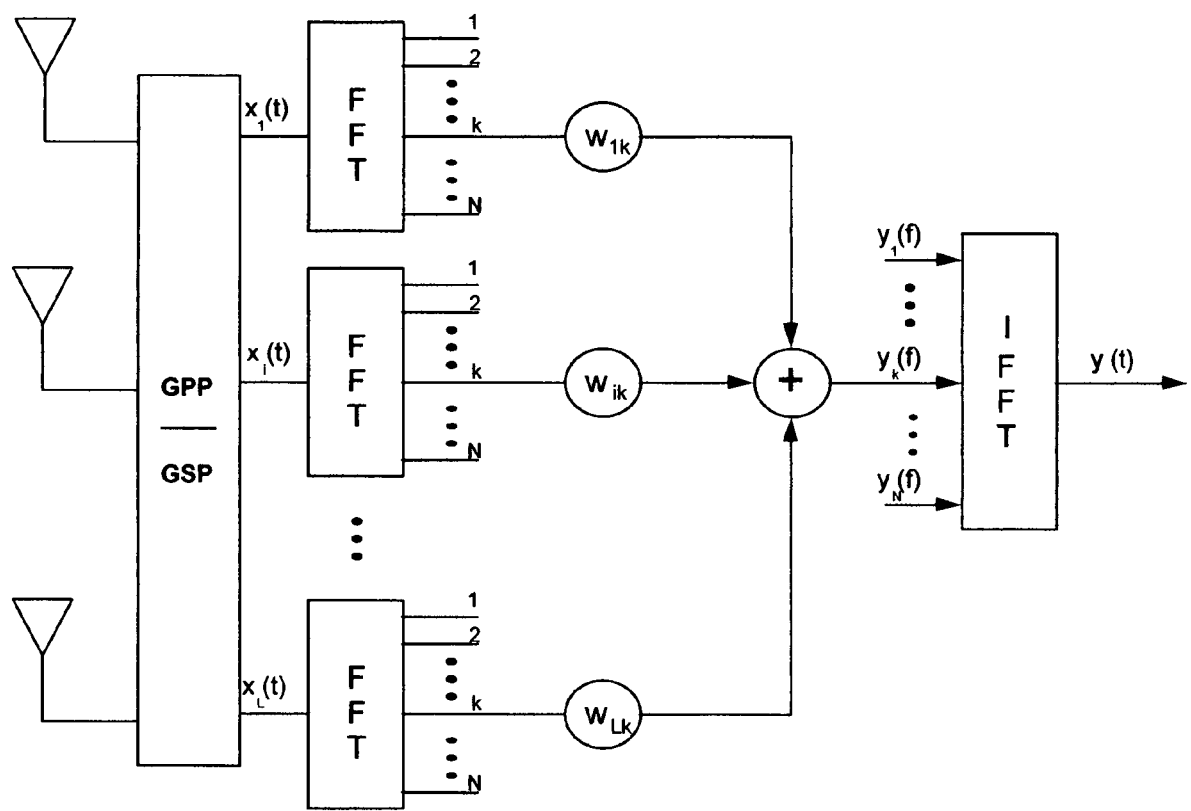
FIG. 17a is a functional diagram depicting the use of GPP and GSP with frequency domain beamforming.

Here again, the present invention through geometry phase processing obviates the necessity of wideband beamforming and undercuts the advantages of performing frequency domain beamforming. Nevertheless, the geometry phase scaling of the present invention can be applied to arrays exploiting frequency domain beamformers for the purpose of altering the effective array size. In the approach of FIG. 17a, the FFTs can be calculated for a much narrower bandwidth given the presence of GPP.

iv) Sidelobe Cancellers

Figure 18:
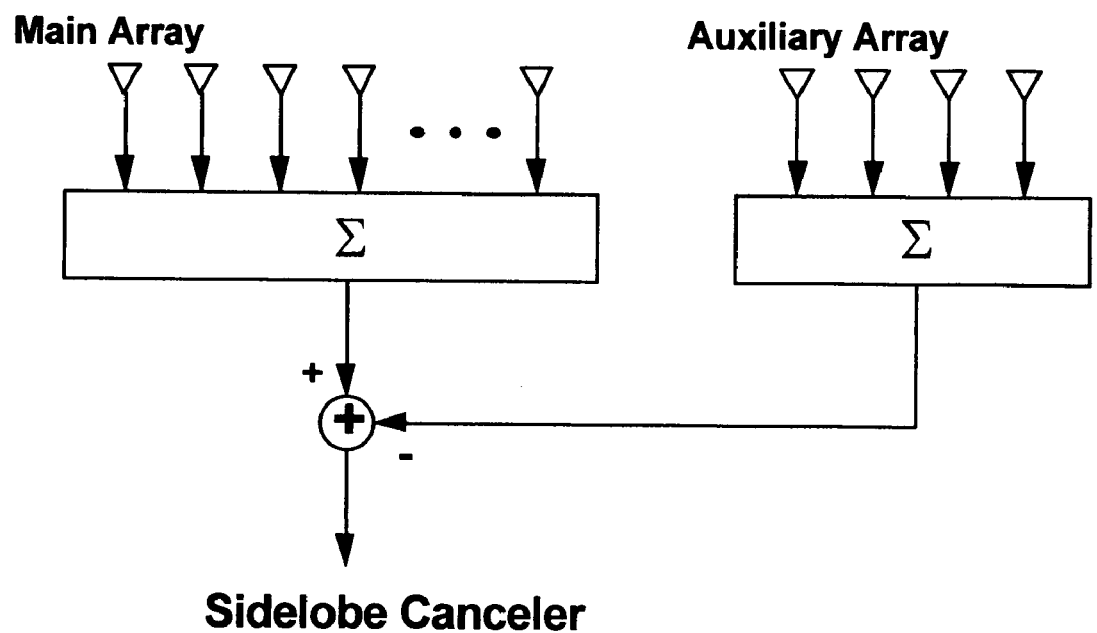
FIG. 18 is a functional diagram depicting a sidelobe canceler.
Figure 18A:
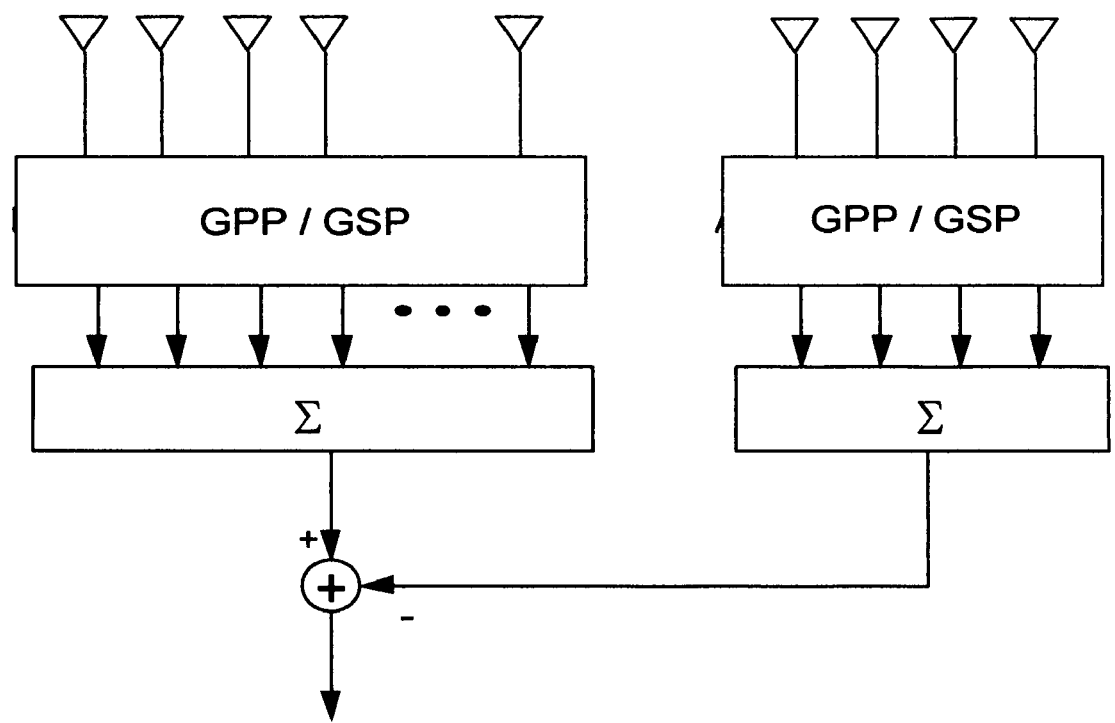
FIG. 18a is a functional diagram depicting the use of GPP and GSP with a sidelobe canceler.

Under the category of constrained optimization is an array signal processing architecture called the sidelobe canceller. As depicted in FIG. 18, a main array is augmented with an auxiliary array to cancel directional interference (e.g., jammers) located in the sidelobes of the main array's steered response. The auxiliary array is focused on the interferers and they are subtracted from the main array output to maximize their suppression. Hence, sidelobe cancellers provide a type of beamforming in which the main array provides a fixed, non-adaptive response and the auxiliary array provides the adaptive component. FIG. 18a depicts the employment of GPP and GSP in this application. It should be noted that either or both arrays can use GPP and GSP at the same time.

Figure 19:
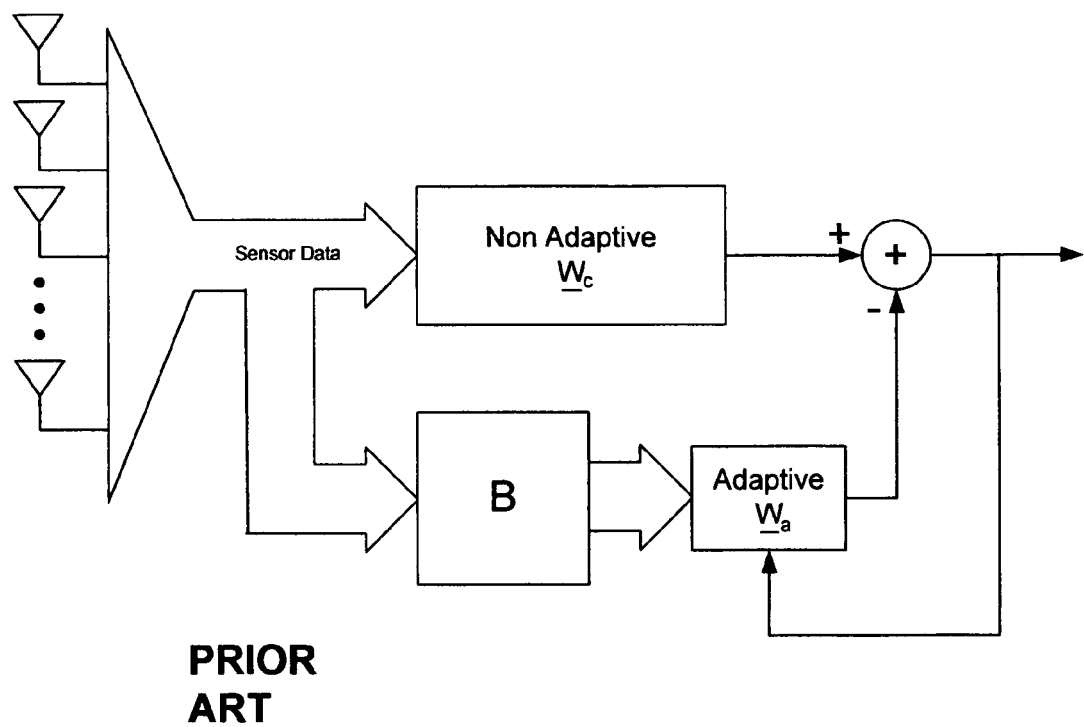
FIG. 19 is a functional diagram of a generalized sidelobe canceler.
Figure 19A:
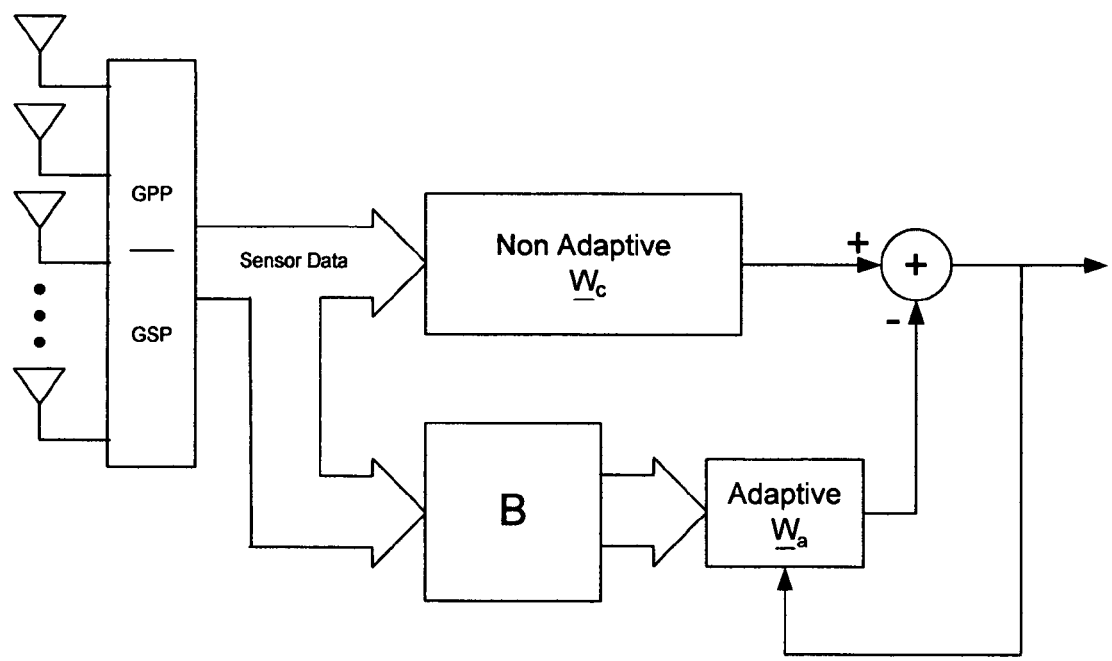
FIG. 19a is a functional diagram of the use of GPP and GSP with a generalized sidelobe canceler.

The generalized sidelobe canceller of FIG. 19 has no main array, but has a main beam steered in some direction by a beamformer according to weight vector $W_c$. The adaptive portion operates to remove any other signals from appearing in the output. Because this adaptive portion of the system has the same input as the beamformer, care must be exercised so as to not remove the desired signal. This is the function of the blocking matrix B which takes into account the assumed signal direction and prevents passage of energy propagating from that direction. The succeeding adaptive process estimates the interference signals and adapts weight vector $W_a$ so these interference signals may be subtracted from the main beam's output. FIG. 19a depicts the use of GPP and GSP with the generalized sidelobe canceller.

Here, also, geometry phase processing enables narrowband processing as a baseline implementation of a sidelobe canceller. Also, geometry phase scaling permits resolution invariant size alteration of either the main array, the auxiliary array or both arrays in a sidelobe canceller. Since interference subtraction takes place in the array response, after geometry phase scaling rather than at the antenna element outputs, geometry phase scaling of only one of the arrays will not affect the cancellation process.

v) Direction-of-Arrival (DOA) Proccessing

Direction-of-arrival processing is an array processing step that has as its goal the determination of the number of signal-emanating targets and their azimuth and elevation angles relative to the array boresight. A comprehensive summary of DOA algorithms is provided in the paper by L. C. Godara, "Application of Antenna Arrays to Mobile Communications, Part II: Beam-Forming and Direction-of-Arrival Considerations," Proceedings of the IEEE, Vol. 85, No. 8, August 1997, pp. 1195-1245.

All conventional DOA algorithms can be used in concert with GSP and GPP of the present invention. Array scaling using GSP is transparent to DOA processing (with the exception that computed angles of arrival must be scaled accordingly) and the narrowband character of GPP will alleviate processing burden for DOA algorithms.

Opportunity exists for formulation of DOA algorithms that embed GPP and GSP in ways that simplify the overall signal processing requirements.

vi) Space-Time Adaptive Processing (STAP)

A comprehensive description of space-time adaptive processing architectures is provided in the report by James Ward, "Space-Time Adaptive Processing for Airborne Radar," ARPA/CEXEC Report Number TR-1015, Dec. 13, 1994 which is incorporated herein by reference thereto.

Figure 20:
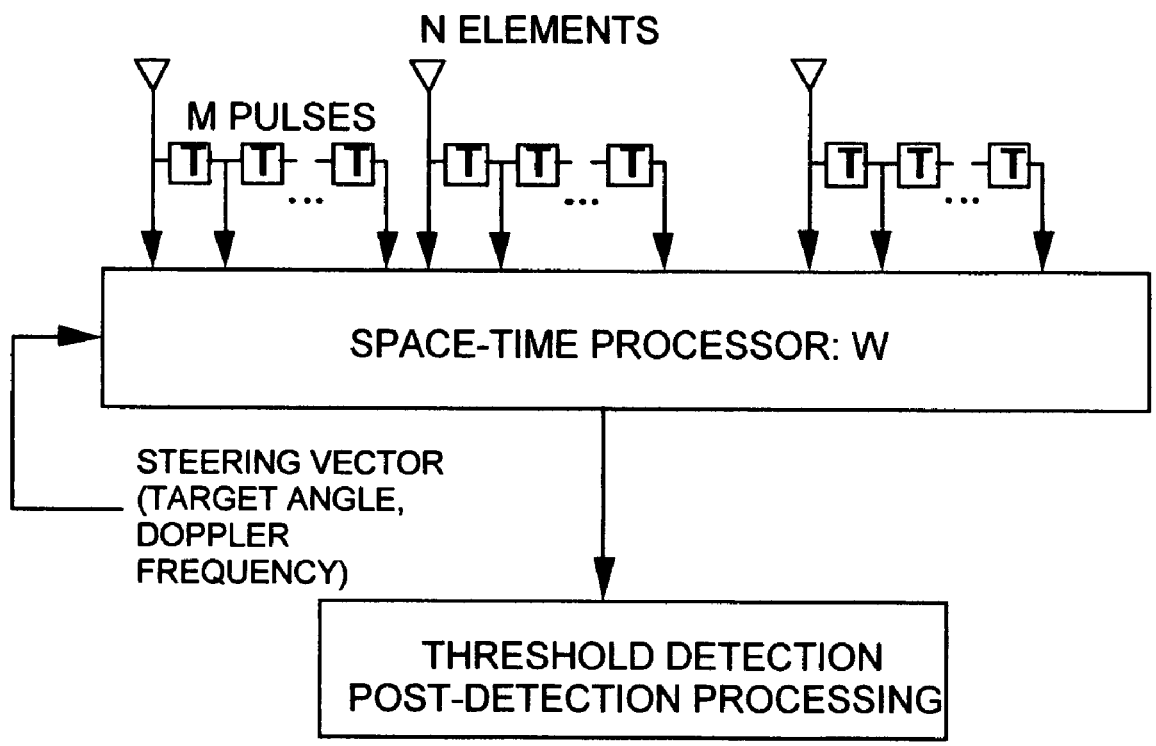
FIG. 20 is a functional diagram of a space-time processor.

The function of a surveillance radar is to search a specified volume of space for potential targets. Within a single coherent processing interval (CPI), the search is confined in angle to the sector covered by the transmit beam for that CPI, but otherwise it covers all ranges. Consider a fixed range gate which is to be tested for target presence. The data available to the radar signal processor consists of the M pulses on each of N elements. A space-time processor is defined to be a linear filter that combines all the samples from the range gate of interest to produce a scalar output. This process is depicted in FIG. 20. The tapped delay line on each element represents the multiple pulses of a CPI, with the time delay between taps equal to the PRI. Thus, a space-time processor utilizes the spatial samples from the elements of an array antenna and the temporal samples provided by the successive pulses of a multiple-pulse waveform. The space-time processor can be represented by an MN-dimensional weight vector w. Its output z can be represented as the inner product of the weight vector and the snapshot of interest:

$$z = \underline{w}^H \underline{\chi}$$

Figure 20A:
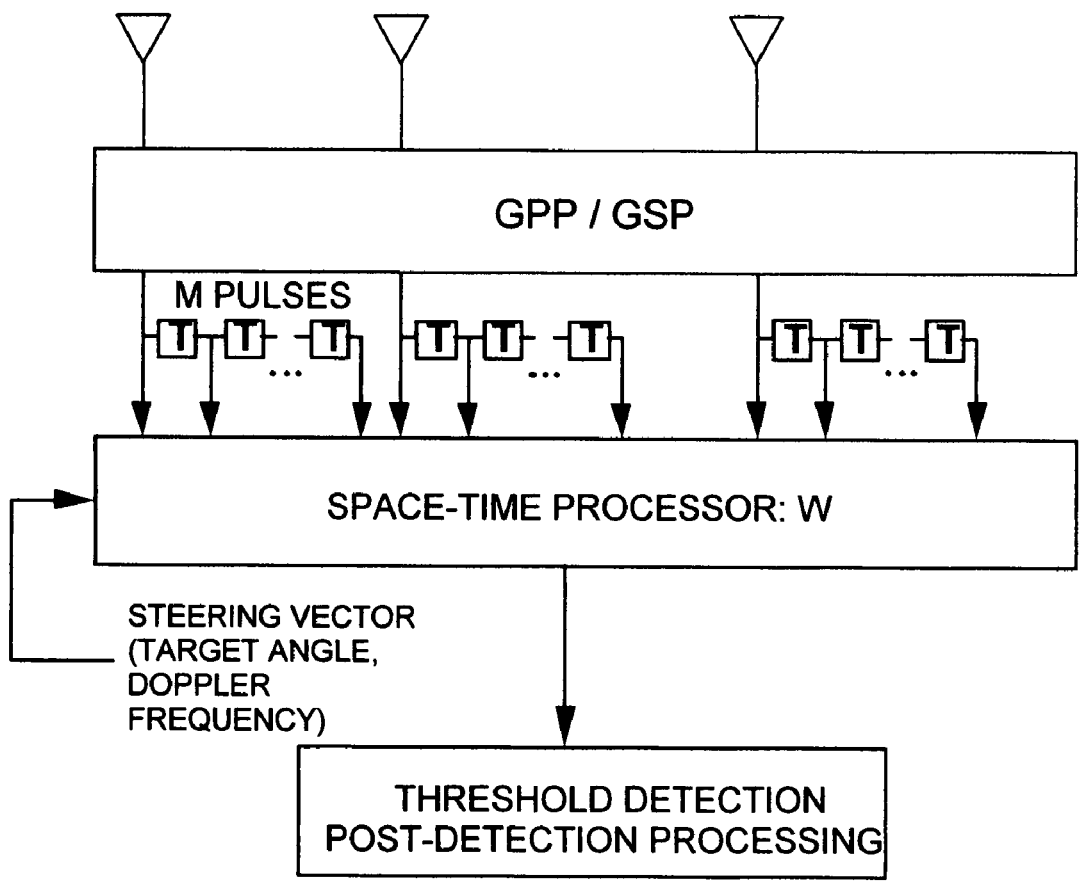
FIG. 20a is a functional diagram of the use of GPP and GSP with a space-time processor.

One way to view a space-time weight vector is a combined receive array beamformer and target Doppler filter. Ideally, the space-time processor provides coherent gain on target while forming angle and Doppler response nulls to suppress clutter and jamming. As the clutter and jamming scenario is not known in advance, the weight vector must be determined in a data-adaptive way from the radar returns. A single weight vector is optimized for a specific angle and Doppler. Since the target angle and velocity are also unknown a priori, a space-time processor typically computes multiple weight vectors that form a filter bank to cover all potential target angles and Doppler frequencies. FIG. 20a depicts the use of GPP and GSP with generalized STAP processing.

Figure 21:
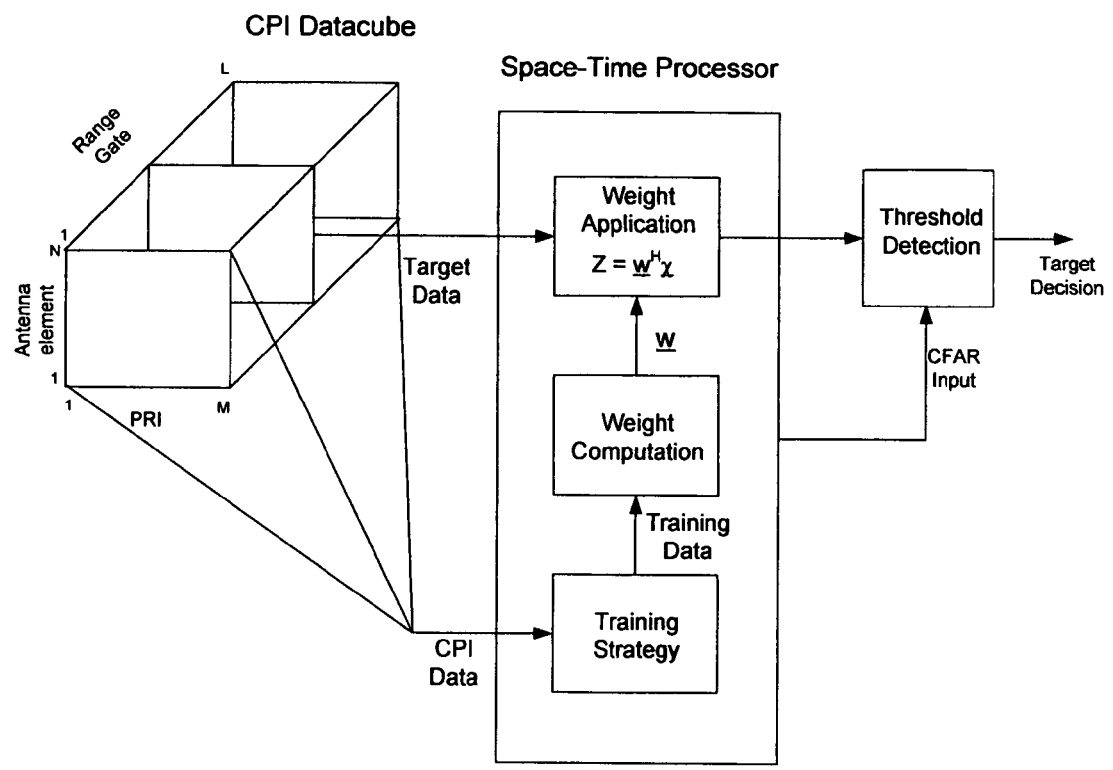
FIG. 21 depicts the data flow for a space-time processor.

A more complete picture of a space-time processor is shown in FIG. 21. Here the full CPI datacube is shown, with the shaded slice of data, labeled "target data." representing the data at the range gate of interest. This shaded portion is exactly the data represented by the tapped delay line on each element of FIG. 20. The space-time processor consists of three major components. First a set of rules called the training strategy is applied to the data. This block derives from the CPI data a set of training data that will be used to estimate the interference. The second step is weight computation. Based on the training data, the adaptive weight vector is computed. Typically, weight computation requires the solution of a linear system of equations. This block is therefore a very computation-intensive portion of the space-time processor. New weight computations are performed with each set of training data. Finally, given a weight vector, the process of weight application refers to the computing of the scalar output or test statistic. Weight application is an inner product, or digital beamforming, operation. The scalar output is then compared to a threshold to determine if a target is present at the specified angle and Doppler. The output of the processor is a separate scalar (or decision) for each range, angle and velocity at which target presence is to be queried.

a) Fully Adaptive

1. Optimal

A space-time processor that computes and applies a separate adaptive weight to every element and pulse is said to be fully adaptive. The weight vector for a fully adaptive processor is of size MN. Fully adaptive space-time processing for airborne radar was first proposed in 1976 by Brennan and is a natural extension of adaptive antenna processing to a two-dimensional space-time problem.

2. Reduced Rank

When the true array covariance matrix is known, reduced-rank processing performance is less than or equal to full-rank performance. However, when limited data is available for estimation of the covariance, as is the case in many practical radar applications, then reduced-rank methods actually outperform full-rank adaptive methods. This is the case due to errors resulting from the full-rank estimation process that exhibits greater numerical complexity.

A taxonomy of reduced-rank architectures is provided in the paper by C. D. Peckham, A. M. Haimovich, T. E. Ayoub, J. S. Goldstein, and I. S. Reed, "Reduced-Rank STAP Performance Analysis," IEEE Transactions on Aerospace and Electronic Systems, Vol. 36., No. 2, April, 2000, pp. 664-676. A non-parametric approach to rank reduction is described in the paper by J. R. Guerci, J. S. Goldstein, and I. S. Reed, "Optimal and Adaptive Reduced-Rank STAP" IEEE Transactions on Aerospace and Electronic Systems, Vol. 36., No. 2, April, 2000, pp. 647-663. A particular parametric reduced-rank STAP architecture is provided in the paper by J. R. Román, M. Rangaswamy, D. W. Davis, Q. Zhang, B. Himed, and J. H. Michels, "Parametric Adaptive Matched Filter for Airborne Radar Applications," IEEE Transactions on Aerospace and Electronic Systems, Vol. 36., No. 2, April, 2000, pp. 677-692. This approach demonstrates robustness to target presence in the sample support data.

b) Partially Adaptive (Time Adaptive and Non-time Adaptive)

Any processor architecture that computes a weight vector of size less than MN and performs any adaptation is considered partially adaptive. The category of partially adaptive processors comprises two main subcategories, the first sequentially combines transform-based, nonadaptive processing with adaptive processing. An example of this is beamspace beamforming which uses a fixed beamforming network prior to adaptive weighting of the resulting beams. The second subcategory is that which involves only adaptive processing, but at dimensionality reduced from that of the MN size of fully adaptive processing. An example of this would comprise tandem adaptive spatial (beamforming) and adaptive temporal (Doppler) processing.

Figure 22:
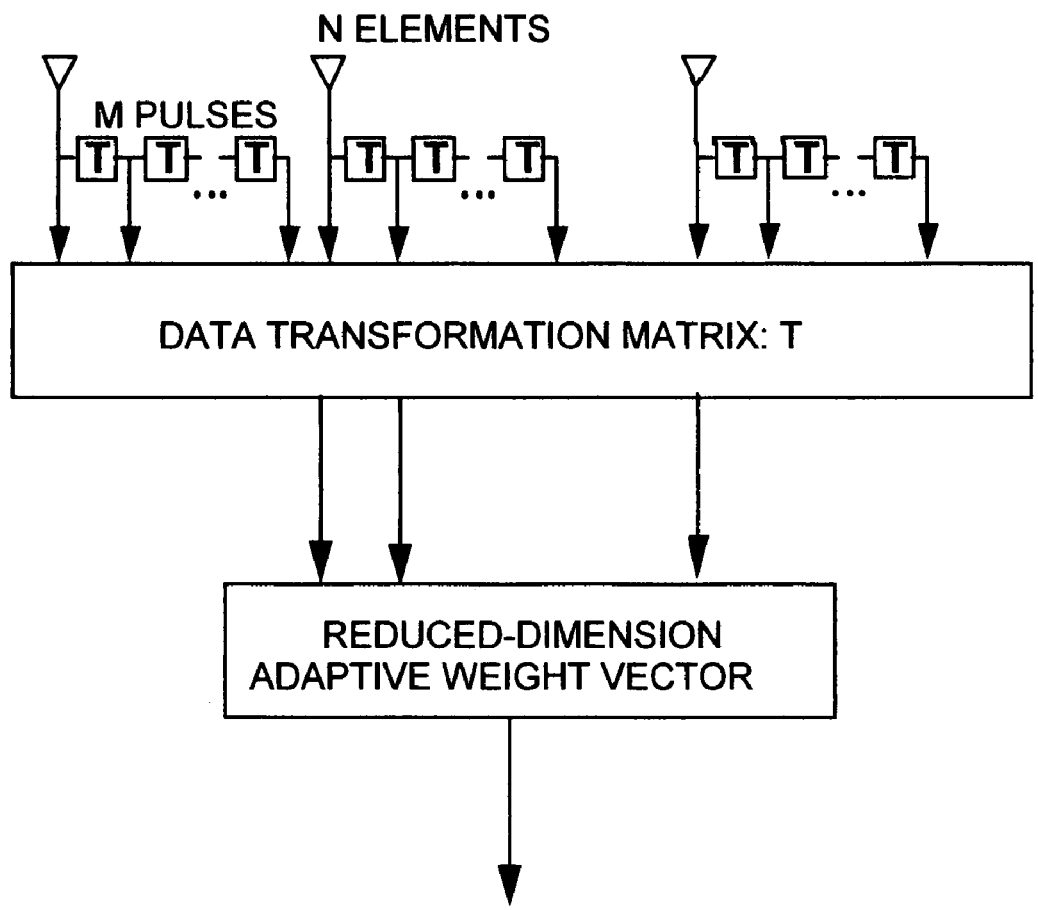
FIG. 22 is a functional diagram of a partially adaptive STAP processor.

A partially adaptive processor takes a large set of input signals transforms them to a relatively small number of signals, and then solves a reduced data is an MN-dimensional space-time snapshot. The data is transformed to a new D×1 vector $\chi$ by means of an MN×D preprocessor matrix T. After data transformation, a D×1 adaptive weight vector is computed and applied to the transformed data vector as depicted in FIG. 22.

Figure 23:
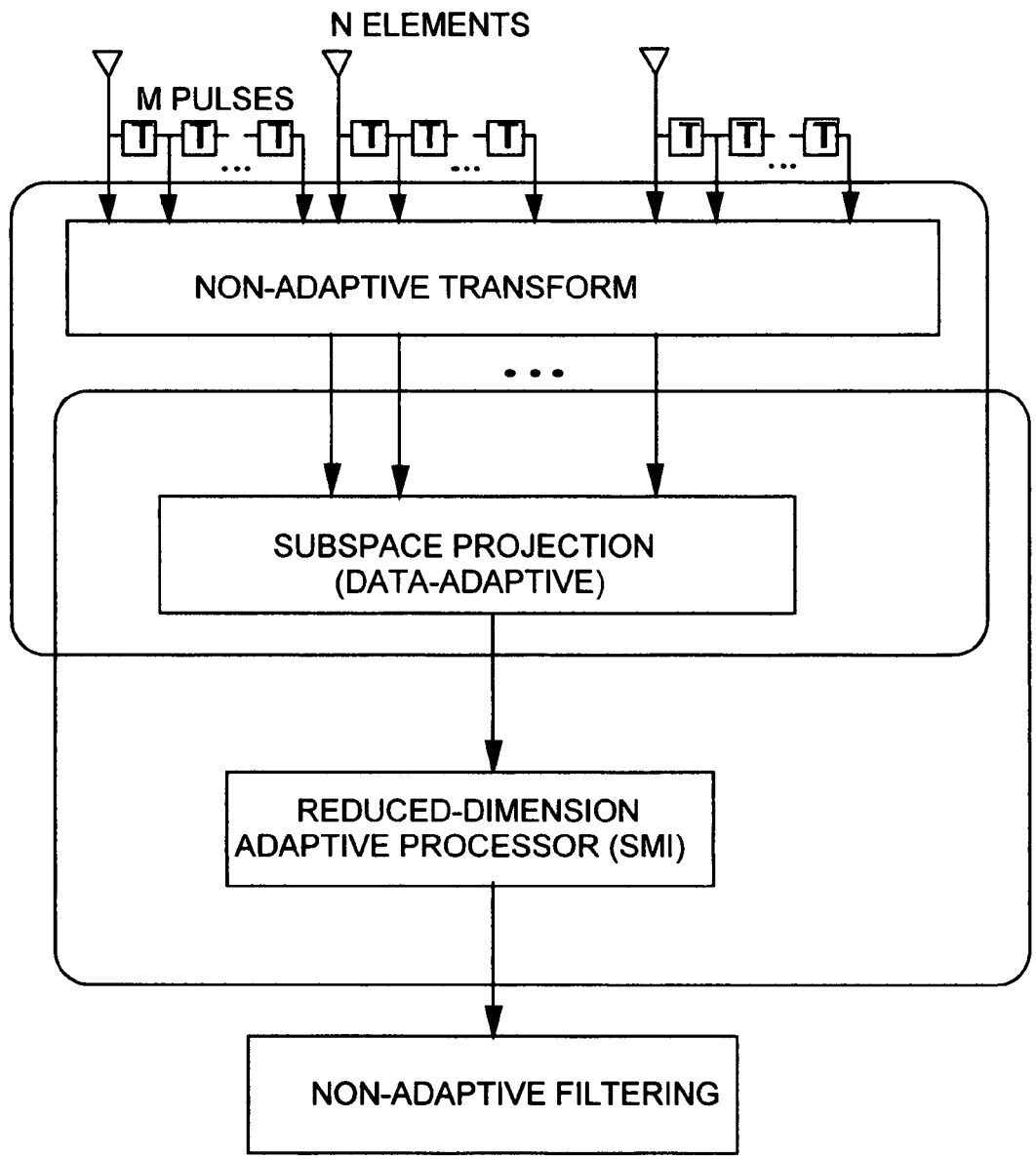
FIG. 23 is a functional diagram of non-adaptive filtering used with partially adaptive STAP.

The large dimensionality of the fully adaptive space-time processing problem and the fact that the interference is mostly unknown a prori lead toward an architecture whose first step provides nonadaptive filtering to reduce the dimensionality prior to adaptive processing. This process is illustrated in FIG. 23. GPP and GSP may be employed in all variants of partially adaptive architectures. The only constraint is that GSP must occur prior to beamforming.

1. Element Space

In element-space STAP, every element of the array is adaptively weighted. Element-space approaches retain full dimensionality but reduce the overall problem size by reducing the number of temporal degrees of freedom prior to adaptation. Full element-space adaptivity provides the flexibility to handle a completely unknown jamming environment and also the potential for effective clutter cancellation at all angles. Element-space STAP can be effected before or after Doppler processing as will be discussed below.

a. Pre Doppler

Figure 24:
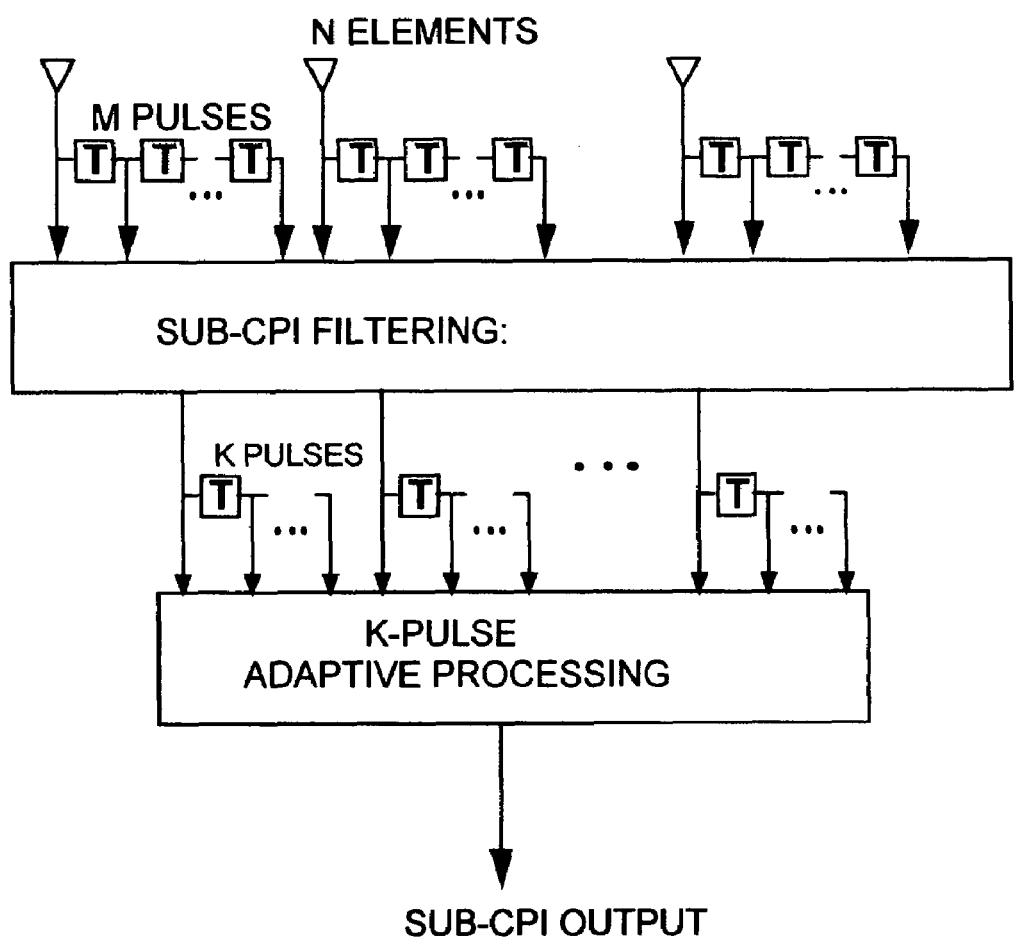
FIG. 24 is a functional diagram of element-space STAP.

In element-space pre-Doppler STAP, the data from only a few pulses (typically 2 or 3) at a time are adaptively combined rather than all the pulses of the coherent processing interval (CPI). Utilizing more than one pulse provides the temporal adaptivity required for clutter cancellation, while retaining full spatial adaptivity provides a means to handle jamming simultaneously. Adaptive processing is then followed by a fixed (nonadaptive) Doppler filter bank that provides coherent integration over the full CPI and the means for velocity estimation. One instantiation of this scheme is shown in FIG. 24 depicting solely the sub-CPI portion of the processing.

b. Post Doppler

Figure 25:
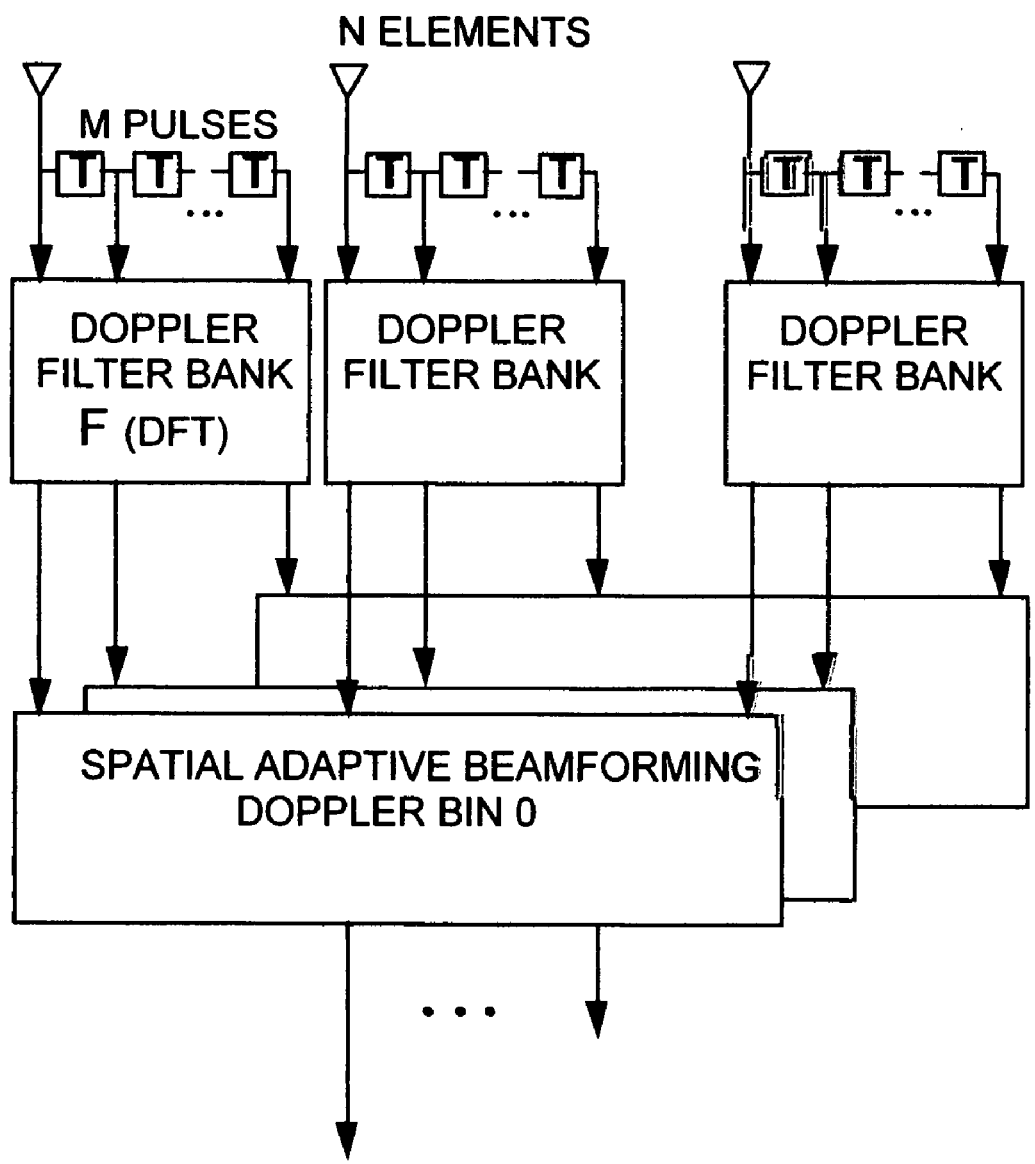
FIG. 25 is a functional diagram of element-space post-Doppler STAP.

In element-space post-Doppler STAP, a single Doppler filter bank is utilized for each element. Adaptive spatial beamforming is then performed separately within each Doppler bin as shown in the architecture of FIG. 25. It is assumed that Doppler filtering suppresses mainlobe clutter nonadaptively and localizes the competing sidelobe clutter in angle. Within each Doppler filter, the adaptive processing places nulls both at the angles of jamming signals and at the angles where sidelobe clutter Doppler falls within the Doppler passband.

2. Beam Space

In contrast to element-space approaches that adaptively combine signals from all elements of the array, beam-space methods achieve dimensionality reduction by beamforming the signals on each element prior to adaptation. Beamforming in this context is a spatial-only operation. Beamforming may reduce the dimensionality by localizing the significant interference to a few signals (beams) and providing additional suppression of the interference outside the angular region of interest. Hence, architectures that adaptively combine signals after some initial beamforming are called beamspace architectures. As with element-space architectures, beamforming can be done before or after Doppler processing.

a. Pre Doppler

Figure 26:
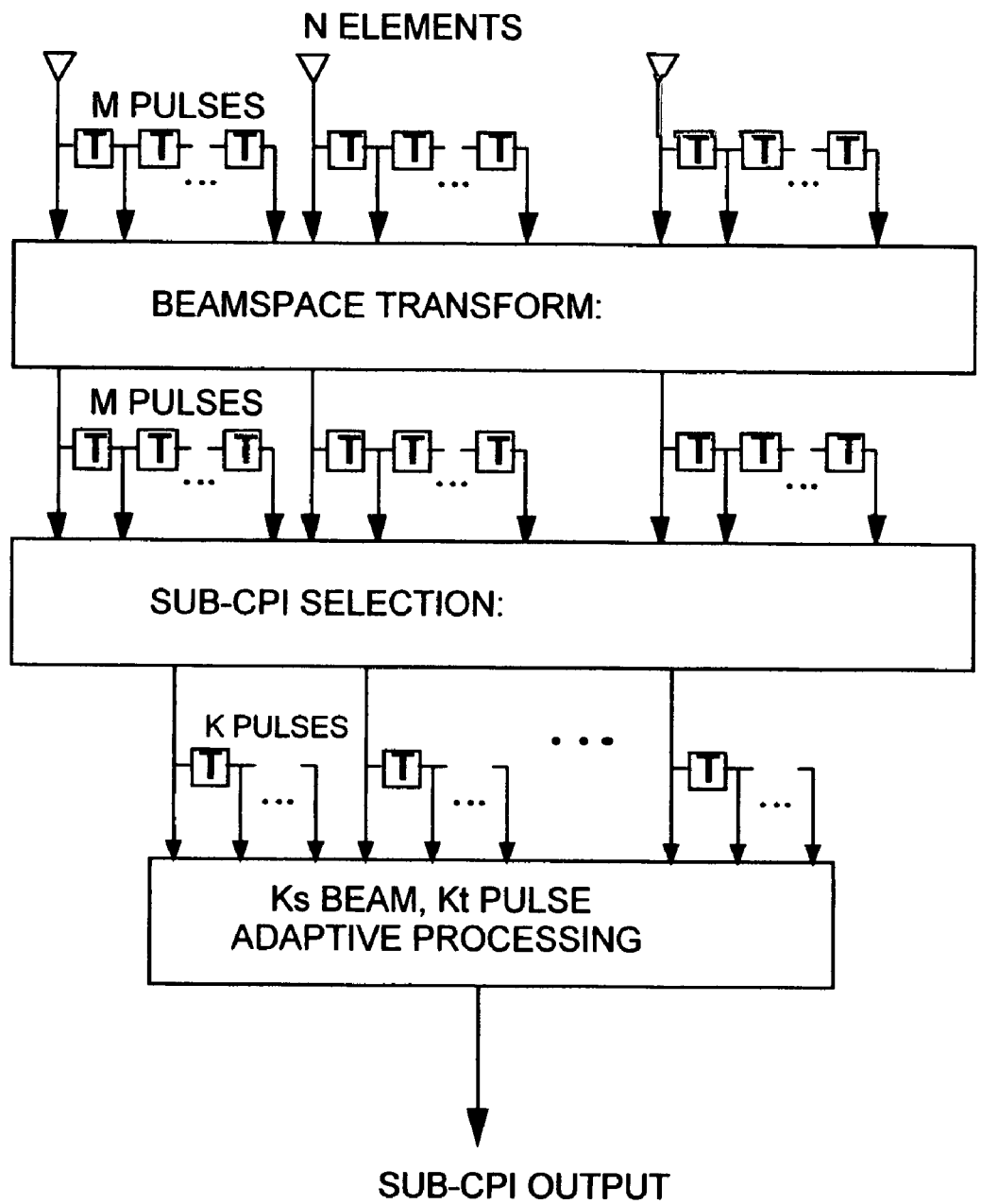
FIG. 26 is a functional diagram of beam-space pre-Doppler STAP.

Beamforming is simply the application of spatial windows to the element data. FIG. 26 depicts a beamspace pre-Doppler architecture for sub-CPI processing. First the element data is preprocessed with beamformer matrix G to produce a small number Ks of beam outputs. Then only the beam outputs from a small, Kt-pulse, sub-CPI are adaptively processed at one time. Then, a separate adaptive problem is solved for each sub-CPI and the sub-CPI outputs are coherently processed with the Doppler filter bank.

b. Post Doppler

Figure 27:
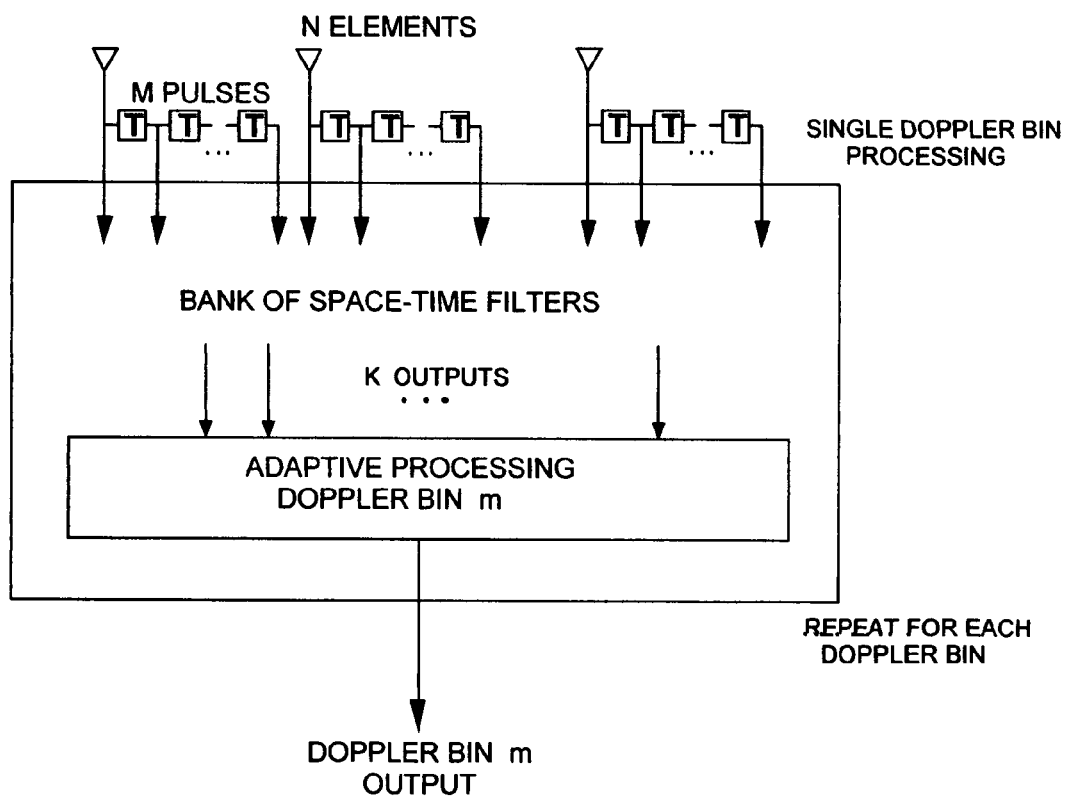
FIG. 27 is a functional diagram of beam-space post-Doppler STAP.

In beamspace post-Doppler processing, a bank of space-time filters serve are preprocessors. These filters may be formed by cascading spatial beamformers on each pulse with Doppler filters on each beam. As depicted in FIG. 27, the filtered signals are then adaptively combined to produce the Doppler bin output. This process is repeated for each Doppler bin. Combined beamforming and Doppler filtering can provide substantial suppression of portions of the interference, thereby localizing the interference prior to adaptation.

vii) Extensions of STAP-3D STAP (Hot Clutter)

There are a number of applications that can exploit higher dimensionality formulations of STAP. A good example is the need to perform 3D STAP when terrain-scattered interference (TSI) is present in addition to monostatic clutter in the radar context. TSI is due to out-of-plane multipath signals generated by a high power jammer. Although a substantial portion of the jammer multipath energy will fall in the radar receiver's sidelobes, enough energy may enter the mainlobe to cause desensitization. To overcome this effect, range bins other than the test cell must be adaptively combined to cancel the TSI present in the test cell. A full 3D formulation that mitigates TSI while maintaining the effectiveness of monostatic clutter cancellation is detailed in the article by J. R. Guerci, J. S. Goldstein, and I. S. Reed, "Optimal and Adaptive Reduced-Rank STAP," IEEE Transactions on Aerospace and Electronic Systems, Vol. 36, No. 2, April 2000, pp. 647-663. In the 3D STAP architecture outlined by Guerci, et al., the data vector of length MNL comprises the outputs of an N-element adaptive array for M pulses (PRIs), and L range bins. This same architecture can be adapted to the communications application by realizing that for the communications target steering vector, M represents the temporal bandwidth degrees-of-freedom and L represents the multipath delay degrees-of-freedom.

viii) Transmit Beamforming

The scaling of array size is not a reciprocal process with regard to transmit beamforming. In other words, the geometry scaling of phase cannot directly be applied to the transmit beamforming problem. This is because it is not possible to create a radiating aperture of effective size larger than the physical size of the array. Hence scaling of the phase map on transmit merely corresponds to an additional phase function apodization of the array that would broaden the array mainlobe beyond the diffraction limited value. It is possible that methods other than those affecting aperture size can lead to transmit beamwidths that surpass the classical diffraction limit. One prospect involves the employment of metamaterial lenses. Theoretically, it is possible to transmit a beam devoid of diffractive effects. This would correspond to a mainlobe angular beamwidth of zero radians. Techniques could be employed to spoil this process in a controlled fashion in order to achieve finite beamwidths. Also, so-called "diffraction-free" beams can be generated which exhibit exchange of energy among a central lobe and sidelobes as a function of propagation distance. The major energy content of the beam resides within a radius that is smaller than the classical diffraction beamwidth.

There is a way that narrowband geometry phase can be exploited for transmit beamforming. This is when use is made of the receive directions-of-arrival (DOA) derived from geometry phase processing for either scaled or unscaled receive arrays. If the transmit beam weights are derived from DOA processing of the signals received in such a scaled receive array, then appropriate phase map scaling is required to calculate the element weights in the unscaled transmit beamformer.

ix) Retrodirective Arrays and Phase Conjugation

The present invention readily admits the implementation of reduced size receive arrays that provide information to separate retrodirective transmit arrays. This is a special case of transmit beamforming.

Conventional phase conjugation retrodirective arrays using mixer diodes operating in a reduced size array geometry will provide a retro beam of width associated with the classical diffraction limit for the array. As discussed below, the only mechanism for maintaining retrodirective beamwidth upon reduction of transmit array size (reduced element spacing) is to overcome diffraction by means suggested below.

E) Array Hardware and Hardware Processing Architectures i) Antenna Technologies Supporting Array Size and Element Coupling Reduction Directional and omnidirectional antenna element patterns can be used in antenna arrays of the present invention. Emphasis is placed on antenna technologies that permit array elements to exhibit diminished mutual coupling. Among these are ceramic antennas with reduced near field extent (Antenova), plasma antennas which offer the additional prospect of physically-adapting the array in real time by turning various elements on or off.

a. Metamaterial Antennas

With respect to antenna element miniaturization, the ability to create electrically long (high radiation efficiency) but physically small antennas hinges on the use of new types of antenna materials such as the aforementioned ceramics of Antenova and the class of materials called "metamaterials." Some metamaterials can exhibit amazing behaviors such as negative Doppler shifting, and planar beam focus. Reference is made to the presentation given by Paul Kolodzny, entitled "Antenna Applications of Metamaterials." Enough work has been done that a number of candidate materials can be cited that will achieve element miniaturization. Some magnetic substrate metamaterials can already achieve linear size reduction factors for patch antennas of 6× as revealed in the presentation by J. T. Aberle, "A Figure-of-Merit for Evaluating the Gain-Bandwidth Product of Microstrip Patch Antennas," Arizona State University, Telecommunications Research Center, 1999. Of greater impact are the 100× reductions that DARPA is pursuing.

b. Diminished Near Field Antennas

Another approach is to use antenna technology that prevents or minimizes array element coupling in the first place. An example of this is the "high dielectric antenna" developed by Antenova. These antennas are characterized by ceramic construction with a radiating dielectric that exhibits a near field of much diminished extent and consequently significantly reduced coupling compared to conventional antenna elements.

c. Plasma Antennas

The performance of plasma antennas (see U.S. Pat. No. 5,594,456) can approach that of metal antennas. Plasma antennas offer several advantages over conventional antennas, they are lighter and when turned off, they are radio transparent, allowing other adjacent antennas to transmit or receive without reflections or mutual coupling. Plasma antennas employ ionized gas enclosed in a non metallic tube or other enclosure. Ionized gas is an efficient conducting medium with several important advantages. Since the gas may be ionized only during the period of transmission or reception, ringing and other transient effects associated with metal antennas can be diminished or eliminated. Transient creation of the plasma supports transmission of extremely short pulses useful for radar and modem communications applications. Plasma antennas enable compact designs of arrays that can be dynamically reconfigured for frequency, direction, bandwidth, beamwidth, and gain. The ability to turn off the antenna reduces susceptibility of receivers to countermeasure damage. Also, it permits the antenna radar cross section to be reduced to zero, thereby enabling a new level of electromagnetic stealth. Given the plasma frequencies of typical ionizable gases, these antennas operate well up to 20 GHz. Short pulse creation with minimal ringing supports ultrawideband (short pulse) radar and diminishes the signal processing traditionally required to remove deleterious antenna-induced transients from received signals.

Changing the ion density in the plasma provides an instantaneous means of altering the antenna bandwidth. The steady state noise floor of plasma antennas is extremely low. Mutual coupling of active plasma elements can be controlled by diminished plasma ion density. Mechanical scanning can be replaced with electronic switching of plasma elements. The effective aperture of a plasma antenna can be made larger than its metal counterpart of the same physical footprint. Broadband plasma antennas permit full concurrent transmission and reception with the same antenna at separated frequencies. The characteristics of a single plasma antenna can be altered with time so that many different functions that may require different frequencies, bandwidths, etc. can be time multiplexed. Plasma elements can even be used for high power phase shifters for transmit beamsteering. Using a plasma having a plasma frequency below the radiation frequency in question, permits plasma panels to be used as reflectors. Significant advancements in this field have been made by ASI Technology Corporation, 980 American Pacific Drive, Suite 111, Henderson, Nev., 89104.

Beyond exploiting the general characteristics of plasma antennas, the present invention can benefit from use of plasma antennas in several specific ways. First, they can be employed as elements exhibiting diminished coupling in support of array size reduction. Second, they can be used to suppress any problematic resonant ringing that attends array size reduction for short pulse applications. Third, by time division multiplexing the elements, physical arrays can minimize radar cross section. Further, time division multiplexing permits a large effective image support size to be achieved with only a small number of elements in a larger array concurrently energized leading to a small associated radar cross section.

iii) Pulse Compression before Geometry Scaling Preprocessing

Various functions can be interchanged within the radar processing chain and these functions can precede or succeed the GSP of the present invention. A simple constraint is that GPP must precede GSP for the purpose of extracting the geometry phase before beamforming or STAP can be done.

iv) RF/IF/Baseband Beamforming

As discussed below in the context of communications, beamforming can be executed at the receiver front end with high performance phase shifters and gain blocks, at the IF with less stringent hardware constraints, or at baseband—bringing the full power of digital signal processing to bear on the problem. The present invention, through GPP, permits this process to be a narrowband one and hence dramatically increases the utility and ease of implementation of the various methods of beamforming.

In addition to baseband digital beamforming, there are at least three analog beamforming architectures as identified by T. Ohira and J. Cheng in the book, Adaptive Antenna Arrays—Trends and Applications, ed. S. Chandran, Springer Verlag, 2004, in the chapter entitled "Analog Smart Antennas". These are 1) RF beamforming in which beamforming is done in the RF stage before downconversion—the weighting factors are calculated in a digital manner after demodulation and decision and then fed back to the RF beamforming network, 2) local beamforming is which weights are applied to each local oscillator input to the respective array element downconverter, herein weighting is accomplished by phase control only, and 3) aerial beamforming in which weighting is applied at the antenna element structure by such methods as varying element loading reactances. GPP and GSP can be applied to these analog architectures before beamformer weight calculation and decision feedback.

As is well known in the prior art, beamforming algorithms can be categorized into three main groups as well; spatial reference beamforming (SRB), temporal reference beamforming (TRB), and blind beamforming. In SRB, the direction of arrival (DOA) is estimated by super-resolution algorithms such as multiple signal classification (MUSIC) and estimation of signal parameters via rotational invariance techniques (ESPRIT). After estimating the DOA, an optimal complex weight vector is separately calculated by means of a generalized sidelobe canceler, or Gram-Schmidt processor, etc. Then the directional beam is synthesized via the optimal complex weight vector. In contrast to SRB, TRB minimizes the difference between a reference signal and the array output. The temporal reference can be different for each signal of interest (or communications user), but must be highly correlated with the desired signal and uncorrelated with the interference. In the case of CDMA, the reference can be the spreading code. Hence, the TRB directly synthesizes the antenna pattern that maximizes SINR. The last group, blind beamforming methods, use algorithms such as the constant modulus algorithm or cyclostationary algorithm which exploit the inherent signal structure. The SRB and blind methods are most amenable to incorporation of the GPP and GSP. Since TRB methods can operate at other than baseband using a temporal reference signal, GPP and GSP may best be invoked as auxiliary processing.

vi) Subarrays

Subarrays have a number of uses in conventional array antennas. For example, spatial averaging of subarray responses has been exploited to improve signal quality. This is the case for regular array geometries given the inherent spatial redundancy of such arrays. Subarrays also find application in wideband arrays for the purpose of reducing the amount of required hardware. Ideally, each element of the array would be fed through a true time delay. Since this is prohibitive from cost and complexity standpoints for large arrays, an approximation is realizable in which each element of the subarray is implemented with a phase shifter and each subarray is fed with a single true time delay.

GPP of the present invention provides an alternative to the use of subarrays to handle wideband signals. Further, new uses of subarrays are possible using GPP. One example, would be implementation of variable resolution arrays for signal interpolation in either the time or frequency domains.

vi) Optical Processors for Radar Beamforming/Beamsteering (ex:BEAMTAP)

In the province of radar, optical processing was first applied to the case of SAR image reconstruction in 1958 at the University of Michigan. Given that the SAR data is effectively a microwave hologram of the illuminated area, recording this data on film for optical processing was a natural approach to forming an image of the ground. More recently, optical processor architectures have been implemented to address the problems of DOA and beamformer processing. A foremost example of this is the Broadband Efficient Adaptive Method for True-time-delay Array Processing (BEAMTAP) architecture that was developed under DARPA funding at the University of Colorado. The optical hardware performs beamsteering and jammer nulling functions in a scalable architecture. For wideband array processing, the architecture boasts the feature of reducing the required number of tapped delay lines for an N-element array from N to 2. This is achieved while still providing the NM degrees of freedom of a conventional N element time-delay-and-sum beamformer that requires N tapped-delay-lines with M taps each. The present invention will permit a further reduction in complexity of the optical processor by dramatically reducing the number of adaptive weights required in the beamformer, diminishing the need for wideband processing elements, and possibly replacing true time delay devices with narrowband phase shifters.

vii) Adaptive Geometry Arrays

As per the above discussion of plasma antennas, a hardware-based form of spatial adaptation is possible. Reduction in radar cross-section achieved by dynamically reducing the number of unneeded array elements. Scattering noise and mutual coupling effects are diminished by turning elements off at the end of pulse transmission or reception windows. New forms of aperture synthesis are possible by exploiting time-varying array geometries. Also, combining adaptive array geometry with other receiver and transmitter degrees of freedom offers the prospect of new forms of aperture synthesis (ex. combining frequency swept target illumination with temporally dynamic array geometries). Further, virtual arrays can be implemented as spatially adaptive, as well. GPP and GSP can be used in concert with physical adaptation of the array. One specific example is the use of physical adaptation to reduce the geometry phase bandwidth. This is analogous to the effects produced in pseudo-Doppler direction finders. Since angular variation in the target—array geometry leads to non-zero geometry phase bandwidth, such angular variation can be compensated by pseudo motion of the array provided by switching elements in the array.

F) SAR, ISAR, and Interferometric SAR (IFSAR)

Reduction in the size of the synthetic aperture for SAR, ISAR and IFSAR is possible using GSP. This permits a shorter transit time for collection of data corresponding to the cross-range resolution of the unscaled aperture. The aforementioned limitation to this involves the fact that squint mode cross-range imaging is not possible given that GSP does not invoke target aspect angle information that is inaccessible. Such aspect angle information is accessible only for the extended aperture.

G) Communications Systems Array Processing Architectures

Figure 28:
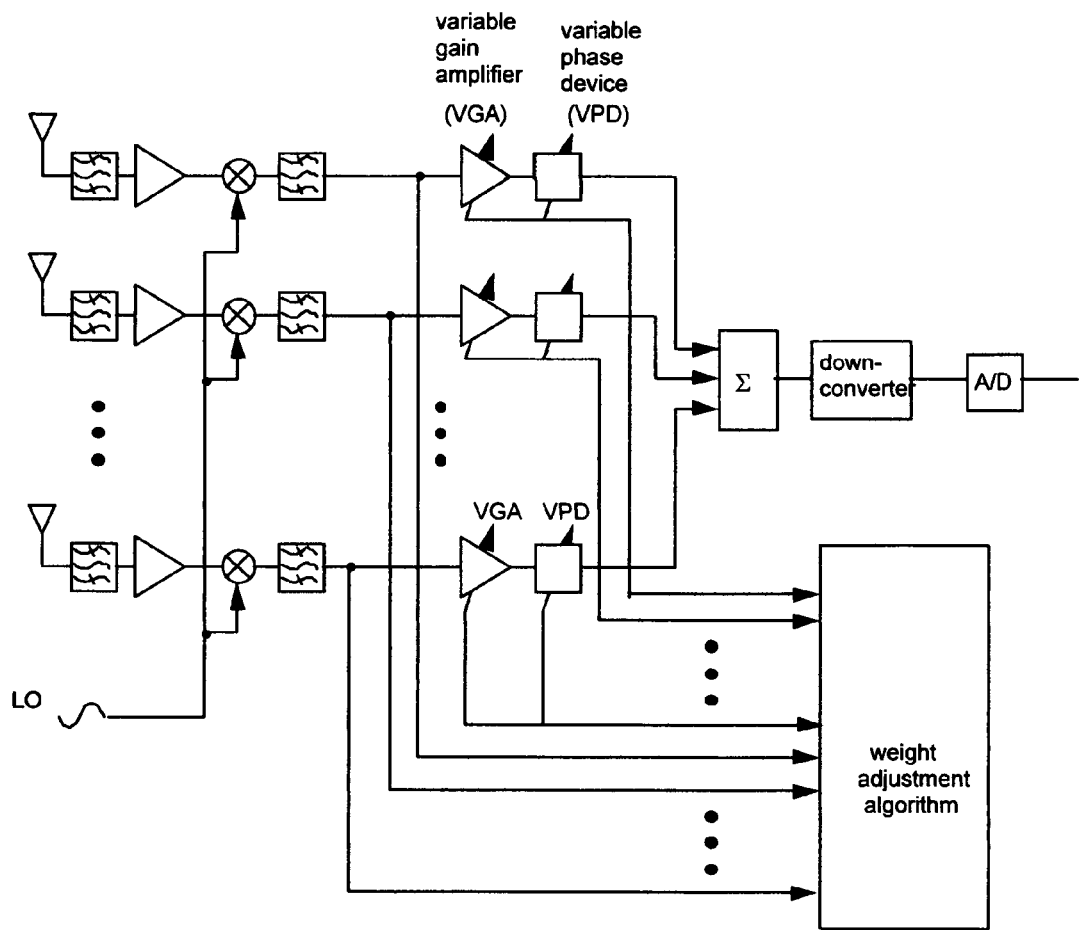
FIG. 28 is a functional diagram of an analog IF beamformer receiver.
Figure 29:
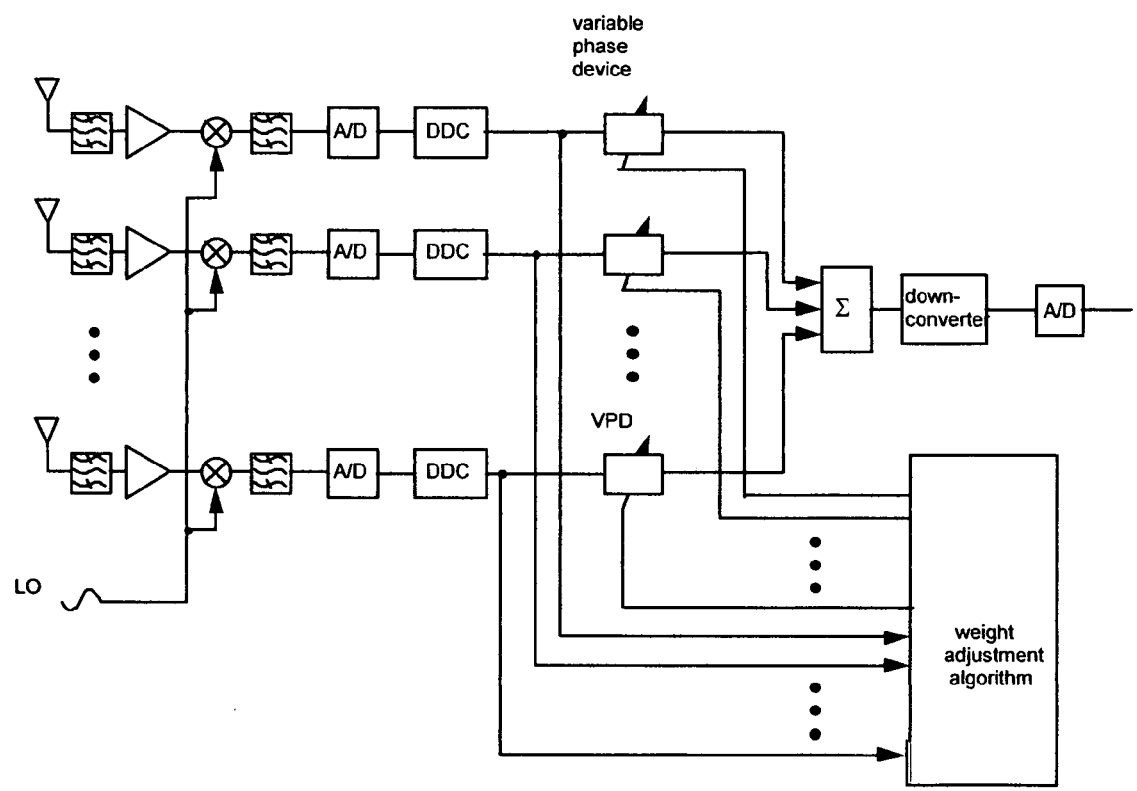
FIG. 29 is a functional diagram of a baseband digital beamformer receiver.

As with radar receivers, communications receivers perform spatial processing in various ways using both analog and digital components. FIG. 28 depicts an analog IF beamformer structure and a baseband digital structure is shown in FIG. 29. The major advantage of a digital implementation is that it can form multiple simultaneous beams, one for each signal of interest, whereas a separate RF beamformer structure is required for each such beam in the case of an analog implementation. A hybrid approach combines RF/IF beamforming with digital adaptive post processing.

i) Fixed Beamforming

Figure 30:
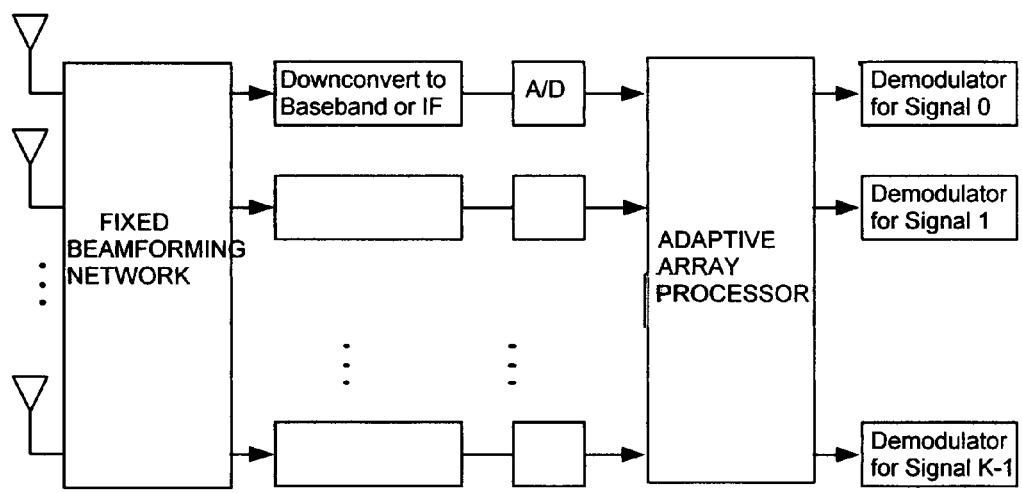
FIG. 30 is a functional diagram of the use of fixed and adaptive beamforming.
Figure 30A:
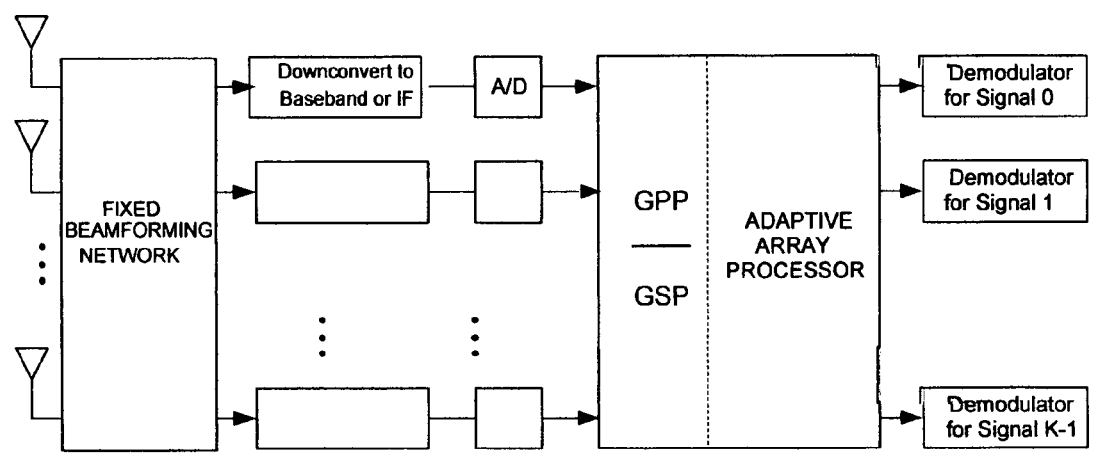
FIG. 30a is a functional diagram depicting the use of GPP and GSP with the adaptive beamformer of FIG. 30.

Many communications systems make use of fixed beams and for various applications. Point-to-multipoint links and sectorized communications are examples. Often this is achieved by use of a hardware beamformer, such as a Butler matrix, well known in the art. Additionally, fixed beams are used in switched beam systems in which a switch is used to select the best beam on receive. Fixed beamformers can be used as spatial pre-selectors when employed with adaptive array processors as shown in FIG. 30. FIG. 30a depicts the use of GPP and GSP in the adaptive beamformer.

ii) Beamforming for CDMA-mitigation of Wideband Requirement

The employment of multi-user CDMA waveforms for communications is in stark contrast to the aforementioned radar case because each "target" (user transmitter) is transmitting a peculiar waveform modulation. STAP applied to this communications problem can also benefit from narrowband GSP for beamforming.

Figure 31:
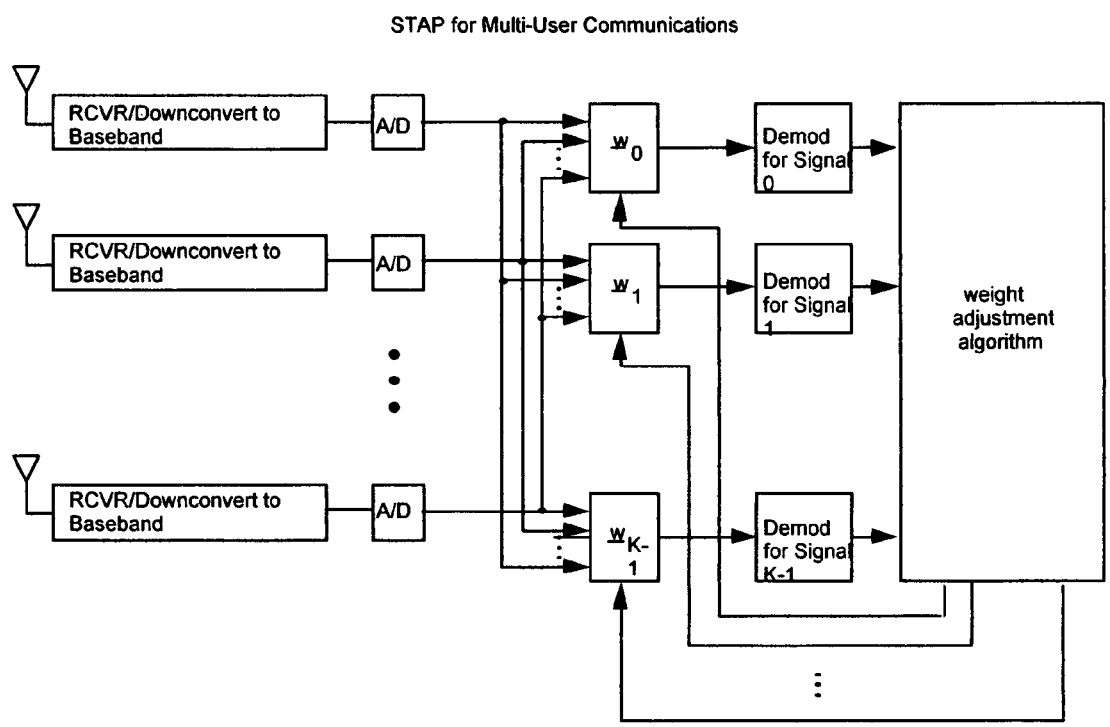
FIG. 31 is a functional diagram of a receiver using STAP for multi-user communications.
Figure 31A:
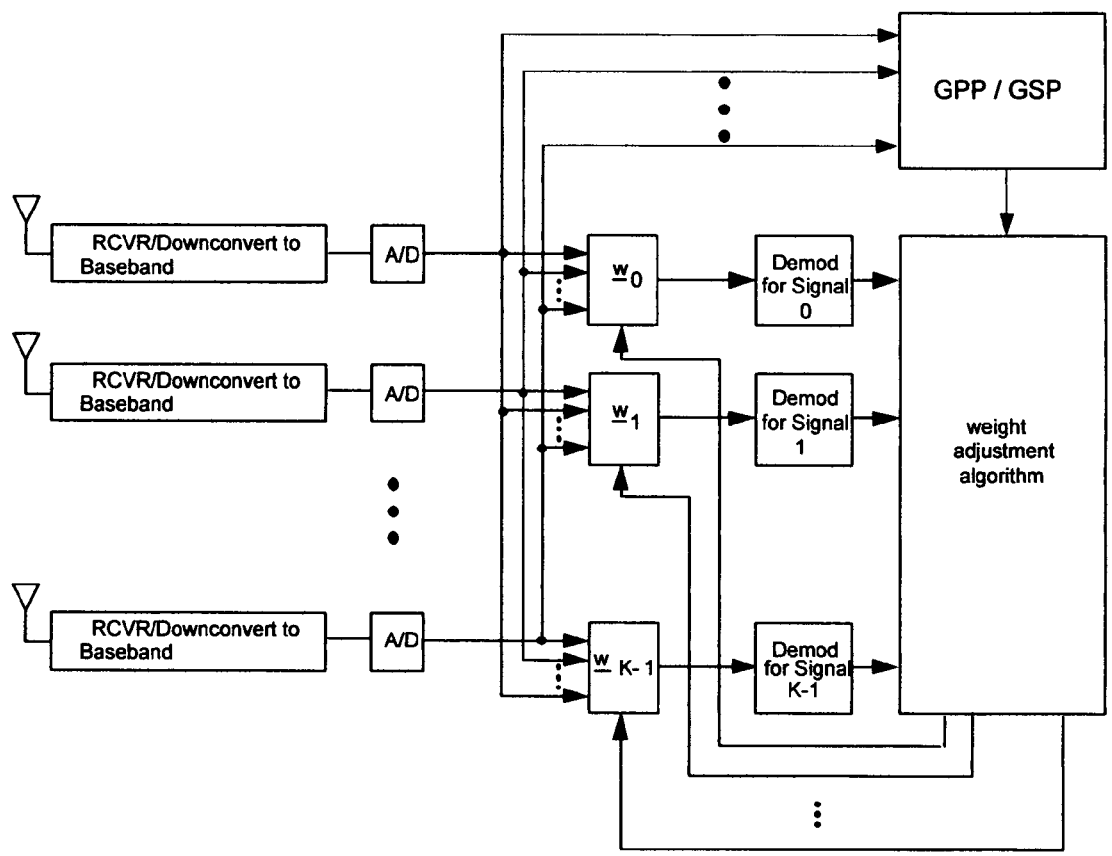
FIG. 31a is a functional diagram of a multi-user STAP receiver making use of GPP and GSP.

As with radar, there are many communication requirements for wideband signal format. A foremost example is that of spread spectrum systems based on either code-division-multiple-access (CDMA) or frequency hopping (FH). In these systems the code-based signal spreading permits concurrent use of a communications channel by a plurality of users, correlation based improvement of receive SNR, and even interference suppression in the case of multi-user detection (MUD). An adaptive array structure can be articulated in which the weight vector is adjusted to maximize the quality of the signal available to the demodulator for the kth user at time i. This structure generalized for the case of multi-user reception is given in FIG. 31. Depending on the adaptation algorithm, a training sequence may or may not be sent. Least squares (LS) and minimum mean square error (MMSE) require such training, whereas in decision-directed adaptation an estimate of the signal is generated based on the output of the array and signal demodulator. Alternatively, there is the class of blind adaptive algorithms that adapt weights on the basis of underlying signal structure. FIG. 31a provides a modification to the structure of FIG. 31 that permits access to the geometry phase before demodulation for the purpose of augmenting the beamforming that is performed based on signal detection.

As in the radar application, the present invention permits receive and transmit beamforming for signals of this type to be performed on the basis of low bandwidth GPP. Again, geometry phase can be extracted either by spectral filtering or by spatial filtering (spatial derivative).

In many instances of current mobile communications protocols, pilot signals are transmitted along with data-modulated carriers or subcarriers for the purpose of conveying power control information, or carrier phase and timing information useful for decoding and demodulation functions. In the case of CDMA systems, such pilot signals provide a convenient source of coherent carrier phase information for use in the present invention. The pilot(s) which comprise subcarrier(s) spectrally spread with a fixed PN code are straightforwardly despread to provide a replica of the carrier signal. The geometry phase component of the carrier phase can be extracted, as outlined above, for the radar application.

In the absence of pilots, other approaches must be invoked to retrieve the signal carrier phase. For m-ary phase shift keyed signals such as BPSK, QPSK, etc., the modulation can be removed by use of the nonlinear scheme discussed relative to FIG. 10.

iii) Space-Time-Modulation Processing

Multi-input, multi-output (MIMO) antenna arrays exploit the uncorrelated fading nature of multiple spatial channels established between the elements of arrays located at transmit and receive locations, respectively. This permits mitigation of channel fading through channel diversity and the use of joint spatial-temporal channel coding schemes that maximize data throughput. A comprehensive survey of space-time processing that exploits channel diversity is provided in the paper by A. J. Paulraj and C. B. Papadias, "Space-Time Processing for Wireless Communications," IEEE Signal Processing Magazine, Vol. 14, No. 6, November, 1997, pp. 49-83. A summary of space-time coding techniques is provided in the paper by A. F. Naguib, N. Seshadri, and A. R. Calderbank, "Increasing Data Rate Over Wireless Channels," IEEE Signal Processing Magazine, Vol. 17, No. 3, May 2000, pp. 77-102.

Because MIMO arrays are implemented for the purpose of overcoming channel impairments rather than beamforming, there is no inherent benefit from knowledge of geometry phase that allows array size reductions. In fact, the more widely separated the MIMO array elements are, the more uncorrelated are the respective spatial channels setup by these elements and therefore, the greater the MIMO system capacity. However, the present invention does enable reduction in the size a combined MIMO-beamformer architecture in which the elements of the array serve both MIMO and beamforming duties. In such a system, the elements are spaced as closely as possible without losing the benefit of MIMO channel decorrelation.

iv) Application to RAKE Receiver Processing

Figure 32:
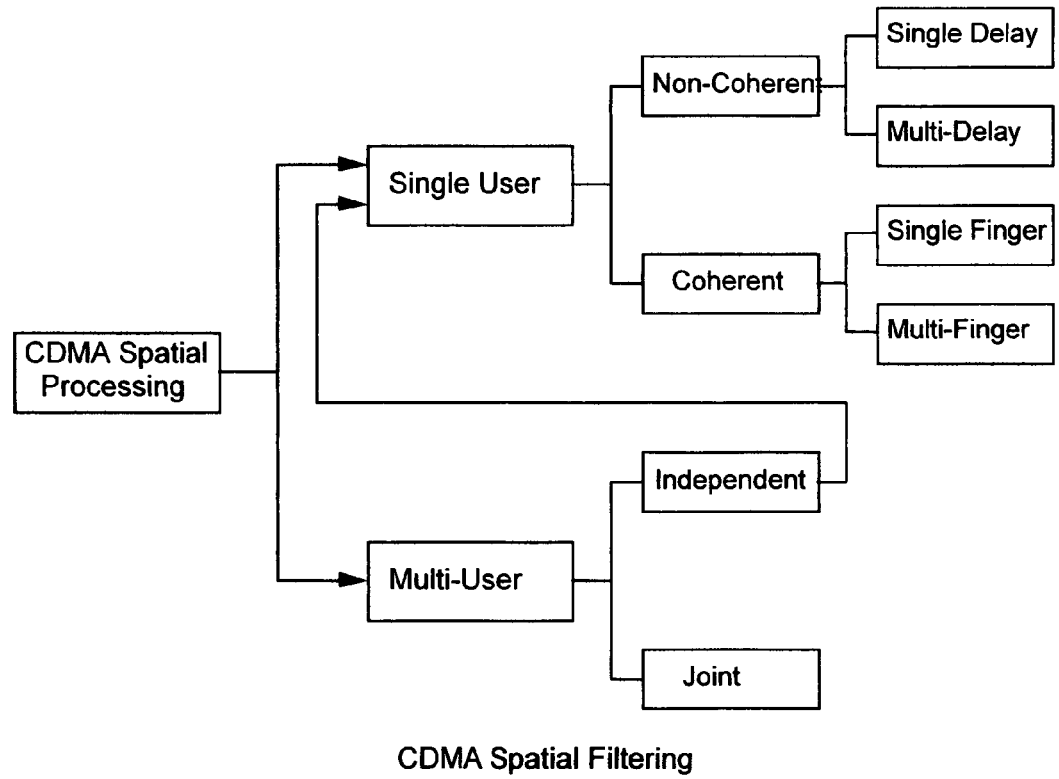
FIG. 32 is a CDMA spatial processing taxonomy diagram.

A taxonomy of spatial processing for commercial CDMA systems for single and multiple users is provided in FIG. 32 (J. C. Liberti and T. S. Rappaport, Smart Antennas for Wireless Communications: IS-95 and Third Generation CDMA Applications, Prentice Hall, Inc., New Jersey, 1999). Issues surrounding the design of coherent and non-coherent Rake receivers are well known in the prior art. While non-coherent designs offer reduced complexity, they do not exhibit the capability to null interference or manage multipath.

Figure 33:
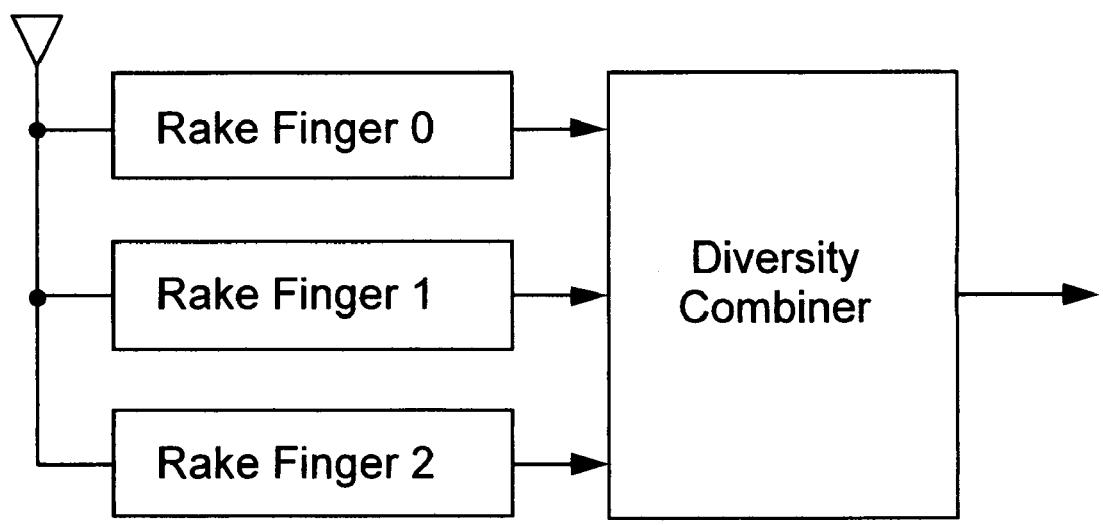
FIG. 33 is a functional diagram of a conventional RAKE receiver.
Figure 34:
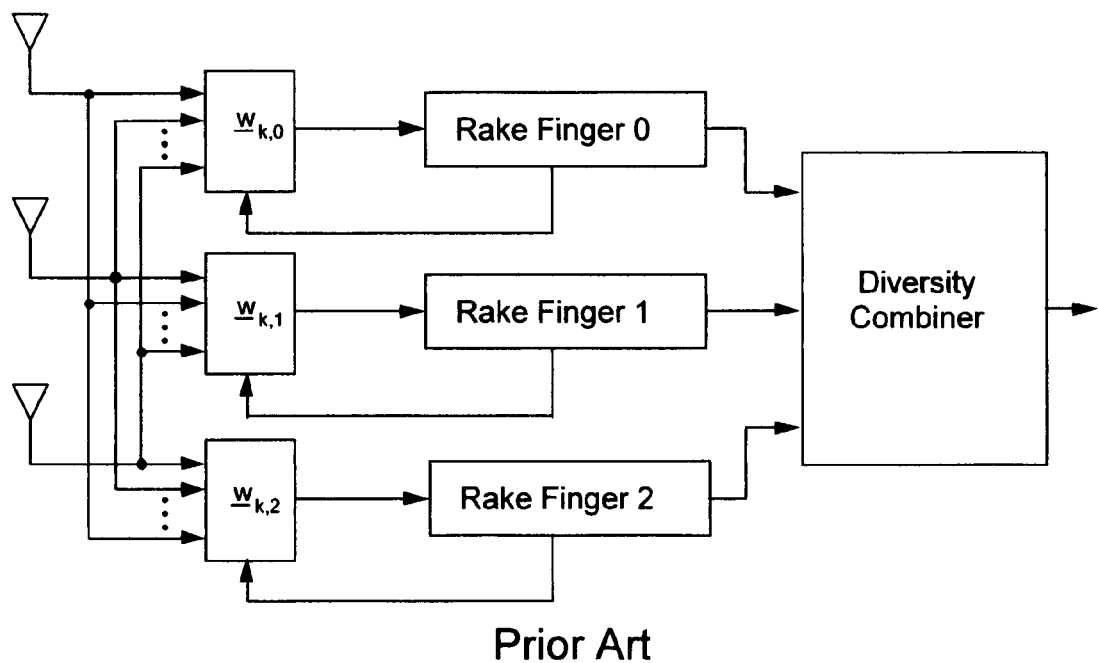
FIG. 34 is a functional diagram of a RAKE receiver exploiting spatial filtering.
Figure 34A:
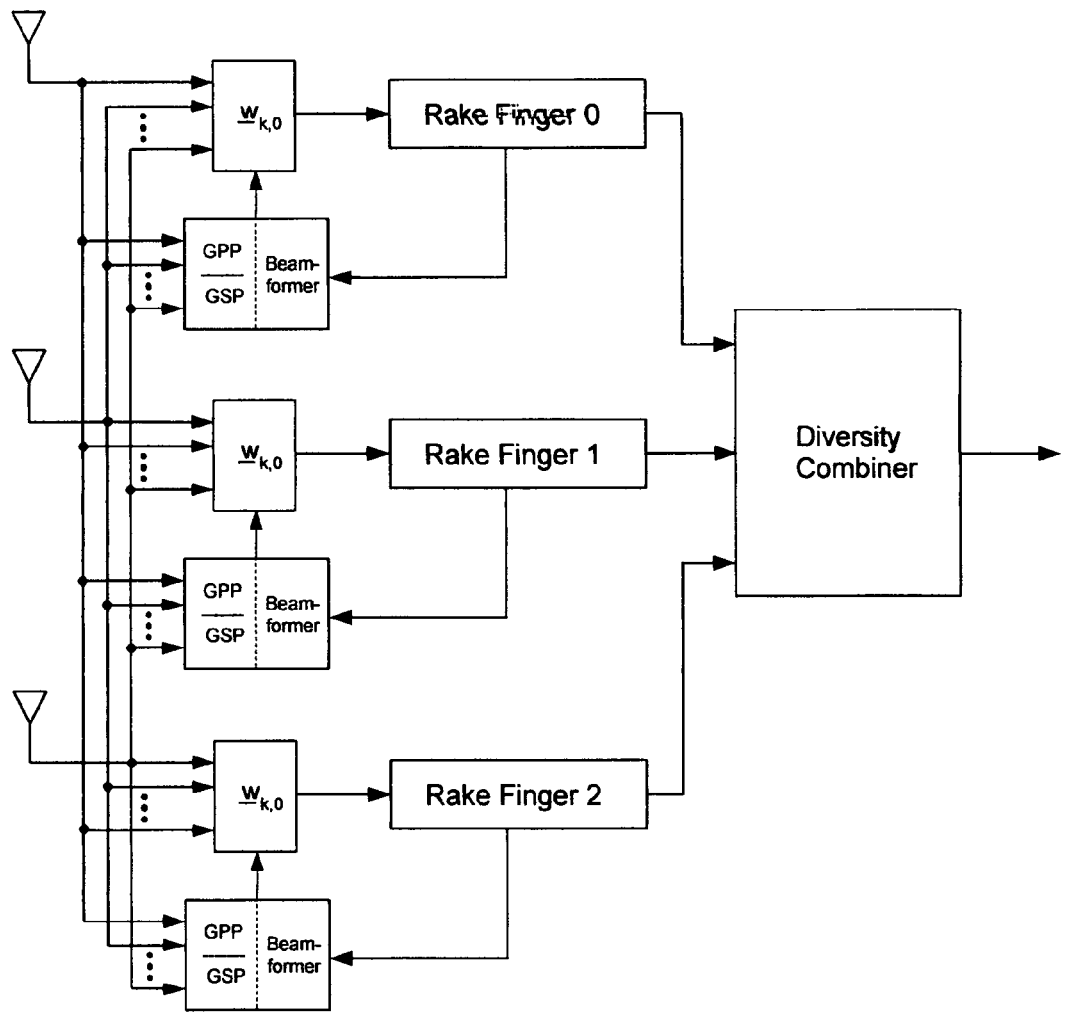
FIG. 34a is a functional diagram of a RAKE receiver exploiting spatial filtering with GPP and GSP.

In multi-user systems, beams are formed for all users simultaneously. FIG. 33 depicts the conventional Rake receiver architecture and the extension to a spatial filtering architecture is depicted in FIG. 34 where beamforming is implied in the weight boxes. In this architecture each rake finger has a dedicated beamformer adapting to the particular cluster of coherent multipaths received about that finger. FIG. 34a depicts the inclusion of GPP and GSP in this architecture so that geometry phase associated with the coherent multipath is exploited.

If the length of each tapped delay of a conventional wideband adaptive array is great enough to capture delayed multipath components, then such an array can capture power in signal components that arrive with differing delays and recombine them. Again, the present invention can overcome this requirement by performing beamforming using narrowband geometry phase and employing a narrowband tapped delay line with sufficient dynamic range in total delay. If the multipath components arrive in resolvable clusters, each finger of the spatial filtering Rake receiver uses its associated beam to reject other clusters and hence requires less finger processing total delay.

Although terrestrial platforms such as automobiles and other conveyances will rarely impart a Doppler frequency of more than a few hundred hertz, communication among airborne platforms and between airborne and ground platforms will experience the same Doppler frequencies as common in radar target scenarios.

GPP and GSP can be invoked in spatial filtering architecture of FIG. 34.

v) Adaptation for CDMA

Given that the mobile communications environment is time-varying, the solution for the weight vector must be updated accordingly. Many of the adaptive algorithms applied to radar problem, can be applied to the adaptation of communications arrays. These generally require training data for adaptation. In contrast, blind algorithms do not and within this class of techniques are a few that are most useful for communications signaling. Specifically for CDMA, multi-user type blind algorithms that have the ability to separate and extract each user's signal blindly and simultaneously. Among these are multitarget least squares constant modulus algorithm, multitarget decision-directed algorithm, least squares de-spread re-spread multitarget array, and least squares de-spread re-spread multitarget constant modulus algorithm.

vi) Multipath Considerations

Multipath energy is sometimes considered interference and in other instances considered a useful source of signal energy as in the case of RAKE receivers. Further, the character of the multipath allows it to be exploited in different ways. For example, correlated multipath can be used by RAKE architectures to increase the likelihood of signal detection, whereas uncorrelated multipath is used by MIMO architectures to increase communications capacity.

The correlation of multipath signals is dependent upon angle-of-arrival and receive element separation. Signals become increasingly decorrelated with disparity in angle of arrival and with the separation of receiving elements. When uncorrelated multipath is present for the signal of interest, the narrowband array having provision for null steering will attempt to place nulls in the directions of all but one of the multipath components. Hence another way to exploit GSP is to separate elements in order to increase multipath decorrelation while maintaining fixed pattern resolution.

Narrow angle-of-arrival spectra lead to highly correlated local fields requiring wide antenna element spacing to decorrelate multipath. The level of multipath correlation can be calculated from the spatial autocovariance of the received field. A closed-form approximation for this autocovariance has been derived as a function of multipath shape factors: angular spread, angular constriction, and azimuthal direction of maximum fading is found in the paper by G. D. Durgin and T. S. Rappaport, "Theory of Multipath Shape Factors for Small-Scale Fading Wireless Channels," IEEE Transactions on Antennas and Propagation, Vol. 48, No. 5. pp. 682-693, May, 2000. Each of these parameters used to estimate the autocovariance is wholly dependent on the angle-of-arrival spectrum that can be measured with a high gain antenna. Hence, it is possible to characterize a multipath environment in the case of a stationary receiver and to conduct a trade with regard to array miniaturization versus desired processing performance. This will depend upon whether the goal is correlation or decorrelation of received multipath. Again, correlated signal energy can be exploited for increasing SNR in Rake processing, whereas decorrelation can be used to mitigate noise sources.

H) Radio Telescopes (Radio Interferometry)

In radio interferometry, laterally-separated high gain antennas are used to provide samples of the autocorrelation of a radio image. Often, only the modulus of the autocorrelation (or bispectrum) is accessible and various phase retrieval and phase unwrapping schemes are employed to identify the full complex-valued function. From spatial samples of this two-dimensional function, the image of the remote radio emitter is reconstructed. Given the high gain necessary for the elements of radio telescope arrays (ex. the Very Large Array, Socorro, N.Mex.), the major benefit of the present invention in this context will be the prospect of significantly increasing the array angular resolution for a given telescope separation. However, for some radio imaging applications, the present invention allows creation of high gain subarrays to supplant the large diameter parabolic dishes. Given the low signal powers associated with radio interferometer measurements, care must be taken to implement a geometry phase extraction process that is low noise.

I) SONAR and Seismology

Many long range sonar surveillance systems employed in naval applications use passive towed arrays. The length of these arrays (typically kilometers) are sufficient to create the azimuthal resolution necessary for extended range surveillance. With an aperture of this size, uncertainty exists in the actual location of array elements. A predominant geometric distortion of the array is curvature due to ocean currents and platform maneuvering. The reduction in array length made possible by the present invention will mitigate uncertainties in element position while providing for a compact array design that intercepts less uncorrelated ambient acoustic noise. The bandwidth associated with the geometry phase of sonar targets will be less than that of radar targets.

i) Reverberation Suppression

By placing array elements closer together, reverberation signals become more correlated among the elements of the array. This improves the efficiency with which such interference can be suppressed.

ii) Near Field Targets—Phase Curvature and Compensation

In both sonar and medical ultrasound applications, there exists the strong possibility of target presence in the near acoustic field, or at least close enough to the array that there is wavefront phase curvature. In the modified-size array of the present invention, such phase curvature must be taken into account and scaled accordingly as a contribution to geometry phase received by the array. Focus estimation can be used to track targets with time-varying range.

CONCLUSION

Variations on the methods of the invention herein disclosed are considered within the scope of the present invention. This includes other techniques for performing geometry phase processing.

The invention claimed is:

1. A method of creating a geometry phase processing-based phased array of receiving elements comprising the steps of:
   a) extracting the geometry phase associated with each of a plurality of remote emitting sources received by each said element of said array; and
   b) scaling said geometry phase to improve properties of the array taken from the group comprising (i) increase in the angular resolution of said array and (ii) reduction in the physical size of said array.

2. The method recited in claim 1 wherein said scaling of geometry phase is used to increase the resolution of said array without altering the separation between said array elements.

3. The method recited in claim 1 wherein said scaling of geometry phase is used to maintain the resolution of said array without altering the separation between said array elements, but with reducing the number of said receiving elements.

4. The method recited in claim 1 wherein said scaling of geometry phase is used to reduce the separation between said array elements without reducing the resolution of said array.

5. The method recited in claim 1 wherein processing of said geometry phase permits narrowband beamforming and direction of arrival processing for wideband received signals without substantial loss of array performance.

6. The method recited in claim 1 wherein step b includes creation of virtual array elements that increase the effective array size.

7. The method recited in claim 1 wherein said step b) includes the steps:
   i) forming multiple receive beams; and
   ii) scaling the geometry phase for each said beam independently.

8. A method of creating a geometry phase processing-based phased array of receiving elements comprising the steps of:
   a) estimating the geometry phase of each said remote emitting source using direction of arrival estimation methods; and
   b) scaling said geometry phase to improve properties of the array taken from the group comprising (i) increase in the angular resolution of said array and (ii) reduction in the physical size of said array.

9. The method recited in claim 8 wherein steps a and b are executed iteratively to achieve array performance.

10. A method of creating a geometry phase processing-based phased array of receiving elements comprising the steps of:
   a) providing an array with an initial number of active receiving elements;
   b) extracting the geometry phase associated with each of a plurality of remote emitting sources received by each said element of said array;
   c) scaling said geometry phase to reduce said initial number of said active receiving elements while substantially maintaining the resolution of said array.

11. A phased array sensor comprising:
   a) a collection of array receiving elements, receiving energy from at least one remote source;
   b) means for extracting the geometry phase associated with each said element attributable to each said remote source; and
   c) means for scaling said geometry phase to proportionally increase the resolution of said array.

\* \* \* \* \*